US012279085B2

(12) United States Patent
Wang et al.

(10) Patent No.: US 12,279,085 B2
(45) Date of Patent: Apr. 15, 2025

(54) ACOUSTIC OUTPUT APPARATUSES AND ASSEMBLIES THEREOF

(71) Applicant: SHENZHEN SHOKZ CO., LTD., Guangdong (CN)

(72) Inventors: Yonggen Wang, Shenzhen (CN); Haofeng Zhang, Shenzhen (CN); Zeying Zheng, Shenzhen (CN); Lei Zhang, Shenzhen (CN); Liwei Wang, Shenzhen (CN); Jiang Xu, Shenzhen (CN); Fanyue Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 294 days.

(21) Appl. No.: 17/934,192

(22) Filed: Sep. 21, 2022

(65) Prior Publication Data

US 2023/0028541 A1 Jan. 26, 2023

Related U.S. Application Data

(63) Continuation of application No. PCT/CN2021/091673, filed on Apr. 30, 2021.

(30) Foreign Application Priority Data

Jul. 29, 2020 (CN) ......................... 202010743396.4
Nov. 24, 2020 (CN) ......................... 202011328519.4
Dec. 23, 2020 (CN) ......................... 202011539560.6

(51) Int. Cl.
*H04R 1/10* (2006.01)

(52) U.S. Cl.
CPC ......... *H04R 1/1066* (2013.01); *H04R 1/1025* (2013.01); *H04R 1/105* (2013.01); *H04R 1/1091* (2013.01); *H04R 2201/10* (2013.01)

(58) Field of Classification Search
CPC .......... H04R 1/10; H04R 1/105; H04R 25/02; H04R 25/607; H04R 2225/0213
See application file for complete search history.

(56) References Cited

U.S. PATENT DOCUMENTS 4,893,344 A * 1/1990 Tragardh ............. H04R 1/1066 381/381
5,210,792 A * 5/1993 Kajihara ................. H04M 1/05 381/381

(Continued)

FOREIGN PATENT DOCUMENTS

CN 203968330 U 11/2014
CN 204069257 U 12/2014

(Continued)

OTHER PUBLICATIONS

International Search Report in PCT/CN2021/091673 mailed on Jul. 15, 2021, 8 pages.

(Continued)

*Primary Examiner* — Ryan Robinson
(74) *Attorney, Agent, or Firm* — METIS IP LLC

(57) ABSTRACT

The embodiments of the present disclosure disclose an acoustic apparatus. The acoustic apparatus may include a support assembly. The support assembly may include a first portion and a second portion. When a user is wearing the acoustic apparatus, the first portion may be hung between a first side of an ear and a head of the user, the second portion may contact a second side of the ear. The first portion may cause the second portion to provide a compressive force on the second side of the ear.

20 Claims, 25 Drawing Sheets

(56) References Cited

U.S. PATENT DOCUMENTS

| | | | | |
|---|---|---|---|---|
| 5,412,736 | A * | 5/1995 | Keliiliki | H04R 1/105 381/381 |
| 7,123,737 | B2 * | 10/2006 | Ham | H04R 1/105 381/381 |
| 9,106,997 | B2 * | 8/2015 | Burgett | H04R 1/105 |
| 10,674,244 | B2 * | 6/2020 | Dominijanni | H04R 1/1075 |
| 10,924,838 | B1 * | 2/2021 | Graff | H04R 1/1008 |
| 2008/0310666 | A1 | 12/2008 | Wengreen | |
| 2010/0061581 | A1 | 3/2010 | Soetejo et al. | |
| 2012/0087534 | A1 | 4/2012 | Pelland et al. | |
| 2012/0140976 | A1 * | 6/2012 | Birger | H04M 1/6066 381/381 |
| 2014/0153768 | A1 * | 6/2014 | Hagen | H04R 1/1008 381/380 |
| 2017/0034611 | A1 * | 2/2017 | Maruyama | H04R 1/105 |
| 2017/0359644 | A1 * | 12/2017 | Cramer | H04R 1/1008 |
| 2020/0077174 | A1 * | 3/2020 | Solis | H04R 1/1016 |

FOREIGN PATENT DOCUMENTS

| | | |
|---|---|---|
| CN | 204559845 U | 8/2015 |
| CN | 210327927 U | 4/2020 |

OTHER PUBLICATIONS

Written Opinion in PCT/CN2021/091673 mailed on Jul. 15, 2021, 8 pages.

* cited by examiner

2500

ACOUSTIC OUTPUT APPARATUSES AND ASSEMBLIES THEREOF

CROSS-REFERENCE TO RELATED APPLICATION

This application is a continuation of International Application No. PCT/CN2021/091673, filed on Apr. 30, 2021, which claims priority of Chinese Patent Application No. 202010743396.4, filed on Jul. 29, 2020, Chinese Patent Application No. 202011328519.4, filed on Nov. 24, 2020, and Chinese Patent Application No. 202011539560.6, filed on Dec. 23, 2020, the contents of each of which are entirely incorporated herein by reference.

TECHNICAL FIELD

The present disclosure relates to the field of acoustic apparatus, in particular to a support structure in an acoustic apparatus.

BACKGROUND

With the development of acoustic output technology, acoustic output apparatus (e.g., earphones) have been widely used in people's daily life, which can be used in conjunction with electronic devices such as mobile phones and computers to provide users with an auditory feast. According to the way of the user wears, the acoustic apparatus generally be divided into a head-mounted type, an ear-hook type, and an in-ear type. The wearing comfort and stability of the acoustic apparatus will greatly affect the user's choice and experience. Therefore, it is necessary to provide a reasonable support structure to improve the wearing comfort of the user and the wearing stability of the acoustic apparatus.

SUMMARY

One aspect of the present disclosure relates to an acoustic apparatus. The acoustic apparatus may include a support assembly. The support assembly may include a first portion and a second portion. When a user is wearing the acoustic apparatus, the first portion may be hung between a first side of an ear and a head of the user, the second portion may contact a second side of the ear, wherein the first portion may cause the second portion to provide a compressive force on the second side of the ear.

In some embodiments, the acoustic apparatus may include a third portion. The first portion may be connected with the second portion through the third portion, and the first portion may cause the second portion to provide the compressive force on the second side of the ear through the third portion, and the third portion may adapt to thickness of the ear.

In some embodiments, when the user is wearing the acoustic apparatus, a first contact point and a contact second point between the first portion and the head may be formed on the first portion. The second contact point may be located between the first contact point and a first connection point between the first portion and the third portion to cause the first portion to form a lever structure with the second contact point as a fulcrum. A force provided by the head and directed toward an outside of the head at the second contact point may be converted by the lever structure into a force directed toward the head at the first connection point. The force directed toward the head may cause, through the third portion, the second portion to provide the compressive force on the second side of the ear.

In some embodiments, when the user is wearing the acoustic apparatus, a first contact point between the first portion and the first side of the ear may be formed on the first portion. A second contact point between the second portion and the second side of the ear may be formed on the second portion. A distance between the first contact point and the second contact point when the user is not wearing the acoustic apparatus may be smaller than a distance between the first contact point and the second contact point when the user is wearing the acoustic apparatus, to cause the second portion to provide the compressive force on the second side of the ear.

In some embodiments, a third contact point between the first portion and the first side of the ear may be formed on the first portion. The third contact point may be located between the first contact point and a first connection point between the first portion and the third portion, and may be adjacent to the first connection point. A distance between projections of the first contact point and the third contact point on a reference plane perpendicular to an extension direction of the third portion when the user is not wearing the acoustic apparatus may be smaller than a distance between projections of the first contact point and the third contact point on the reference plane perpendicular to the extension direction of the third portion when the user is wearing the acoustic apparatus to balance a self-weight of the second portion.

In some embodiments, a first end of the first portion may be provided with at least one of a bulge structure, a dull polish structure, a texture structure, or a hole structure.

In some embodiments, an angle between a first end of the first portion and a reference plane when the user is not wearing the acoustic apparatus may be greater than an angle between the first end of the first portion and the reference plane when the user is wearing the acoustic apparatus. The reference plane may include a plane including a surface of the second portion.

In some embodiments, the first portion may be configured to provide a compressive force to the first side of the ear.

In some embodiments, the first portion and the third portion may be movably connected, the third portion and the second portion may be movably connected, or a portion of the third portion may be movably connected relative to another portion of the third portion.

In some embodiments, the acoustic apparatus may include an auxiliary portion. The auxiliary portion may be physically connected with the second portion. \When the user is wearing the acoustic apparatus, the auxiliary portion may be used to abut against at least a part of the ear to limit a movement of the second portion.

In some embodiments, the second portion may have a major axis and a minor axis. A dimension of the second portion in a direction of the major axis may be greater than or equal to a dimension of the second portion in a direction of the minor axis. One end of the second portion in the direction of the major axis may be connected with a second end of the first portion. The auxiliary portion may be connected with a side of the second portion close to the first portion.

In some embodiments, when the user is not wearing the acoustic apparatus, a side of the second portion in contact with the second side of the ear may be defined as an inner surface, a side of the second portion opposite to the inner surface may be defined as an outer surface, a side of the second portion connected with the first portion may be defined as an upper surface, and a side of the second portion opposite to the upper surface in the direction of the major axis may be defined as a lower surface, a side of the second portion close to the ear may be defined as a rear surface, and a side of the second portion opposite to the rear surface in the direction of the minor axis may be defined as a front surface. The auxiliary portion may be provided at one of the upper surface, the rear surface, and the lower surface. The auxiliary portion may also be provided at a junction of the upper surface and the rear surface or a junction of the rear surface and the lower surface.

In some embodiments, the auxiliary portion may include a support segment and a contact segment connected with the support segment. The support segment may be connected with the second portion. The contact segment may be used to abut against an auricular nave of the ear.

In some embodiments, an angle formed by the support segment along the extension direction of the second portion and the direction of the major axis of the second portion may be within the range of 0° to 30°.

In some embodiments, an angle formed between a projection of the support segment on a reference plane perpendicular to the direction of the major axis of the second portion and the direction of the minor axis of the second portion may be within the range of 0° to 60° to cause the auxiliary portion to clamp the ear together with the first portion when the user is wearing the acoustic apparatus.

In some embodiments, the acoustic apparatus may further include a core assembly and a battery assembly. The core assembly may be arranged on the second portion. The battery assembly may be arranged on the first portion.

In some embodiments, a ratio of a total weight of the second portion to a weight of a portion of the first portion including the battery assembly may be within 4:1.

In some embodiments, an outer diameter of a portion of the first portion including the battery assembly may be larger than an outer diameter of other portions of the first portion.

In some embodiments, a ratio of a length to an outer diameter of a portion of the first portion including the battery assembly may be within 6:1.

Another aspect of the present disclosure relates to an acoustic apparatus. The acoustic apparatus may include a support assembly and an auxiliary portion. The support assembly may include a first portion and a second portion. The auxiliary portion may be physically connected with the second portion. When the user is wearing the acoustic apparatus, the first portion may be hung between a first side of an ear and a head of the user and being at least partially in contact with the head. The second portion may contact a second side of the ear. The first portion may cause the second portion to provide a compressive force on the second side of the ear. The auxiliary portion may be used to abut against at least a part of the ear to limit a movement of the second portion.

Additional features may be set forth in part in the following description, and may become apparent to those skilled in the art upon review of the following and the accompanying drawings, or may be learned by the generation or operation of examples. The features of the invention can be realized and obtained by practicing or using the various aspects of the methods, tools and combinations set forth in the following detailed examples.

BRIEF DESCRIPTION OF THE DRAWINGS

The present disclosure may be further described by way of exemplary embodiments, which may be described in detail by means of the accompanying drawings. These embodiments are not limiting, and in these embodiments, the same numbers refer to the same structures, wherein.

DETAILED DESCRIPTION

Figure 1:
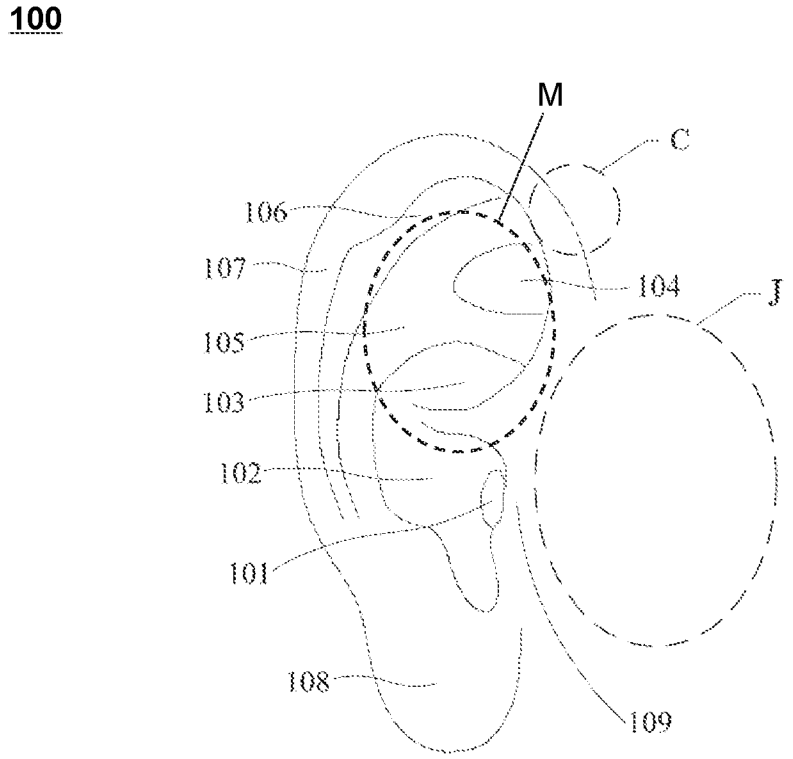
FIG. 1 is a schematic diagram illustrating an exemplary ear according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to other similar scenarios according to these drawings. Unless it is obvious from the language environment or otherwise stated, the same reference numbers in the drawings represent the same structure or operation.

As used in the disclosure and the appended claims, the singular forms “a,” “an,” and “the” include plural referents unless the content clearly dictates otherwise. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements. The term “based on” is “based at least in part on.” The term “one embodiment” means “at least one embodiment”, and the term “another embodiment” means “at least one additional embodiment”. It should be understood that the terms “data block”, “system”, “engine”, “unit”, “component”, “module” and/or “block” may be a method is used herein to distinguish different components, elements, parts, sections or assemblies at different levels. However, other words may be replaced by other expressions if they serve the same purpose.

Various terms are used to describe the spatial and functional relationships between elements (e.g., between components), including “connected,” “joined,” “interfaced,” and “coupled”. Unless expressly described as “directly”, when describing a relationship between a first and second element in the application, the relationship may include a direct relationship between the first element and second element without other intervening elements, and an indirect relationship (spatially or functionally) with one or more intervening elements between the first and second elements. In contrast, when an element is referred to as being “directly” connected, joined, interfacing, or coupled to another element, there are no intervening elements present. Additionally, the spatial and functional relationships between elements may be implemented in various ways. For example, the mechanical connection between the two elements may include a welded connection, a keyed connection, a pinned connection, an interference fit connection, etc., or any combination thereof. Other words used to describe the relationship between elements should be interpreted in a similar fashion (e.g., “between”, “between . . . and”, “adjacent” versus “directly adjacent”, etc.).

Related definitions of other terms will be given in the description below. Hereinafter, “player”, “speaker device”, “speaking device” or “speaker” will be used in describing the sound conduction related techniques in the present invention. This description is only a form of speaker application. For those skilled in the art, “speaker device”, “speaker”, or “earphone” can also be replaced by other similar words, such as "player", "hearing aid", or the like. In fact, the various implementations in the present disclosure may be easily applied to other non-speaker-type hearing devices. For example, for those skilled in the art, after understanding the basic principle of the speaker device, various modifications, and changes to the implementation of the speaker device may be performed on the specific methods and details of the speaker device without departing from this principle. In particular, the environment sound picking and processing function may be added to the speaker device, so that the speaker device has the function of the hearing aid. For example, in the case of using a bone conduction speaker device, a sound transmitter such as a microphone may pick up an ambient sound close to the user/wearer. The sound may be further processed using a certain algorithm, and the processed sound (or a generated electrical signal) may be transmitted to the user/wearer. That is, the speaker device may be modified and have the function of picking up ambient sound. The ambient sound may be processed and transmitted to the user/wearer through the speaker device, thereby implementing the function of a hearing aid. The algorithm mentioned above may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

FIG. 1 is a schematic diagram illustrating an exemplary ear according to some embodiments of the present disclosure.

As shown in FIG. 1, the ear 100 may include an external auditory canal 101, a concha cavity 102, a cymba conchae 103, a triangular fossa 104, an antihelix 105, an scapha 106, a helix 107, an earlobe 108, and a tragus 109. In some embodiments, the wearing and stabilization of an acoustic apparatus may be accomplished with one or more components of the ear 100. An acoustic apparatus refers to an apparatus with sound output function. In actual use, the acoustic apparatus may have product forms such as earphones (e.g., wired earphones, wireless earphones, etc.), glasses, a helmet, a hair band, etc.

In some embodiments, the external auditory canal 101, the concha cavity 102, the cymba conchae 103, the triangular fossa 104 and other components have a certain depth and volume in the three-dimensional space, which may be used to meet the wearing requirements of the acoustic apparatus. For example, an acoustic apparatus (e.g., in-ear headphones) may be worn in the external auditory canal 101. In some embodiments, the wearing of the acoustic apparatus may be achieved by means of other components of the ear 100 than the external auditory canal 101. For example, the wearing of the acoustic apparatus may be realized by means of the cymba conchae 103, the triangular fossa 104, the antihelix 105, the scapha 106, the helix 107, etc., or a combination thereof. In some embodiments, in order to improve the wearing comfort and reliability of the acoustic apparatus, the earlobe 108 and other components of a user may also be used. By using other components of the ear 100 other than the external auditory canal 101 to realize the wearing of the acoustic apparatus and the transmission of sound, the user's external auditory canal 101 may be "liberated", and the impact of the acoustic apparatus on the ear of the user health may be reduced. When the user is wearing the acoustic apparatus on the road, the acoustic apparatus will not block the user's external ear canal 101, and the user may receive both the sound from the acoustic apparatus and the sound from the environment (e.g., whistle, car bell, surrounding human voice, traffic instruction sound, etc.) to reduce the probability of traffic accidents. For example, when the user is wearing the acoustic apparatus, the whole or part of the structure of the acoustic apparatus may be located on the front side of the tragus 109 (e.g., the area J enclosed by the dotted line in FIG. 1). As another example, when the user is wearing the acoustic apparatus, the whole or part of the structure of the acoustic apparatus may contact the upper part of the external auditory canal 101 (e.g., the tragus 109, the cymba conchae 103, the triangular fossa 104, the antihelix 105, the scapha 106, the helix 107, etc. where one or more components are located). As another example, when the user is wearing the acoustic apparatus, the whole or part of the structure of the acoustic apparatus may be located inside one or more components (e.g., the concha cavity 102, the cymba conchae 103, and the triangular fossa 104, etc.) of the ear (e.g., the area M enclosed by the dotted line in FIG. 1).

The foregoing description of the ear 100 is for illustrative purposes only and is not intended to limit the scope of the present disclosure. For those of ordinary skill in the art, various changes and modifications may be made based on the description of the present disclosure. For example, the structure, shape, size, thickness, etc. of one or more components of the ear 100 may be different for different users. As another example, a part of the structure of the acoustic apparatus may shield part or all of the external auditory canal 101. These changes and modifications are still within the scope of protection of the present disclosure.

Figure 2:
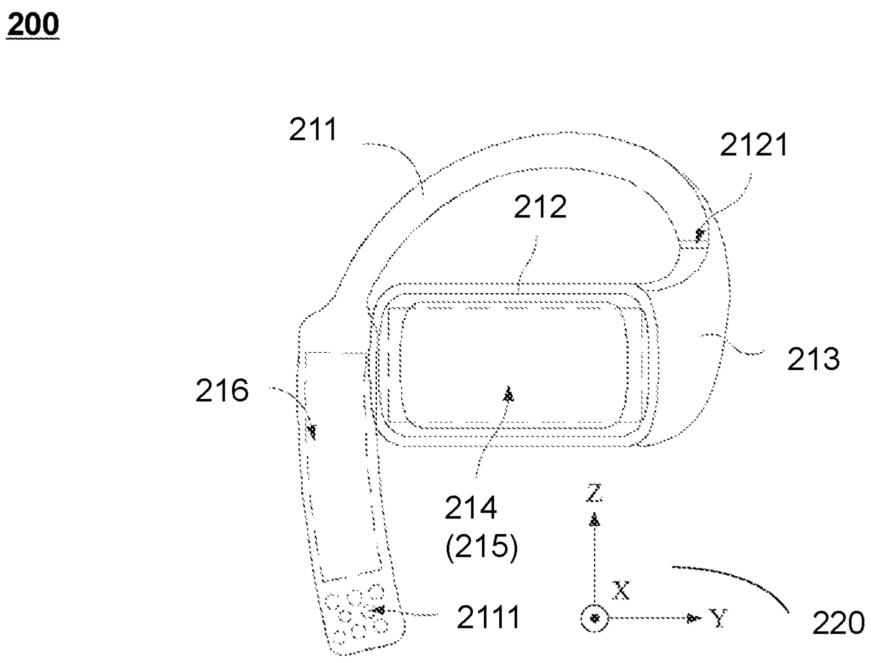
FIG. 2 is a front view illustrating an exemplary acoustic apparatus according to some embodiments of the present disclosure.
Figure 3:
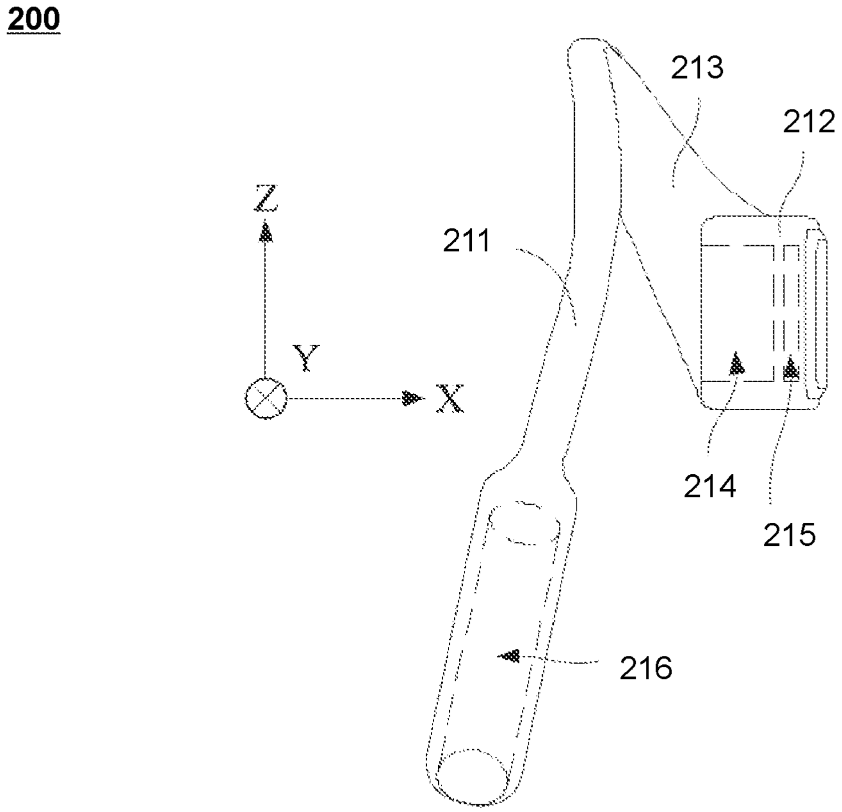
FIG. 3 is a left side view illustrating the acoustic apparatus in FIG. 2 according to some embodiments of the present disclosure.

FIG. 2 is a front view illustrating an exemplary acoustic apparatus according to some embodiments of the present disclosure. FIG. 3 is a left side view illustrating the acoustic apparatus in FIG. 2 according to some embodiments of the present disclosure.

As shown in FIG. 2 and FIG. 3, the acoustic apparatus 200 may include a support assembly. The support assembly may include a first portion 211 and a second portion 212. In some embodiments, when a user is wearing the acoustic apparatus 200, the first portion 211 may be hung between a first side of an ear and the head of the user, the second portion 212 may contact a second side of the ear, and the first portion 211 may cause the second portion 212 to provide a compressive force on the second side of the ear.

In some embodiments, when the user is wearing the acoustic apparatus 200, the first portion 211 may be hung on the first side of the ear of the user. In some embodiments, the first portion 211 may at least partially contact the head. The first side of the ear may be the front side of the ear of the user, the back of the ear of the user, or the like. The front side of the ear of the user refers to the side of the ear of the user where the cymba conchae (e.g., cymba conchae 103), the triangular fossa (e.g., the triangular fossa 104), the antihelix (e.g., the antihelix 105), the concha (e.g., the scapha 106), the helix (e.g., the helix 107), etc., are located. The back side of the ear of the user refers to the side of the ear of the user that is away from the front side, that is, the side opposite to the front side. In some embodiments, the acoustic apparatus 200 may include a third portion 213, and the third portion 213 may contact the second side of the ear of the user. The second side of the ear of the user may be the front side of the ear of the user, the rear side of the ear of the user, or the like. In some embodiments, the second side of the ear of the user may be different from the first side of the ear of the user. For example, the first side of the ear of the user may be the back side of the ear of the user, and the second side of the ear of the user may be the front side of the ear of the user. In some embodiments, the first portion 211 may include any shape suitable for a user to wear the acoustic apparatus 200, e.g., a hook shape, a C shape, or the like. In some embodiments, the first portion may also be referred to as a hook-shaped portion, the second portion may also be referred to as a holding portion, and the third portion may also be referred to as a connection portion.

In some embodiments, the third portion 213 may be used to connect the first portion 211 and the second portion 212. Specifically, a first end of the third portion 213 may be connected with the first portion 211, and a second end of the third portion 213 may be connected with the second portion 212. In some embodiments, the connection between the first portion 211 and the third portion 213 may include a fixed connection or a movable connection, the connection between the third portion 213 and the second portion 212 may include a fixed connection or a movable connection, and/or the connection between a part of the third portion 213 and another part of the third portion 213 may include a fixed connection or a movable connection. In some embodiments, the relative positional relationship between the first portion 211 and the third portion 213, the third portion 213 and the second portion 212, and/or a part of the third portion and another part of the third portion in the three-dimensional space may be adjusted, such that the acoustic apparatus 200 may adapt to different users, thereby increasing the applicable range of the acoustic apparatus 200. For example, the third portion 213 may be made of deformable material such as a soft steel wire, and the user may adjust the relative positions of the first portion 211, the third portion 213, and/or the second portion 212 in the three-dimensional space by bending the third portion 213 to rotate one part relative to the other part to meet the user's wearing needs. As another example, the third portion 213 may be provided with a shaft assembly 2121, and the user may adjust the relative positions of the first portion 211, the third portion 213 and/or the second portion 212 in the three-dimensional space through the shaft assembly 2121 to meet the wearing requirements of the user. Further, if the first portion 211 and the third portion 213 are movably connected through the shaft assembly 2121, the first portion 211 may rotate relative to the third portion 213. If the second portion 212 and the third portion 213 are movably connected through the shaft assembly 2121, the second portion 212 may be rotatable relative to the third portion 213. If a part of the third portion 213 is movably connected with another part of the third portion 213 through the shaft assembly 2121, a part of the third portion 213 may be rotatable relative to another part of the third portion 213. More descriptions of the shaft assembly 2121 may be found in FIGS. 34-38 and related descriptions thereof. In some embodiments, the parameters (e.g., shape, length, thickness, etc.) of the third portion 213 may be set according to specific conditions to adapt to ears with different thicknesses and shapes. For example, the third portion 213 may adapt to the thickness of the ear of the user. Only as an example, for children, minors, adult women and other types of users, the thickness of their ears is often thin (commonly known as "thin ears"), the third portion 213 may be set to a relatively small length to increase the fit of the acoustic apparatus 200 to the ear of the user and improve the wearing stability of the acoustic apparatus.

In some embodiments, when the user is not wearing the acoustic apparatus 200 (also referred to that the acoustic apparatus 200 is in a natural state), the first portion 211, the second portion 212 and the third portion 213 may be located on different planes. In this way, when the user is wearing the acoustic apparatus 200, the first portion 211 may cause the second portion 212 to provide a compressive force on the second side of the ear of the user. For example, when the user is wearing the acoustic apparatus 200, the first portion 211 may be located between the rear side of the ear and the head of the user, the third portion 213 may contact the second side of the ear of the user, and the third portion 213 may extend from between the ear and the head of the user to the second side (e.g., the front side of the ear) of the ear, and then cooperate with the first portion 211 to cause the third portion 213 to provide a compressive force on the front side of the ear. In some embodiments, the second portion 212 may be pressed against the area where the cymba conchae (e.g., cymba conchae 103), the triangular fossa (e.g., the triangular fossa 104), the antihelix (e.g., the antihelix 105) and other components are located under the action of the compressive force, so that when the user is wearing the acoustic apparatus 200, the acoustic apparatus 200 does not block the external auditory canal (e.g., the external auditory canal 101) of the ear. As an example, when the acoustic apparatus 200 is in the wearing state, the projection of the second portion 212 on the ear of the user may mainly fall within the range of the helix of the ear.

In some embodiments, the acoustic apparatus 200 may further include a core assembly 214, a main board assembly 215, a battery assembly 216, etc., or a combination thereof. Any two of the core assembly 214, the main board assembly 215, and the battery assembly 216 may communicate in a variety of ways, e.g., a wired connection, a wireless connection, etc., or combinations thereof. In some embodiments, the wired connection may include one or more combinations of a metallic cable, an optical cable, or a hybrid metallic and optical cable, e.g., a coaxial cable, a communication cable, a flexible cable, a spiral cable, a non-metal sheathed cable, a metal sheathed cable, a multicore cable, a twisted pair cable, a ribbon cable, a shielded cable, a telecommunication cable, a twisted cable, a parallel twin-core wire, a twisted pair, etc. The examples described above are only for convenience of description, and the medium of the wired connection may also be other types, for example, other transmission carriers of electrical signals or optical signals. The wireless connection may include radio communication, free space optical communication, acoustic communication, and electromagnetic induction, or the like. The radio communication may include IEEE1002.11 series standards, IEEE1002.15 series standards (e.g., Bluetooth technology and Zigbee technology, etc.), first-generation mobile communication technology, second-generation mobile communication technology (e.g., FDMA, TDMA, SDMA, CDMA, and SSMA, etc.), general packet radio service technology, third-generation mobile communication technologies (e.g., CDMA2000, WCDMA, TD-SCDMA, and WiMAX, etc.), fourth-generation mobile communication technologies (e.g., TD-ITE and FDD-ITE, etc.), satellite communication (e.g., GPS technology, etc.), near field communication (NFC) and other technologies operating in the ISM frequency band (e.g., 2.4 GHz, etc.). The free space optical communication may include visible light, infrared signals, etc. The acoustic communication may include sound waves, ultrasonic waves signals, etc. The electromagnetic induction may include near field communication technology, etc. The examples described above are only for convenience of illustration, and the medium of wireless connection may also be other types, for example, Z-wave technology, other chargeable civil radio frequency bands and military radio frequency bands, or the like.

In some embodiments, the core assembly 214 may be used to process a signal (e.g., an electrical signal) containing audio information to convert the signal into corresponding mechanical vibrations for generating a sound signal. The audio information may include a video, an audio file with a specific data format, or data or a file that may be converted into sound through a specific approach. The signal containing audio information may include an electrical signal, an optical signal, a magnetic signal, a mechanical signal, or the like, or a combination thereof. The processing may include frequency division, filtering, denoising, amplification, smoothing, etc., or a combination thereof. The conversion process may include the coexistence and conversion of many different types of energy. For example, an electrical signal may be directly converted into mechanical vibrations through the core assembly to produce sound. As another example, audio information may be contained in an optical signal, and a specific earphone core may convert the optical signal into a vibration signal. In some embodiments, the core assembly 214 may be disposed in the second portion 212. In some embodiments, the core assembly 214 may close to the front side (e.g., the side where the tragus 109, the cymba conchae 103, the triangular fossa 104, the antihelix 105, the scapha 106, and the helix 107 are located) of the tragus (e.g., tragus 109) of the ear of the user under compressive force. In some embodiments, the core assembly 214 may close to the second side (e.g., the side where the tragus 109, the cymba conchae 103, the triangular fossa 104, the antihelix 105, the scapha 106, and the helix 107 are located) of the ear of the user. For example, the core assembly 214 may be in contact with one or more components (e.g., the cymba conchae 103, the triangular fossa 104, the antihelix 105, the scapha 106, and the helix 107, etc.) of the upper portion of the external auditory canal of the user.

The main board assembly 215 may be used to control the sounding of the core assembly 214. In some embodiments, the main board assembly 215 may control the sounding of the core assembly 214 based on an instruction input by the user. In some embodiments, the main board assembly 215 may generate the instruction to control the core assembly 214 based on information from one or more components of the acoustic apparatus 200. For example, the main board assembly 215 may receive a voice signal of a user, e.g., "play a song." By processing the voice signal, the main board assembly 215 may generate a control instruction related to the voice signal. For example, the core assembly 214 may be controlled to obtain the song information to be played from the storage module (or other devices), and generate an electrical signal for controlling the vibration of the core assembly 214, etc. In some embodiments, main board assembly 215 may control other components of acoustic apparatus 200. For example, the main board assembly 215 may generate a control instruction to control the battery assembly 214 to provide the earphone core 210 with power for generating sound.

In some embodiments, the main board assembly 215 may include a central processing Unit (CPU), an application specific integrated circuit (ASIC), an application specific instruction set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computer (RISC), a microprocessor, or the like, or any combination.

In some embodiments, the main board assembly 215 may be disposed on any portion of the acoustic apparatus 200. For example, the main board assembly 215 may be disposed on the second portion 212. In this case, the wiring distance between the main board assembly 215 and other portions (e.g., the core assembly 214, the key switch, etc.) disposed on the second portion 212 may be shortened to reduce signal interference between the wirings and reduce the possibility of short circuit between the wirings.

The battery assembly 216 may be used to provide electrical power to other assemblies in the acoustic apparatus 200. In some embodiments, the battery assembly 216 may include a flexible circuit board, a battery, or the like. The flexible circuit board may be used to connect the battery and other assemblies in the acoustic apparatus (e.g., the core assembly 214). The battery may include an accumulator, a dry cell, a lithium cell, a denier cell, or a fuel cell, or a combination thereof. In some embodiments, the battery assembly 216 may also transmit its own state information to the main board assembly 215 and receive an instruction from the main board assembly 215 to perform a corresponding operation. The status information of the battery assembly 216 may include on/off status, remaining power, usage time of the remaining power, charging time, etc., or a combination thereof.

In some embodiments, the battery assembly 216 may be positioned anywhere on the acoustic apparatus 200. In some embodiments, the positions of one or more components in the acoustic apparatus 200 may be set based on the weights of the various portions of the acoustic apparatus 200 to balance the weights of the various portions of the acoustic apparatus 200, and improve the wearing stability and comfort of the acoustic apparatus 200. For example, the core assembly 214, the main board assembly 215, key switches, etc., may be disposed on the second portion 212. The battery assembly 216 may be disposed on the first portion 211 to enhance the convenience of interaction between the user and the acoustic apparatus 200, and increase the capacity of the battery to improve the endurance of the acoustic apparatus 200. In some embodiments, the ratio between the total weight of the second portion 212 and the weight of the part of the first portion 211 including the battery assembly 216 (hereinafter referred to as the battery portion) may be within 4:1. In some embodiments, the ratio between the total weight of the second portion 212 and the weight of the battery portion may be within 3:1. In some embodiments, the ratio between the total weight of the second portion 212 and the weight of the battery portion may be within 2.5:1. In some embodiments, the ratio between the total weight of the second portion 212 and the weight of the battery portion may be 2:1. In some embodiments, the ratio between the total weight of the second portion 212 and the weight of the battery portion may be within 1.5:1, so that the weight of the acoustic apparatus 200 may be evenly distributed at both ends, and when the user is wearing the acoustic apparatus 200, the ear of the user may be used as a fulcrum to support the acoustic apparatus 200, so that the acoustic apparatus 200 does not slip off the ear of the user.

In some embodiments, the first portion 211, the second portion 212 and/or the third portion 213 may be made of a softer material. In some embodiments, the first portion 211, the second portion 212 and/or the third portion 213 may be made of a softer texture material, a harder textured material, or the like, or a combination thereof. A softer material refers to a material having a hardness (e.g., shore hardness) less than a first hardness threshold (e.g., 15A, 20 A, 30 A, 35 A, 40 A, etc.). For example, a softer material may have a shore hardness of 45-85 A, 30-60D. A harder material refers to a material with a hardness (e.g., shore hardness) greater than a second hardness threshold (e.g., 65D, 70D, 80D, 85D, 90D, etc.). A softer material may include a polyurethanes (PU) (e.g., thermoplastic polyurethanes (TPU)), polycarbonate (PC), a polyamides (PA), an acrylonitrile-butyl acrylonitrile butadiene styrene (ABS), a polystyrene (PS), a high impact polystyrene (HIPS), a polypropylene (PP), a polyethylene terephthalate (PET), a polyvinyl chloride (PVC), a polyurethanes (PU), a polyethylene (PE), a phenol formaldehyde (PF), an urea-formaldehyde (UF), a melamine-formaldehyde (MF), a silica gel, or the like, or combinations thereof. A harder material may include a poly ester sulfones (PES), a polyvinylidene chloride (PVDC), a polymethyl methacrylate (PMMA), a poly-ether-ether-ketone, (PEEK), or the like, or a combination thereof, or a mixture thereof with a reinforcing agent such as glass fiber and carbon fiber. In some embodiments, the materials of the first portion 211, the second portion 212, the third portion 213, etc., of the acoustic apparatus 200 may be selected according to specific conditions. For example, all of the first portion 211, the second portion 212 and the third portion 213 may be made of softer materials. As another example, the part of the third portion 213 and the first portion 211 for accommodating the battery assembly 216 may be made of a harder material, and the rest may be made of a softer material, or the rest may be made of a softer material wrapped around a harder material. As another example, when the user is wearing the acoustic apparatus 200, the part of the acoustic apparatus 200 in contact with the user may be made of a softer material, and the rest of the acoustic apparatus 200 may be made of a harder material. In some embodiments, different materials may be formed by two-color injection molding, hand-feeling paint spraying, etc. The feel paint may include rubber feel paint, elastic feel paint, plastic elastic paint, etc. or combinations thereof. For example, the first portion 211 may be formed by two-color injection molding, and the elastic modulus of the first end of the first portion 211 (e.g., the end of the first portion 211 away from the third portion 213) may be smaller than the elastic modulus of other portions of the acoustic apparatus 200 to improve the deformability of the first end of the first portion 211. In the embodiment, the softer material may improve the comfort of the user when the user is wearing the acoustic apparatus 200, the harder material may increase the strength of the acoustic apparatus 200. By reasonably configuring the materials of each portion of the acoustic apparatus 200, the strength of the acoustic apparatus 200 may be improved while improving the comfort of the user.

In some embodiments, the interior of the first portion 211, the second portion 212 and/or the third portion 213, etc., of the acoustic apparatus 200 may be provided with an elastic filamentary structure to improve the structural strength of the acoustic apparatus 200. The elastic filamentary structure may include a wire (e.g., spring steel, titanium alloy, titanium nickel alloy, chromium molybdenum steel, aluminum alloy, copper alloy, etc.), a fiber filament (e.g., glass fiber, carbon fiber, etc.), etc., or combinations thereof. More descriptions of the wire, may be found in FIG. 30 and FIG. 31 and related descriptions thereof.

In some embodiments, the first portion 211, the second portion 212 and/or the third portion 213 may be provided with a surface enhancement structure 2111 for increasing the friction between the first portion 211, the second portion 212 and/or the third portion 213 and the head and/or ears of the user, and improving the wearing stability of the acoustic apparatus 200. The surface enhancement structure may include a bulge structure, a dull polish structure, a texture structure, or a hole structure, etc., or combinations thereof. As shown in FIG. 2, the surface enhancement structure 2111 may include one or more hole structures, and the hole structures may include through holes and/or blind holes. The axis direction of each hole in the hole structure may be perpendicular to the contact surface formed between the first end of the first portion 211 and the head of the user. More descriptions of the surface enhancement structure may be found in FIG. 28 and related descriptions thereof.

In order to facilitate the description of the mutual relationship of various portions of the acoustic apparatus (e.g., the acoustic apparatus 200) and the relationship between the acoustic apparatus and the user, one or more coordinate systems (e.g., the coordinate system 220 shown in FIG. 2, the coordinate system shown in FIG. 8, the coordinate system shown in FIG. 12A, etc.) are established in the application. In this application, the X-axis of the coordinate system is perpendicular to the plane where the side of the head of the user that is close to the acoustic apparatus is located, the Z axis is parallel to the direction of the jaw of the user and points to the top of the head, and the Y axis is parallel to the direction in which the back of the head of the user points to the face.

It should be noted that the above description of the acoustic apparatus 200 and its various portions is only for the convenience of description, and does not limit the present disclosure to the scope of the illustrated embodiments. It may be appreciated that those skilled in the art, after understanding the principles of the apparatus, may vary or vary the components and/or functions of the acoustic apparatus 200 according to a particular implementation without departing from such principles. For example, the third portion 123 may be omitted, and the first portion 121 and the second portion 122 may be directly connected. As another example, the third portion 123 may be part of the first portion 121. By way of example only, one end of the first portion 121 connected with the second part 122 includes a bending part, which may be wound from the first side (e.g., the side of the ear facing the head of the user) of the ear to the second side (e.g., the front side of the ear) of the ear when the user is wearing the acoustic apparatus 200. As another example, the third portion 123 may be part of the second portion 122. In some embodiments, the acoustic apparatus 200 may include one or more additional assemblies, or one or more of the assemblies described above may be omitted. For example, the acoustic apparatus 200 may include one or more microphones (e.g., microphones, pickups, etc.), one or more communication assemblies (e.g., Bluetooth, Near Field Communication (NFC), etc.), one or more key switches, one or more sensors, etc., or a combination thereof, that are electrically connected with the main board assembly 215 and the battery assembly 216 through corresponding conductors to achieve corresponding functions. Such deformations are all within the protection scope of the present disclosure.

Figure 4:
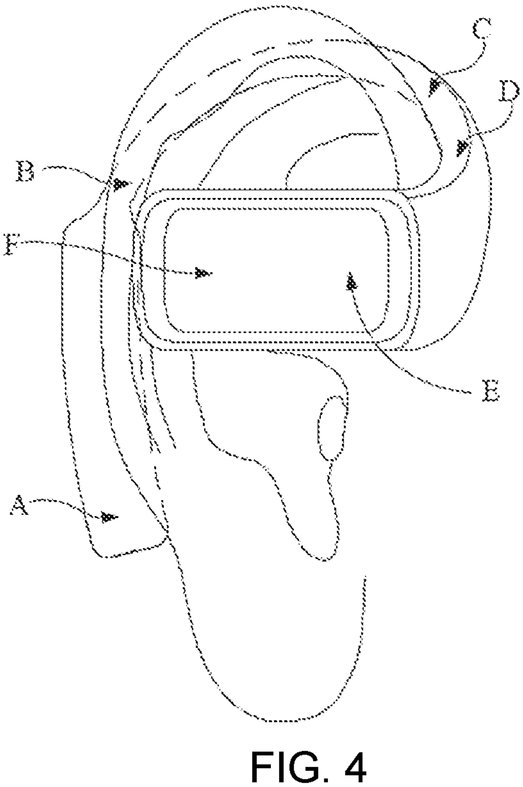
FIG. 4 is a schematic diagram illustrating a front side view when a user is wearing an exemplary acoustic apparatus according to some embodiments of the present disclosure.
Figure 5:
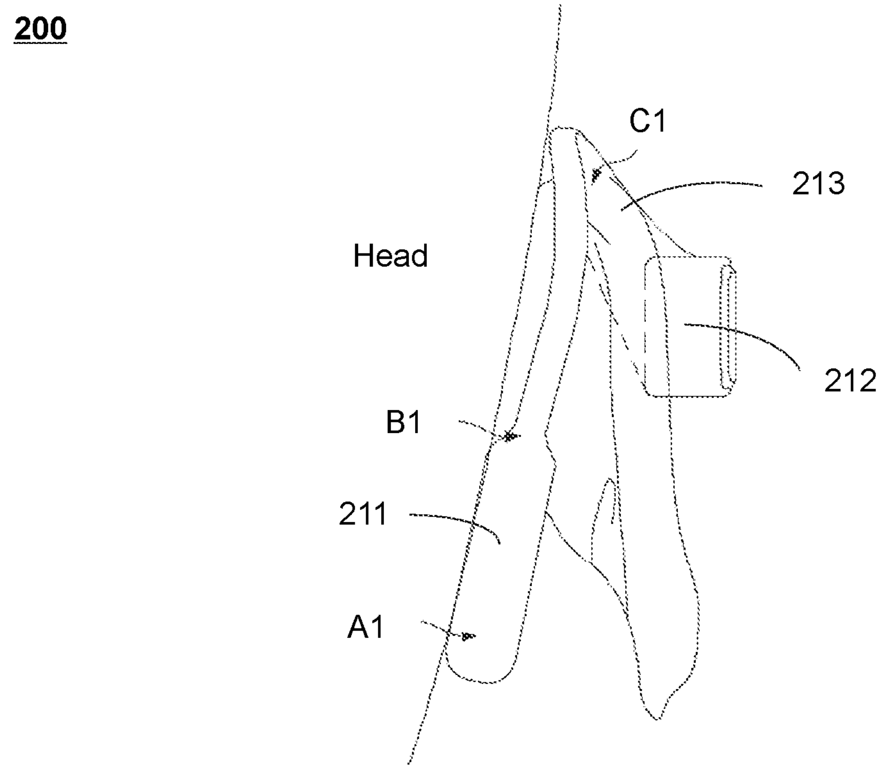
FIG. 5 is a schematic diagram illustrating a rear side view when a user is wearing an exemplary acoustic apparatus according to some embodiments of the present disclosure.

FIG. 4 is a schematic diagram illustrating a front side view when a user is wearing an exemplary acoustic apparatus 200 according to some embodiments of the present disclosure. FIG. 5 is a schematic diagram illustrating a rear side view when a user is wearing an exemplary acoustic apparatus 200 according to some embodiments of the present disclosure.

As shown in FIG. 4 and FIG. 5, when the user is wearing the acoustic apparatus 200, the first portion 211 of the acoustic apparatus 200 may be located on the first side of the ear of the user (e.g., the back side of the ear of the user), and the second portion 212 may contact the second side of the ear of the user (e.g., the front side of the ear of the user), and the third portion 213 may connect the first portion 211 and the second portion 212 and extend from between the ear and the head of the user to the front side of the ear of the user. A first contact point A1 and a second contact point B1 between the first portion 211 and the head of the user may be formed on the first portion 211. The second contact point B1 may be located between the first contact point A1 and the first connection point C1 of the first portion 211 and the third portion 213. A third contact point E1 and a fourth contact point F1 between the second portion 212 and the first side of the ear of the user may be formed on the second portion 212. In some embodiments, the positions of the first contact point A1, the second contact point B1, the third contact point E1 and the fourth contact point F1 may be determined based on the specific wearing condition of the user. For example, for different users, there are differences in the physiological structures of the head, ears, etc., the positions of the first contact point A1, the second contact point B1, the third contact point E1 and the fourth contact point F1 may be different form the positions of the first contact point A1, the second contact point B1, the third contact point E1 and the fourth contact point F1 shown in FIG. 4 and/or FIG. 5, respectively. In some embodiments, the first connection point C1 may be the location of the ear of the user close to the head (e.g., a point on the area of the ear of the user 100 enclosed by the dashed box C in FIG. 1).

In some embodiments, the pure distance between the projection of point C1 on the YZ plane and the projection of the E1 F1 segment on the YZ plane may be in the range of 10-17 mms, or in the range of 12-16 mms, or in the range of 13-15 mms, or in the range of 12-14 mms, or in the range of 11-12 mms, etc. In some embodiments, the angle between the projection of segment B1C1 on the XY plane and the projection of segment D1E1 on the XY plane may be in the range of 0-25°, or in the range of 0-20°, or in the range of 2-20° range, or in the range of 2-15°, or in the range of 5-10°, or in the range of 6-9°, etc. In some embodiments, the angle between segment A1B1 and the normal on the XY plane passing through point B1 may be in the range of 0-25°, or in the range of 0-20°, or in the range of 2-20°, or in the range of 2-15°, or in the range of 5-10°, or in the range of 6-9°, etc. In some embodiments, the pure distance between the projection of point C1 on the XY plane and the projection of segment E1F1 on the XY plane may be in the range of 2-4 mm, e.g., 2.5 mm, 2.8 mm, 3 mm, 3.5 mm, etc.

Figure 6:
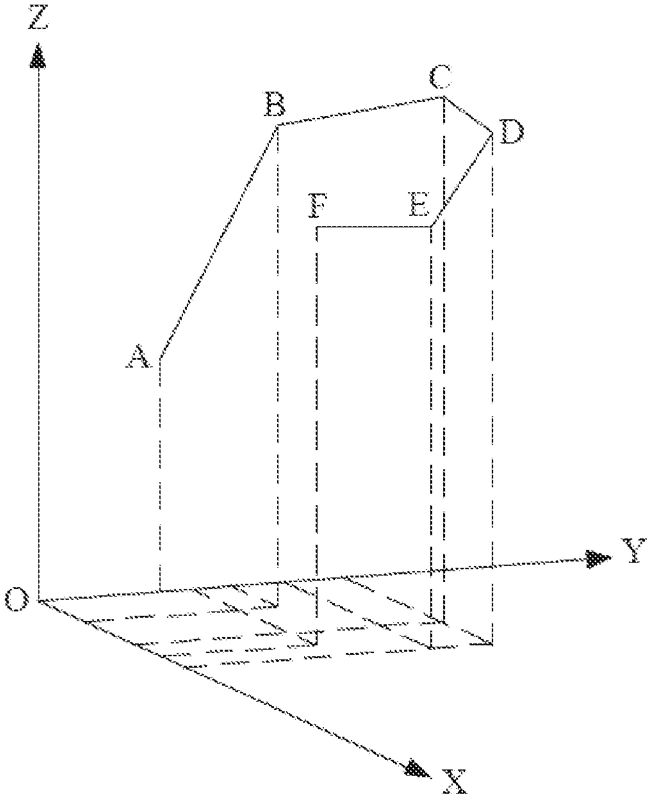
FIG. 6 is a schematic diagram illustrating a mechanical model when a user is wearing an exemplary acoustic apparatus according to some embodiments of the present disclosure.

FIG. 6 is a schematic diagram illustrating a mechanical model when a user is wearing an exemplary acoustic apparatus 200 according to some embodiments of the present disclosure. As shown in FIG. 6, the YZ plane may be parallel to the plane where the side of the head of the user in contact with the acoustic apparatus is located. The segment A1B1C1 corresponds to the first portion 211, the segment E1F1 corresponds to the second portion 212, and the segment C1D1 corresponds to the third portion 213 in the FIG. 6. When the user is wearing the acoustic apparatus 200, the segment A1B1C1 may be located at the first side of the ear of the user, the segment E1F1 may be located at the second side of the ear of the user, the segment C1D1 may be adapted to the thickness of the ear of the user, and the segment D1E1 may be located at the second side of the ear of the user, and the segment D1E1 may be a transition segment between the second portion 212 and the third portion 213. In some embodiments, the segment B1C1, the segment C1D1, and the segment E1F1 may form a structure having a "hook" (or "hook-like") shape to enable the acoustic apparatus 200 to be hooked on the ear of the user. In some embodiments, the first contact point A1, the second contact point B1, the third contact point E1, and the fourth contact point F1 may be contact points formed on the acoustic apparatus 200 when the head or ear of the user contacts the acoustic apparatus 200 when the user is wearing the acoustic apparatus 200. In some embodiments, the first contact point A1, the second contact point B1, the third contact point E1, and the fourth contact point F1 may be defined points in a mechanical model (e.g., the mechanical model shown in FIG. 6).

As shown in FIG. 6, the first end of the first portion 211 (e.g., the end of the first portion 211 away from the third portion 213) may be bent toward the head of the user so that the first portion 211 may form a lever structure with the second contact point B1 as a fulcrum. At this time, the first end of the first portion 211 may be pressed against the head of the user, and the head of the user may provide a force at the second contact point B1 and the force points from the head to outside. The force at the second contact point B1 may be converted into a force directed to the head at the first connection point C through the lever structure, and the force directed to the head may cause the second portion 212 to provide a compressive force on the second side of the ear through the third portion 213.

In some embodiments, when the user is not wearing the acoustic apparatus 200, the angle between the first end of the first portion 211 (e.g., the end of the first portion 211 away from the third portion 213) and a reference plane may be greater than the angle between the first end of the first portion 211 and the reference plane when the user is wearing the acoustic apparatus 200. The reference plane may be the plane on which the side of the head of the user contacts the acoustic apparatus (e.g., the YZ plane in FIG. 6), and on which the surface (e.g., the surface of the second portion 212 facing the ear of the user may also be referred to as the inner surface of the second portion 212) of the second portion 212 is located, etc. In some embodiments, the larger the angle formed between the first end of the first portion 211 and the reference plane is when the user is not wearing the acoustic apparatus, the better the first end of the portion 211 may press against the head of the user when the user is wearing the acoustic apparatus, the correspondingly greater the force pointing from the heat to outside that the head of the user can provide at the second contact point B1 is.

In some embodiments, when the first end of the first portion 211 is pressed against the head of the user, in addition to causing the head of the user to provide a force directed from the head to outside at the second contact point B1, at least the segment B1C1 of the first portion 211 may form another compressive force on the first side of the ear, and may cooperate with the compressive force formed by the second portion 212 on the second side of the ear, so that the compression effect of "front and rear pinching" may be formed on the ear of the user to improve the wearing stability of the acoustic apparatus 200.

Figure 7:
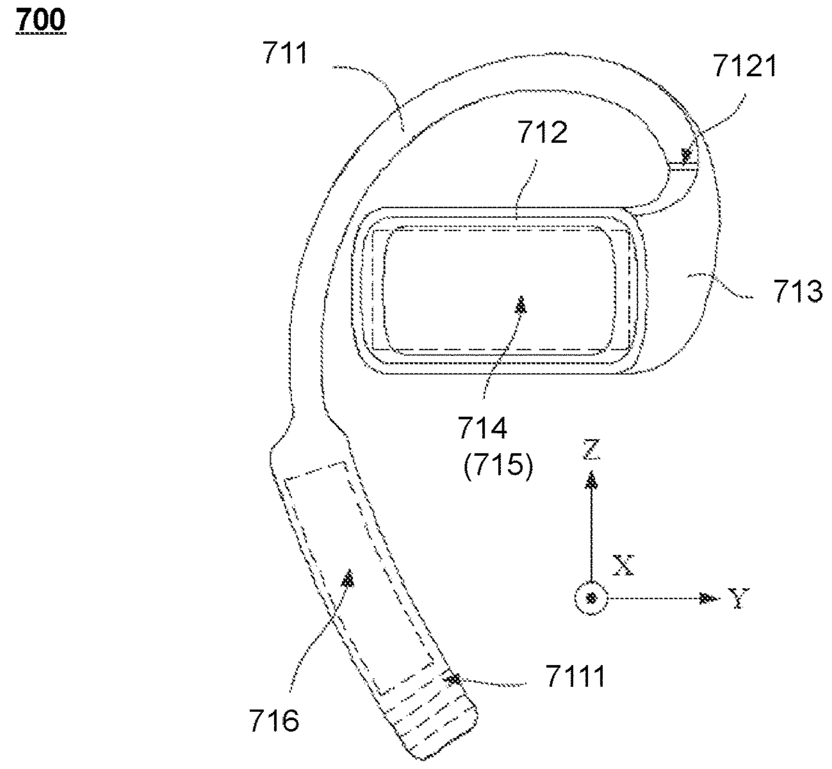
FIG. 7 is a front view illustrating an exemplary acoustic apparatus according to some embodiments of the present disclosure.
Figure 8:
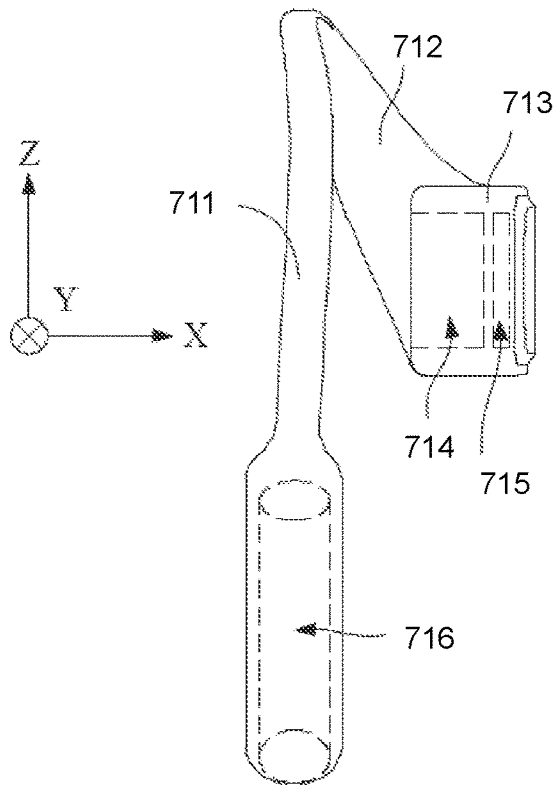
FIG. 8 is a left view illustrating the acoustic apparatus in FIG. 7 according to some embodiments of the present disclosure.

FIG. 7 is a front view illustrating an exemplary acoustic apparatus according to some embodiments of the present disclosure. FIG. 8 is a left view illustrating the acoustic apparatus in FIG. 7.

As shown in FIG. 7 and FIG. 8, the acoustic apparatus 700 may include a first portion 711, a second portion 712, and a third portion 713. The first portion 711 and the second portion 712 may be connected by the third portion 713. In some embodiments, the first portion 711 and the third portion 713 may be connected by a shaft assembly 7121. The first portion 711 may be rotated relative to the third portion 713 through the shaft assembly 7121, so that the position of the first portion 711 may be adjusted according to the specific conditions of the ear of the user (e.g., size, shape, thickness, etc.), and the wearing stability of the acoustic apparatus may be improved. More descriptions of the shaft assembly 7121 may be found in FIGS. 32-38 and related descriptions thereof. The first portion 711 may include a battery assembly 716. A first end of the first portion 711 (e.g., an end away from the third portion 713) may be provided with a striped surface enhancement structure 7111. The second portion 712 may include a core assembly 714, a main board assembly 715, or the like. The components (e.g., the first portion 711, the second portion 712, the third portion 713, the battery assembly 716, the core assembly 714, the main board assembly 715, etc.) of the acoustic apparatus 700 may be the same or similar to the corresponding components (e.g., the first portion 211, the second portion 212, the third portion 213, the battery assembly 216, the core assembly 714, the main board assembly 715, etc.) of the acoustic apparatus 200, respectively. More descriptions of the acoustic apparatus 700 and the portions may be found in the acoustic apparatus 200 and related descriptions thereof.

Figure 9:
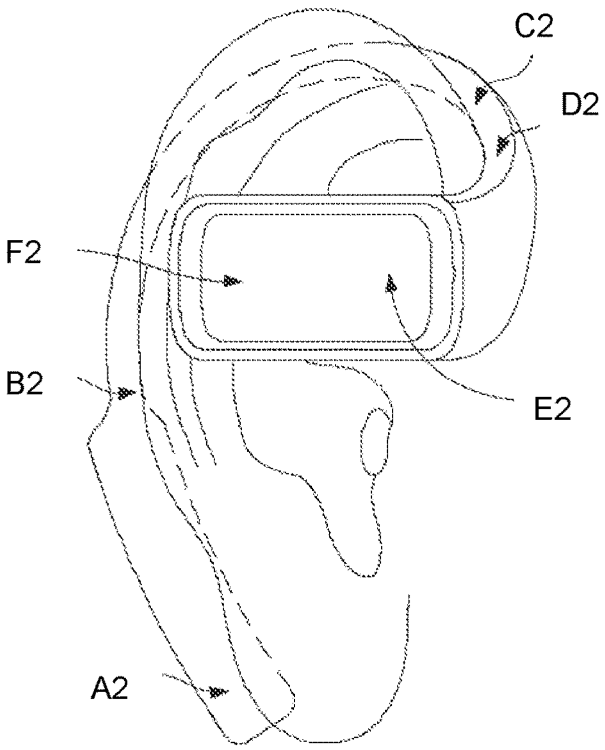
FIG. 9 is a schematic diagram illustrating a front side view when a user is wearing an exemplary acoustic apparatus according to some embodiments of the present disclosure.
Figure 10:
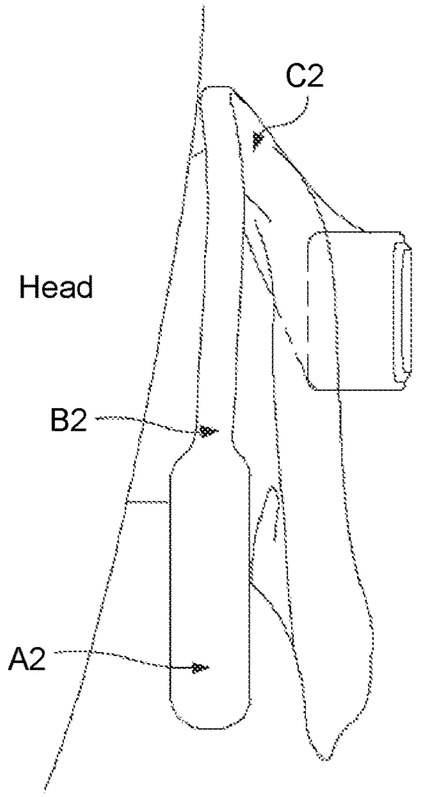
FIG. 10 is a schematic diagram illustrating a rear side view when a user is wearing the exemplary acoustic apparatus according to some embodiments of the present disclosure.

FIG. 9 is a schematic diagram illustrating a front side view when a user is wearing an exemplary acoustic apparatus 700 according to some embodiments of the present disclosure. FIG. 10 is a schematic diagram illustrating a rear side view when a user is wearing the exemplary acoustic apparatus 700 according to some embodiments of the present disclosure.

As shown in FIG. 9 and FIG. 10, the first portion 711 of the acoustic apparatus 711 is closer to the second portion 712 when the user is wearing the acoustic apparatus 200. When the user is wearing the acoustic apparatus 700, the first end (e.g., the end of the first portion 711 away from the third portion 713) of the first portion 711 of the acoustic apparatus 700 may be in contact with the first side (e.g., the side of the ear of the user facing the head of the user) of the ear of the user instead of the head of the user.

Figure 11A:
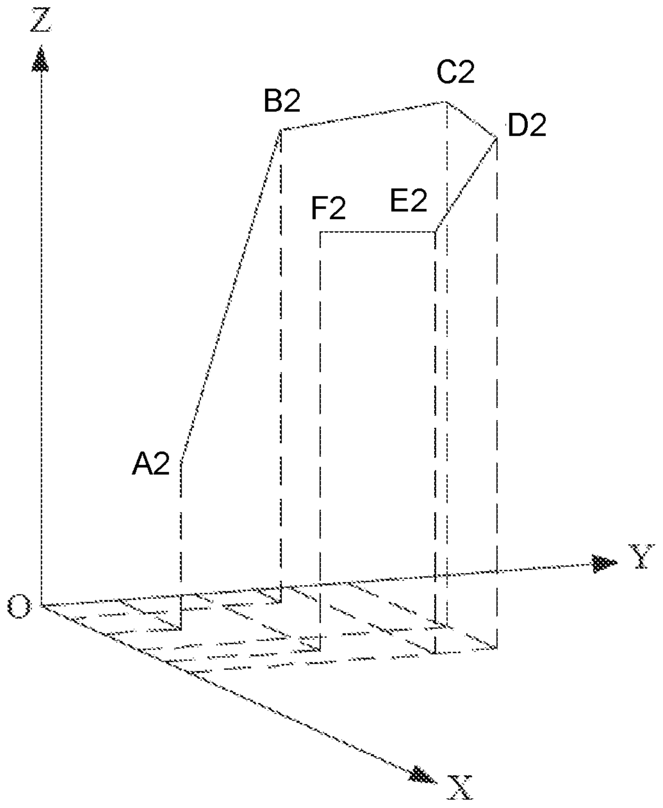
FIG. 11A is a schematic diagram illustrating a mechanical model when a user is wearing an exemplary acoustic apparatus according to some embodiments of the present disclosure.

When the user is wearing the acoustic apparatus 700, the first portion 711 may be located at the first side of the ear of the user (e.g., the back side of the ear of the user), and a first contact point A2 and a second contact point B2 between the first portion 711 and the first side of the ear of the user may be formed on the first portion 711. The second portion 712 may be in contact with the second side of the ear of the user (e.g., the front side of the ear of the user), and a third contact point E2 and a fourth contact point F2 may be formed on the second portion 712. The third portion 713 may be in contact with the ear of the user, and a fifth contact point D2 may be formed on the third portion 713. In some embodiments, the first connection point C2 may be the location of the ear of the user close to the head (e.g., a point on the area of the ear of the user 100 enclosed by the dashed box C in FIG. 1). When the user is not wearing the acoustic apparatus 700, the distance between the first contact point A2 and the second contact point F2 (e.g., along the extension direction of the third portion 713) may be smaller than the distance between the first contact point A2 and the second contact point F2 (e.g., along the extension direction of the third portion 713) when the user is wearing the acoustic apparatus 700 to cause the second portion 712 to provide a compressive force on the second side of the ear of the user. In other words, when the user is not wearing the acoustic apparatus 700, the distance between the first contact point A2 and the second contact point F2 along the direction parallel to the third portion 713 may be smaller than the thickness of the ear of the user, so that when the user is wearing the acoustic apparatus 700, the back side of the ear of the user may provide a force to the acoustic apparatus 700 at the second contact point B2, and the force at the second contact point B2 may be converted into a force directed to the ear at the first connection point C2 through the lever structure, and the force at the first connection point C2 may cause the second portion 212 to provide a compressive force on the second side of the ear through the third portion 213, thereby enabling the acoustic apparatus 700 to be clamped to the ear of the user like a "clip". FIG. 11A is a schematic diagram illustrating a mechanical model when a user is wearing the acoustic apparatus 700. As shown in FIG. 11A, when the user is wearing the acoustic apparatus 700, the first portion 711 may be located on the first side of the ear of the user, and a second contact point B2 between the first portion 711 and the ear of the user may be formed on the first portion 711. The point B2 may be located between the first contact point A2 and the first connection point C2, and may be close to the first connection point C2. The second portion 712 may be in contact with the second side of the ear of the user and a third contact point E2 and a fourth contact point F2 may be formed on the second portion 712. The third portion 713 may be in contact with the ear of the user and a fifth contact point D2 may be founded on the third portion 713. In some embodiments, the first contact point A2, the second contact point B2, the third contact point E2, the fourth contact point F2 and the fifth contact point D2 may refer to the defined points in the mechanical model shown in FIG. 11. In some embodiments, the positions of the first contact point A2, the second contact point B2, the third contact point E2, the fourth contact point F2 and the fifth contact point D2 may be determined based on the specific wearing condition of the user. For example, for different users, there are differences in the physiological structures of the head, ears, etc., the positions of the first contact point A2, the second contact point B2, the third contact point E2, the fourth contact point F2 and the fifth contact point D2 may be different form the positions of the first contact point A2, the second contact point B2, the third contact point E2, the fourth contact point F2 and the fifth contact point D2 shown in FIG. 4 and/or FIG. 5, respectively.

When the user is not wearing the acoustic apparatus, the distance between the projections of the first contact point A2 and the second contact point B2 on the reference plane perpendicular to the extension direction of the third portion 713 may be smaller than the distance between the projections of the first contact point A2 and the second contact point B2 on the reference plane perpendicular to the extension direction of the third portion 713 when the user is wearing the acoustic apparatus. In this way, not only may the first end of the first portion 711 (e.g., the end of the first portion 711 away from the third portion 713) press against the first side of the ear of the user, but the segment A2B2C2 may have a C-shape (or similar C-shape), the first contact point A2 may also be located in the area of the ear close to the earlobe, so that the first portion 711 may clamp the ear of the user in the vertical direction (e.g., the direction of the Z axis) to balance the self-weight of the second portion 712. In addition, the parameters (e.g., length, radius, shape, etc.) of the first portion 711 may be set according to actual needs. For example, by setting the length of the first portion 711, the first portion 711 can not only clamp the ear of the user from the vertical direction, but also can increase the contact area between the first portion 711 and the ear of the user, thereby increasing the friction force between the first portion 711 and the ear of the user, and improving the wearing stability of the acoustic apparatus 700. As another example, in order to prevent the first portion 711 may only form one single contact point (e.g., second contact point B2) with ears of users when the users with ears of different sizes and shapes wears the acoustic apparatus 700, that is, the first end of the first portion 711 may be not in contact with the ears of the users, thereby reducing the wearing stability of the acoustic apparatus 700, the outer diameter of one or more portions (e.g., battery portion) of the first portion 711 may be set larger than the outer diameter of other portions of the first portion 711 to form a necking structure (or similar necking), so that the first contact point A2 and a second contact point B2 between the first portion 711 and the ear of the user may be formed on the first portion 711 Thus, the wearing stability of the acoustic apparatus 700 is improved, and the adaptability of the acoustic apparatus 700 is improved.

In some embodiments, the ratio of the length of the portion of the first portion 711 for accommodating the battery assembly 716 to the outer diameter of the first portion 711 may also affect the contact and/or fit of the first portion 711 with the ear of the user. In some embodiments, the ratio of the length of the portion of the first portion 711 for accommodating the battery assembly 716 to the outer diameter of the first portion 711 may be within 6:1. In some embodiments, the ratio of the length of the portion of the first portion 711 for accommodating the battery assembly 716 to the outer diameter of the first portion 711 may be within 5:1. In some embodiments, the ratio of the length of the portion of the first portion 711 for accommodating the battery assembly 716 to the outer diameter of the first portion 711 may be within 4:1. In some embodiments, the ratio of the length of the portion of the first portion 711 for accommodating the battery assembly 716 to the outer diameter of the first portion 711 may be within 3:1. In some embodiments, the ratio of the length of the portion of the first portion 711 for accommodating the battery assembly 716 to the outer diameter of the first portion 711 may be within 2:1. In this way, a first contact point A2 and a second contact point B2 between the first portion 711 and the ear of the user may be formed on the first portion 711, thereby improving the fit between the first portion 711 of the acoustic apparatus 700 and the ear of the user, and improving the wearing stability of the acoustic apparatus 700.

Figure 11B:
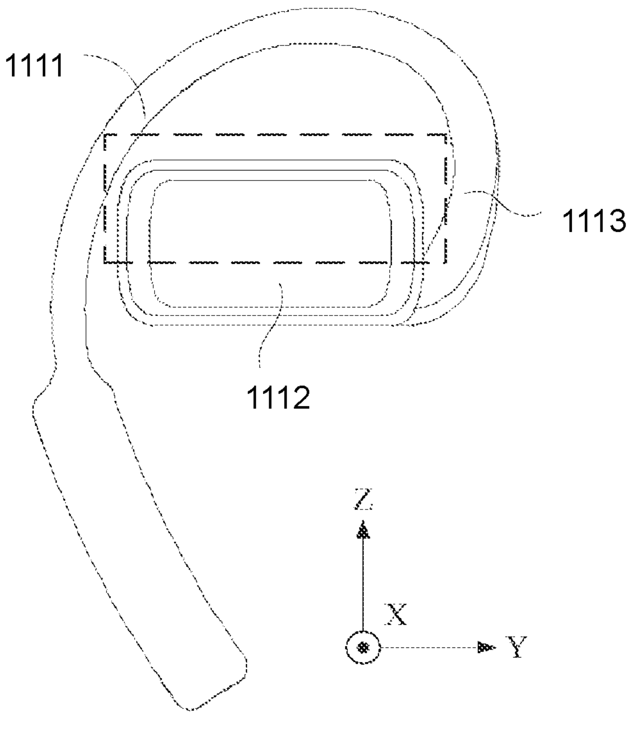
FIG. 11B is a schematic diagram illustrating an exemplary acoustic apparatus according to some embodiments of the present disclosure.

FIG. 11B is a schematic diagram illustrating an exemplary acoustic apparatus according to some embodiments of the present disclosure.

As shown in FIG. 11B, the acoustic apparatus 1100 may include a first portion 1111, a second portion 1112, and a third portion 1113. The connection position of the third portion 1113 and the second portion 1112 may be set according to actual needs. In some embodiments, the third portion 1113 may be connected with an upper portion of the second portion 1112 (e.g., the portion of the acoustic apparatus 1100 away from the earlobe of the user when the user is wearing the acoustic apparatus 1100). For example, the third portion 1113 may be connected with the upper surface of the second portion 1112, the portion of the inner surface close to the upper surface, the junction between the inner surface and the upper surface, the portion of the rear surface close to the upper surface, the junction between the rear surface and the upper surface, etc. In some embodiments, the third portion 1113 may be connected with the middle part of the second portion 1112. For example, the third portion may be connected with the middle part of the inner surface, the middle part of the rear surface, the middle part of the front surface, the middle part of the outer surface, etc., of the second portion 1112. In some embodiments, the third portion 1113 may be connected with a lower part of the second portion 1112 (e.g., the portion of the acoustic apparatus 1100 that is close to the earlobe of the user when the user is wearing the acoustic apparatus 1100). For example, the third portion 1113 may be connected with the lower surface of the second portion 1112, the portion of the inner surface near the lower surface, the junction between the inner surface and the lower surface, the portion of the rear surface near the lower surface, the junction between the rear surface and the lower surface, etc., so that the upper half of the second portion (the portion shown by the dashed box in FIG. 11B) is not bound by the third portion 1113, thereby offsetting the turning moment of the second portion 1112 directed from the ear to outside, improving the comfort and wearing stability of the acoustic apparatus 1100. More descriptions of each surface of the second portion 1112 may be found in FIG. 12A and related descriptions thereof.

Figure 12A:
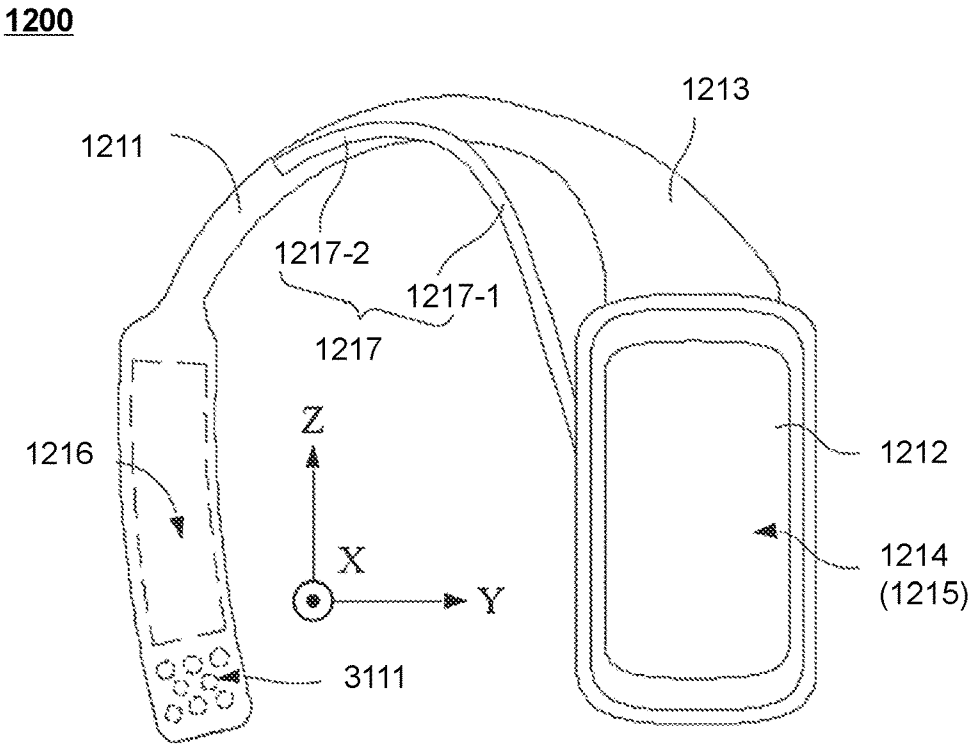
FIG. 12A is a front view illustrating an exemplary acoustic apparatus according to some embodiments of the present disclosure.
Figure 12B:
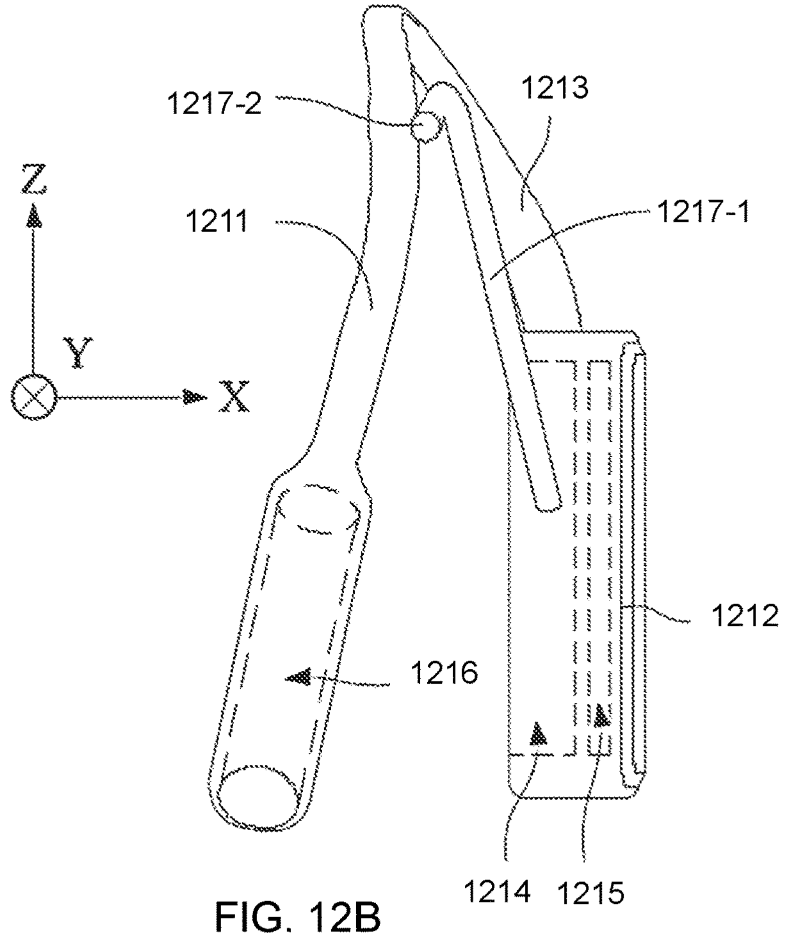
FIG. 12B is a left view illustrating the acoustic apparatus of FIG. 12A according to some embodiments of the present disclosure.

FIG. 12 is a front view illustrating an exemplary acoustic apparatus according to some embodiments of the present disclosure. FIG. 12B is a left view illustrating the acoustic apparatus of FIG. 12A.

As shown in FIG. 12A and FIG. 12B, the acoustic apparatus 1200 may include a support assembly (including a first portion 1211 and a second portion 1212), a third portion 1213, a core assembly 1214, a main board assembly 1215, and a battery assembly 1216. The structure of the acoustic apparatus 1200 may be similar to the acoustic apparatus 200 described in FIGS. 2 to 5. Different from the acoustic apparatus 200, the acoustic apparatus 1200 may further include an auxiliary portion 1217. In some embodiments, the auxiliary portion 1217 may be physically connected with the second portion 1212. When the user is wearing the acoustic apparatus 1200, the auxiliary portion 1217 may be used to abut against at least a part of the area of the ear of the user to restrict the movement of the second portion 1212 (e.g., shown in FIG. 14 along the direction shown by arrow K), thereby improving the wearing stability of the acoustic apparatus 1200. The movement of the second portion 1212 may include horizontal movement, vertical movement, rotational movement, flipping movement, etc., or a combination thereof. For the convenience of description, when the user is wearing the acoustic apparatus, the side of the second portion 1212 in contact with the second side of the ear of the user (e.g., the front side of the ear of the user) may be defined as an inner surface, and the side of the second portion 1212 opposite to the inner surface may be defined as the outer surface. For example, the outer surface and the inner surface may be disposed opposite to each other in the X direction. The side of the second portion 1212 connected with the first portion 1211 may be defined as the upper surface, and the side of the second portion 1212 opposite to the upper surface of the second portion 1212 in the major axis direction (e.g., Z-axis direction) may be defined as the lower surface. The side of the second portion 1712 close to the ear of the user may be defined as the rear surface, and the side of the second portion 1212 opposite to the rear surface in the minor axis direction (e.g., Y-axis direction) may be defined as the front surface. In some embodiments, the inner surface, outer surface, upper surface, lower surface, front surface and/or rear surface may be provided with chamfered and/or rounded corners. In some embodiments, the second portion 1212 may include a major axis and a minor axis, and the major axis may be perpendicular to the minor axis. For example, as shown in FIG. 12A and FIG. 12B, the major axis direction of the second portion 1212 may be parallel to the Z axis direction, and the minor axis direction may be parallel to the Y axis direction. When the dimension of the second portion 1212 in the major axis direction is greater than or equal to its dimension in the minor axis direction, the shape of the second portion 1212 may include a rectangular parallelepiped, a cube, a cylinder, an elliptical cylinder, a sphere, or the like. When the shape of the second portion 1212 is a rectangular parallelepiped, the projection of the inner and/or outer surface of the second portion 1212 on the YZ plane may be a rectangle or a substantially rectangular shape. When the shape of the second portion 1212 is an elliptical cylinder, the projection of the inner and/or outer surface of the second portion 1212 on the YZ plane may be elliptical or substantially elliptical. When the second portion 1212 is in the shape of a cube, the projection of the inner and/or outer surface of the second portion 1212 on the YZ plane may be square or approximately square. When the shape of the second portion 1212 is a cylinder, the projection of the inner and/or outer surface of the second portion 1212 on the YZ plane may be circular or approximately circular. When the shape of the second portion 1212 is an elliptical cylinder, a cylinder, etc., the upper surface, the lower surface, the rear surface and the front surface of the second portion 1212 may be collectively defined as a peripheral surface.

Figure 13:
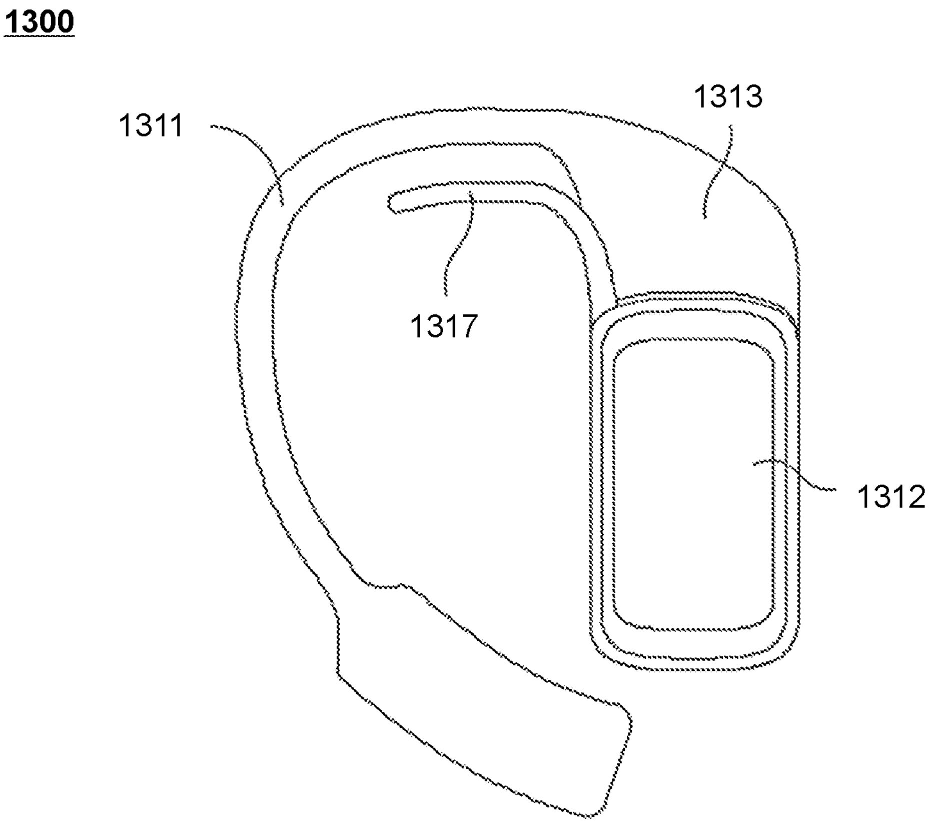
FIG. 13 is a schematic diagram illustrating an exemplary acoustic apparatus according to some embodiments of the present disclosure.

In some embodiments, the auxiliary portion 1217 may be connected with any surface of the second portion 1212. For example, the auxiliary portion 1217 may be connected with one of the upper surface, the rear surface, and the lower surface of the second portion 1212. For the convenience of description, FIG. 13 may be used as an example for illustration. FIG. 13 is a schematic diagram illustrating an exemplary acoustic apparatus according to some embodiments of the present disclosure. As shown in FIG. 13, the acoustic apparatus 1300 may include a first portion 1311, a second portion 1312, the third portion 1313 and the auxiliary portion 1317. The auxiliary portion 1317 may be connected with the junction between the upper surface and the rear surface of the second portion 1312. As another example, the auxiliary portion 1217 may be connected with the junction of the rear surface and the lower surface of the second portion 1212.

In some embodiments, the auxiliary portion 1217 may include a support segment 1217-1 and a contact segment 1217-2 connected with the support segment 1217-1. In some embodiments, the support segment 1217-1 may be connected with the second portion 1212. For example, the support segment 1217-1 may be connected with the junction of the upper surface and rear surface of the second portion 1212. As another example, the support segment 1217-1 may be connected with the rear surface of the second portion 1212. As another example, the support segment 1217-1 may be connected with the junction of the rear surface and the lower surface of the second portion 1212. In some embodiments, the connection between the support segment 1217-1 and the contact segment 1217-2 and/or between the auxiliary portion 1217 (e.g., the contact segment 1217-2 of the auxiliary portion 1217) and the second portion 1212 may include a plug connection, a snap connection, a screw connection, an adhesive connection, a welding connection, a riveting connection, a key connection, a bolt connection, a buckle connection, a hinge connection, etc., or any combination thereof. In some embodiments, the support segment 1217-1 and the contact segment 1217-2 and/or the auxiliary portion 1217 and the second portion 1212 may be integrally formed. In some embodiments, the dimension of the second portion 1212 in the Z-axis direction may be 22-28 mm and the dimension in the X-axis direction may be 8-15 mm, such that the distance between the connection point formed by the support segment 1217-1 and the second portion 1212 and the inner surface of the second portion 1212 may be 0-9 mm, and the distance between the connection point and the upper surface of the second portion 1212 may be 0-20 mm.

In some embodiments, the angle formed between the extension direction of the support segment 1217-1 and the major axis direction of the second portion 1212 may be in the range of 0° to 30°, so that the contact segment 1217-2 may be abut against inside of the concha (e.g., the scapha 106 shown in FIG. 1) of the ear of the user. In some embodiments, the angle formed between the projection of the support segment 1217-1 on the reference plane perpendicular to the major axis direction of the second portion 1212 and the minor axis direction of the second portion may be in the range of 0° to 60°, so that the auxiliary portion 1217 may clamp the ear of the user together with the first portion 1211 when the user is wearing the acoustic apparatus, thereby improving the wearing stability of the acoustic apparatus 1200.

Figure 14:
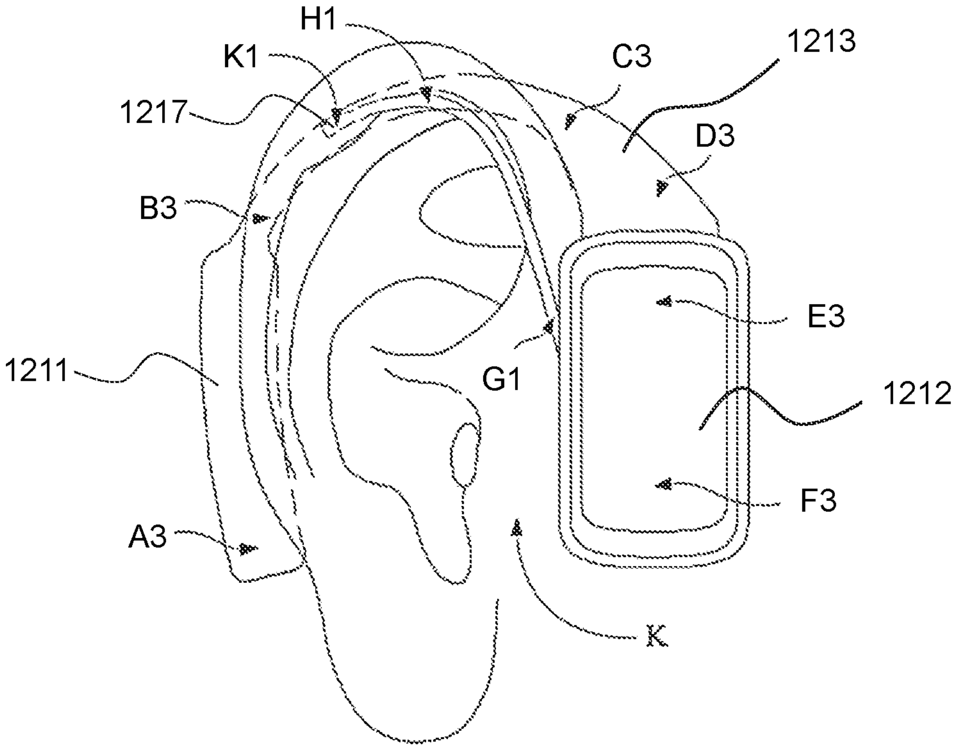
FIG. 14 is a schematic diagram illustrating a front side view when a user is wearing an exemplary acoustic apparatus according to some embodiments of the present disclosure.
Figure 15:
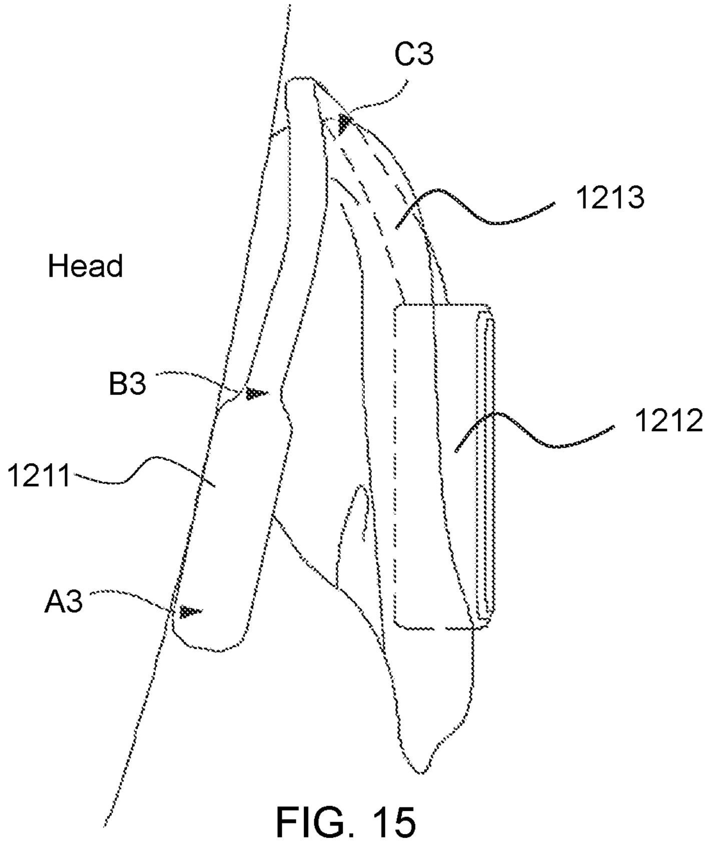
FIG. 15 is a schematic diagram illustrating a rear side view when a user is wearing an exemplary acoustic apparatus according to some embodiments of the present disclosure.

FIG. 14 is a schematic diagram illustrating a front side view when a user is wearing an exemplary acoustic apparatus according to some embodiments of the present disclosure. FIG. 15 is a schematic diagram illustrating a rear side view when a user is wearing an exemplary acoustic apparatus according to some embodiments of the present disclosure.

As shown in FIG. 14 and FIG. 15, the user wearing the acoustic apparatus 1200 may be similar to the user is wearing the acoustic apparatus 200 shown in FIG. 4 and FIG. 5, and a first contact point A3 and a second contact point B3 between the first portion 1211 and the first side of the head of the user may be formed on the first portion 1211. The second contact point B3 may be located between the first contact point A3 and the first connection point C3 between the first portion 1211 and the third portion 1213. A contact point E3 and a contact point F3 between the second portion 1212 and the second side (e.g., the front side of the ear of the user) of the ear of the user may be formed on the second portion 1212. Different form FIG. 4 and FIG. 5, when the user is wearing the acoustic apparatus in FIG. 14 and FIG. 15, the contact segment 1217-2 of the auxiliary portion 1217 of the acoustic apparatus may be in contact with the ear of the user and a contact point K1 and a contact point H1 may be formed on the contact segment 1217-2. When the user is wearing the acoustic apparatus 1200, the ear of the user may provide a force on the auxiliary portion 1217 at the contact point K1 and/or the contact point H1, and the force may act on the second portion 1212 through the auxiliary portion 1217, so that the second portion 1212 may not move in a direction close to the ear of the user, thereby improving the wearing stability of the acoustic apparatus 1200.

Figure 16:
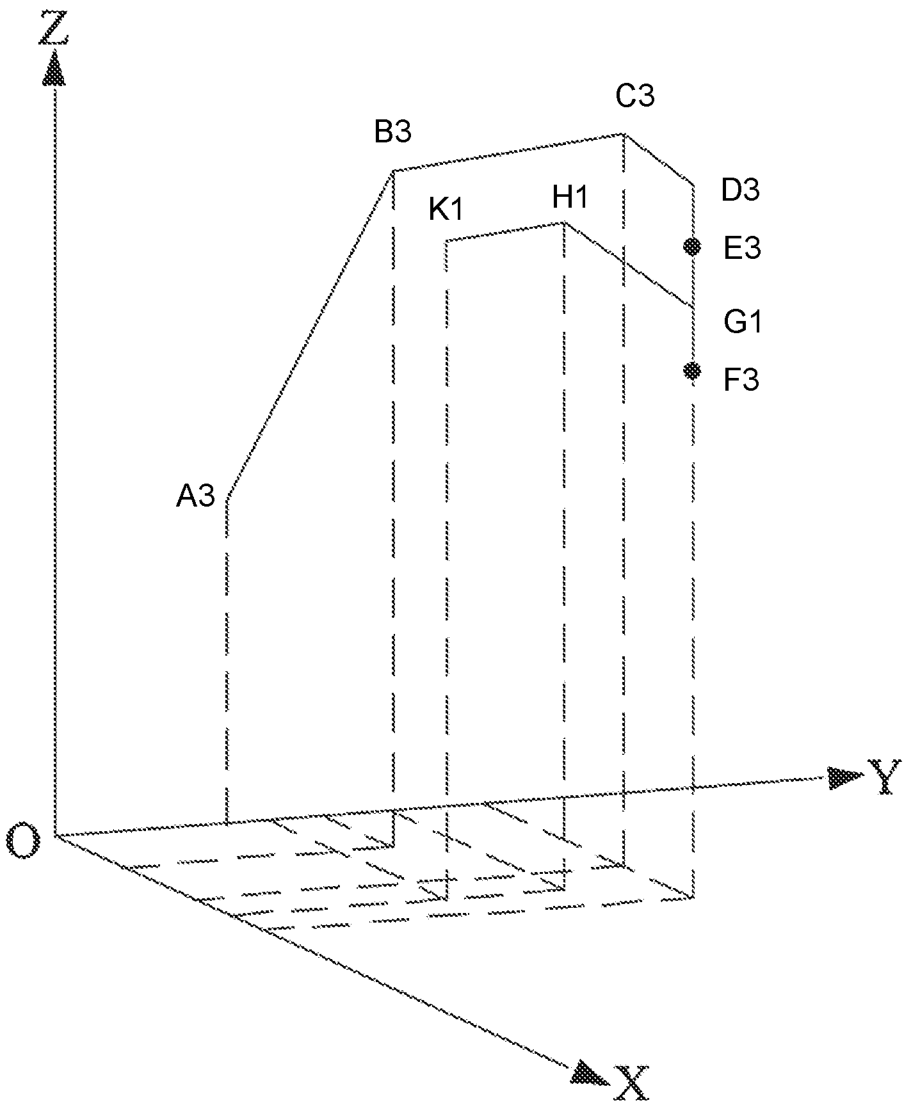
FIG. 16 is a schematic diagram illustrating a mechanical model when a user is wearing an exemplary acoustic apparatus according to some embodiments of the present disclosure.

FIG. 16 is a schematic diagram illustrating a mechanical model when a user is wearing an exemplary acoustic apparatus according to some embodiments of the present disclosure.

As shown in FIG. 16, the segment A3B3C3 may correspond to the first portion 1211, the segment E3F3 may correspond to the second portion 1212, the segment C3D3 may correspond to the third portion 1213, and the segment G1H1K1 may correspond to the auxiliary portion 1217. When the user is wearing the acoustic apparatus 1200, the segment A3B3C3 may be located on the first side of the ear of the user (e.g., the back side of the ear), the segment E3F3 may be located on the second side of the ear of the user (e.g., the front side of the ear), the segment C3D3 may be adapted to the thickness of the ear of the user, and the segment D3E3 may be a transition segment between the third portion 1213 and the second portion 1212, located on the second side of the ear of the user. At this time, the segment B3C3, the segment C3D3, and the segment E3F3 may form a structure having a "hook" (or similar to "hook") shape so that the acoustic apparatus 1200 may be hooked on the ear of the user. The segment G1H1K1 may be located on the second side of the ear of the user and may extend into the concha of the ear.

In some embodiments, the pure distance between the projection of the C3 point on the YZ plane and the projection of the segment E3F3 on the YZ plane (which may also be regarded as the length of the segment DE) may be 10-17 mm. In some embodiments, the pure distance between the projection of the C3 point on the YZ plane and the projection of the segment E3F3 on the YZ plane (which may also be regarded as the length of the segment D3E3) may be 12-16 mm. In some embodiments, the pure distance between the projection of the C3 point on the YZ plane and the projection of the segment E3F3 on the YZ plane (which may also be regarded as the length of the segment D3E3) may be 13-15 mm. In some embodiments, the angle between the projection of the segment B3C3 on the XY plane and the Y direction may be 0-25°. In some embodiments, the angle between the projection of the segment B3C3 on the XY plane and the Y direction may be 0-20°. In some embodiments, the angle between the projection of the segment B3C3 on the XY plane and the Y direction may be 2-20°. In some embodiments, the angle between the segment A3B3 and the normal line (that is the vertical line) on the XY plane passing through the Point B3 may be 0-25°. In some embodiments, the angle between the segment A3B3 and the normal on the XY plane passing through point B3 may be 0-20°. In some embodiments, the angle between the segment A3B3 and the normal on the XY plane passing through point B3 may be 2-20°. In some embodiments, the pure distance between the projection of the C3 point on the XY plane and the projection of the segment E3F3 on the XY plane (which may also be regarded as the length of the segment C3D3) may be 0-5 mm. In some embodiments, the pure distance between the projection of point C3 on the XY plane and the projection of segment E3F3 on the XY plane may be 2-4 mm. In some embodiments, the pure distance between the projection of point C3 on the XY plane and the projection of segment E3F3 on the XY plane may be 2.8 mm. In some embodiments, the angle between the projection of the segment G1H1 on the YZ plane and the Z-axis direction may be 0-60°. In some embodiments, the angle between the projection of the segment G1H1 on the YZ plane and the Z-axis direction may be 0-30°. In some embodiments, the angle between the projection of the segment G1H1 on the YZ plane and the Z-axis direction may be 0-10°. In some embodiments, the angle between the projection of the segment G1H1 on the XY plane and the Y-axis direction may be −30°-60°. In some embodiments, the angle between the projection of the segment G1 H1 on the XY plane and the Y-axis direction may be 0-60°. In some embodiments, the angle between the projection of the segment G1H1 on the XY plane and the Y-axis direction may be 0-30°. For the specific description of the segment A3B3C3, the segment C3D3, and the segment E3F3, reference may be made to the segment A1B1C1, the segment C1D1, and the segment E1F1 and related descriptions in FIG. 6.

In some embodiments, when the first portion 1211 is hung on the first side of the ear of the user, the first portion 1211 may be in contact with the head of the user and/or the first side of the ear, possibly subject to/the reaction force of the ear or/head. After the reaction force is transformed by the third portion 1213, the reaction force converted by the third portion 1213 may cause the second portion 1212 to move toward the ear, or it may cause the second portion 1212 to rotate toward the ear with the third portion 1213 as the axis of rotation. From the connection point G1 between the auxiliary portion 1217 and the second part 1212 to the direction of the first end (e.g., the end of the auxiliary portion 1217 away from the second portion 1212) of the auxiliary portion 1217, the auxiliary portion 1217 may be bent toward the ear of the user and form a contact point H1 and a contact point K1 with the ear of the user. The contact point H1 may be located between the contact point K1 and the connection point G1. This arrangement may be such that the auxiliary portion 1217 forms a support structure with the connection point G1 as a fulcrum. At this time, the first end of the auxiliary portion 1217 may protrude into and abut in the concha of the ear, and the ear of the user may provide a reaction force directed to the second portion 1212 at the contact point H1, and the reaction force makes the second portion 1212 forms a moment to counteract the reaction of the head of the user and/or the back of the ear to the first portion 1211, thereby preventing the second portion 1212 from moving toward the ear of the user. In addition, when the first end of the first portion 1211 (e.g., the end of the first portion 1211 away from the third portion 1213) is pressed against the head of the user, in addition to causing the head of the user to provide a force directed from the head at the second contact point A3, and at least the segment B3C3 of the first portion 1211 may form another compressive force on the back side of the ear of the user, and may cooperate with the compressive force formed by the auxiliary portion 1217 on the front side of the ear, so that the compression effect of "front and rear pinching" may be formed on the ear of the user to improve the wearing stability of the acoustic apparatus 1200.

Figure 17:
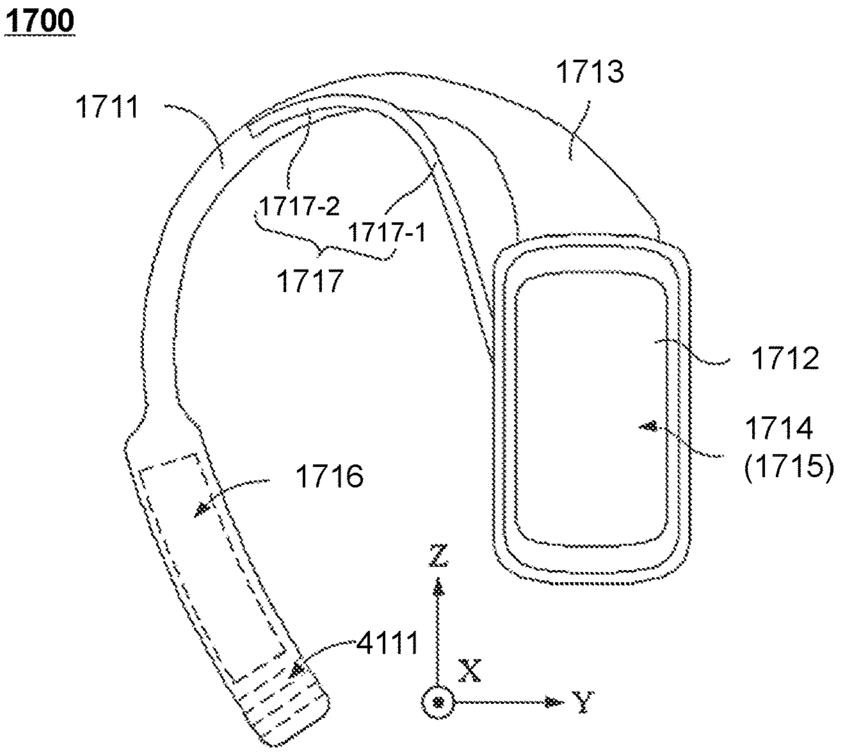
FIG. 17 is a front view illustrating an exemplary acoustic apparatus according to some embodiments of the present disclosure.
Figure 18:
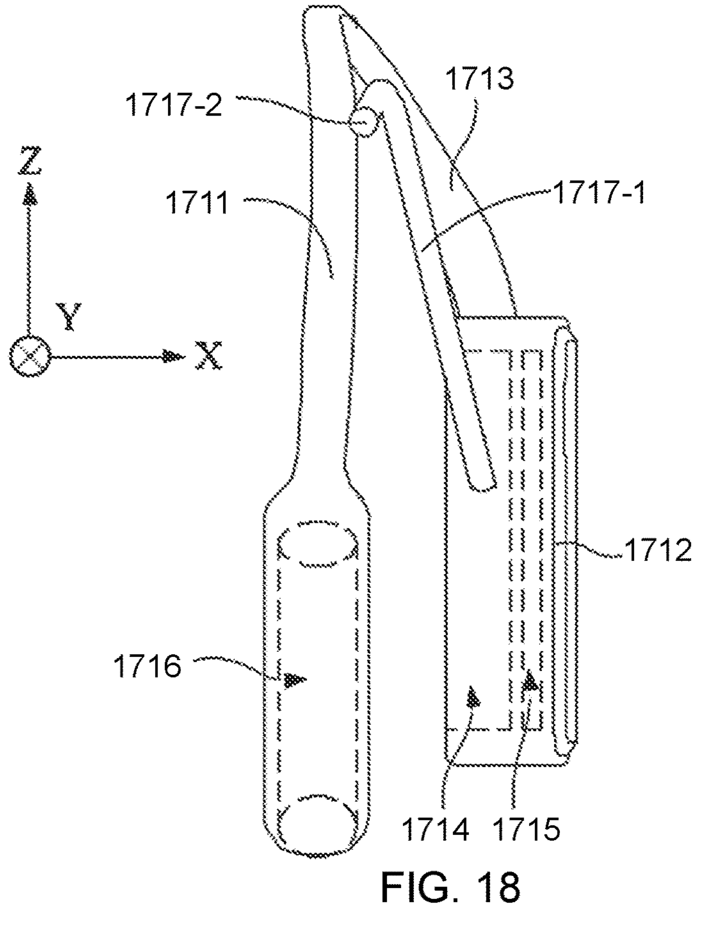
FIG. 18 is a left view illustrating the acoustic apparatus in FIG. 17 according to some embodiments of the present disclosure.

FIG. 17 is a front view illustrating an exemplary acoustic apparatus according to some embodiments of the present disclosure. FIG. 18 is a left view illustrating the acoustic apparatus in FIG. 17.

As shown in FIG. 17 and FIG. 18, the acoustic apparatus 1700 may include a support assembly (including a first portion 1711 and a second portion 1712), a third portion 1713, and an auxiliary portion 1717. The first portion 1711 and the second portion 1712 may be connected by the third portion 1713. The first portion 711 may include the battery assembly 1216. A first end of the first portion 1711 (e.g., an end away from the third portion 713) may be provided with a surface enhancement structure 4111. The second portion 1712 may include a core assembly 1714, a main board assembly 1715, etc. The auxiliary portion 1717 may include a support segment 1717-1 and a contact segment 1717-2 connected with the support segment 1717-1. The auxiliary portion 1717 (e.g., the support segment 1717-1) may be connected with the second portion 1712. The components of the acoustic apparatus 1700 may be the same as or similar to those of the acoustic apparatus 1200 shown in FIG. 12A and FIG. 12B. More descriptions of the acoustic apparatus 1700 and the portions, may be found in FIG. 12A and FIG. 12B and related descriptions thereof.

Figure 19:
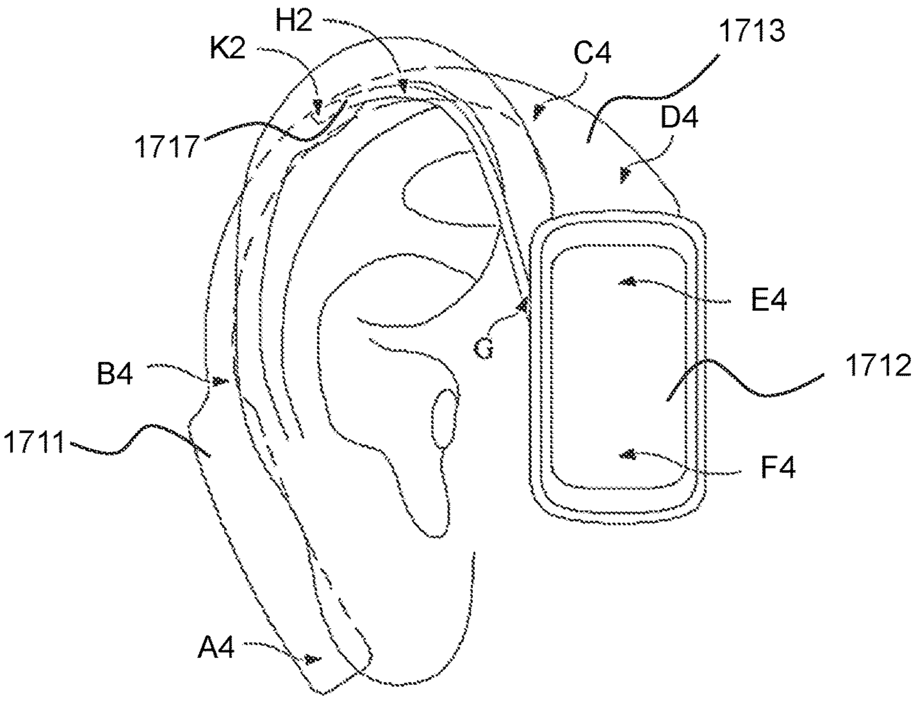
FIG. 19 is a schematic diagram illustrating a front side view when a user is wearing an exemplary acoustic apparatus according to some embodiments of the present disclosure.
Figure 20:
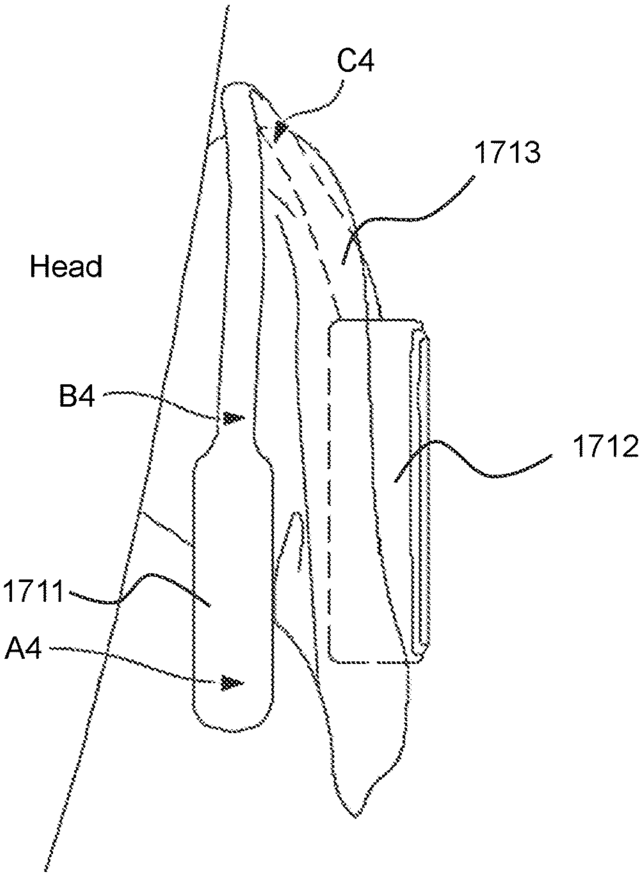
FIG. 20 is a schematic diagram illustrating a rear side view when a user is wearing an exemplary acoustic apparatus according to some embodiments of the present disclosure.

FIG. 19 is a schematic diagram illustrating a front side view when a user is wearing an exemplary acoustic apparatus according to some embodiments of the present disclosure. FIG. 20 is a schematic diagram illustrating a rear side view when a user is wearing an exemplary acoustic apparatus according to some embodiments of the present disclosure.

As shown in FIG. 19 and FIG. 20, compared with the first portion 1211 of the acoustic apparatus 1200 shown in FIG. 12 and FIG. 13, the first portion 1711 of the acoustic apparatus 1700 is closer to the second portion 1712, when the user is wearing the acoustic apparatus 1700, the first end of the first portion 1711 of the acoustic apparatus 1700 (e.g., the end of the first portion 1711 away from the third portion 1713) may be in contact with the first side of the ear of the user (e.g., the side of the ear of the user facing the head of the user)) instead of the head of the user.

In some embodiments, in the direction from the first connection point C4 between the first portion 1711 and the third portion 1713 to the first end of the first portion 1711, the first portion 1711 may be bent toward the first side of the ear of the user and a first contact point A4 and a second contact point B4 between the first portion 1711 and the first side of the ear may be formed. The second contact point B4 may be located between the first contact point A4 and the first connection point C4 between the first portion 1711 and the third portion 1713, and a third contact point E4 and a fourth contact point F4 between the second portion 1712 and the second side of the ear may be formed on the second portion 1712. In some embodiments, when the user is not wearing the acoustic apparatus 1700, the distance between the first contact point A4 and the fourth contact point F4 in the extension direction of the third portion 1713 may be smaller than the distance between the first contact point A4 and the fourth contact point F4 in the extension direction of the third portion 1713 when the user is wearing the acoustic apparatus 1700 to cause the second portion 1712 to provide a compressive force on the second side of the ear of the user. In other words, when the user is not wearing the acoustic apparatus 1700, the distance between the first contact point A4 and the fourth contact point F4 along the direction parallel to the third portion 1713 may be smaller than the thickness of the ear of the user, so that when the user is wearing the acoustic apparatus 1700, the acoustic apparatus 1700 may be clamped to the ear of the user like a "clip".

Figure 21:
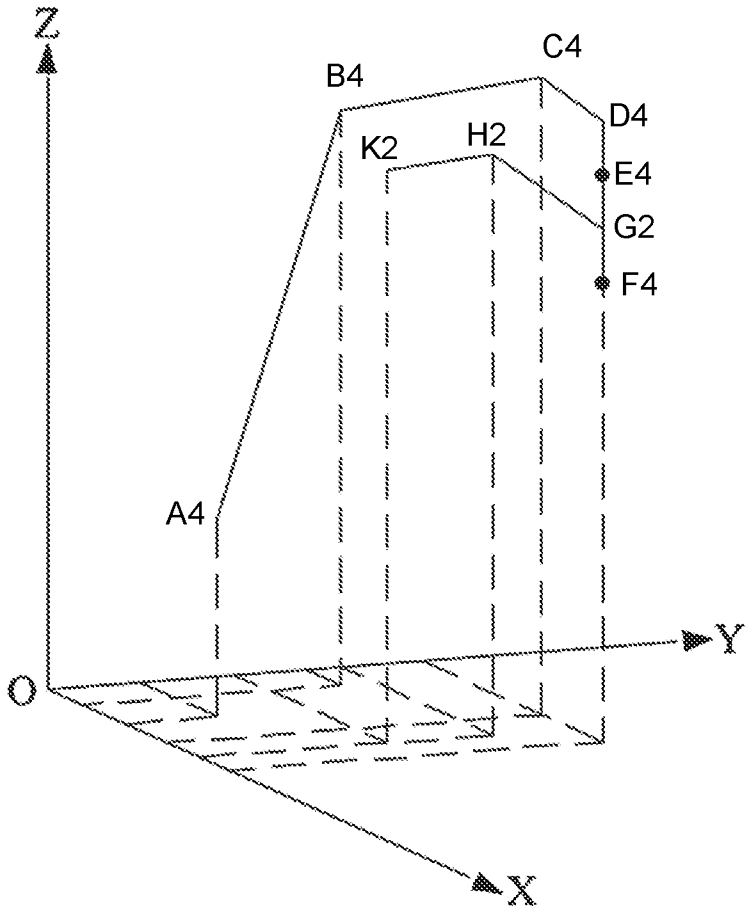
FIG. 21 is a schematic diagram illustrating a mechanical model when a user is wearing an exemplary acoustic apparatus according to some embodiments of the present disclosure.

FIG. 21 is a schematic diagram illustrating a mechanical model when a user is wearing an exemplary acoustic apparatus according to some embodiments of the present disclosure.

As shown in FIG. 21, the segment A4B4C4 may correspond to the first portion 1711, the segment E4F4 may correspond to the second portion 1712, the segment C4D4 may correspond to the third portion 1713, and the segment G2H2K2 may correspond to the auxiliary portion 1717. When the user is wearing the acoustic apparatus 1700, the segment A4B4C4 may be located on the first side of the ear of the user (e.g., the back side of the ear), the segment E4F4 may be located on the second side of the ear of the user (e.g., the front side of the ear), and the segment C4D4 may adapt to the thickness of the ear of the user, the segment D4E4 may be a transition segment between the third portion 1713 and the second portion 1712 on the second side of the ear of the user. At this time, the segment B4C4, segment C4D4 and segment E4F4 may form a structure having a "hook" (or similar to "hook") shape so that the acoustic apparatus 1400 may be hooked on the ear of the user. The segment G2H2K2 may be located on the second side of the ear of the user, and may extend into the concha. More descriptions of the segment A4B4C4, the segment C4D4 and the segment E4F4, may be found in the segment A1B1C1, the segment C1D1 and the segment E1F1 and related descriptions thereof in FIG. 6, and more descriptions of the segment G2H2K2, may be found in the segment G1H1K1 in FIG. 16 and related descriptions thereof.

Figure 22:
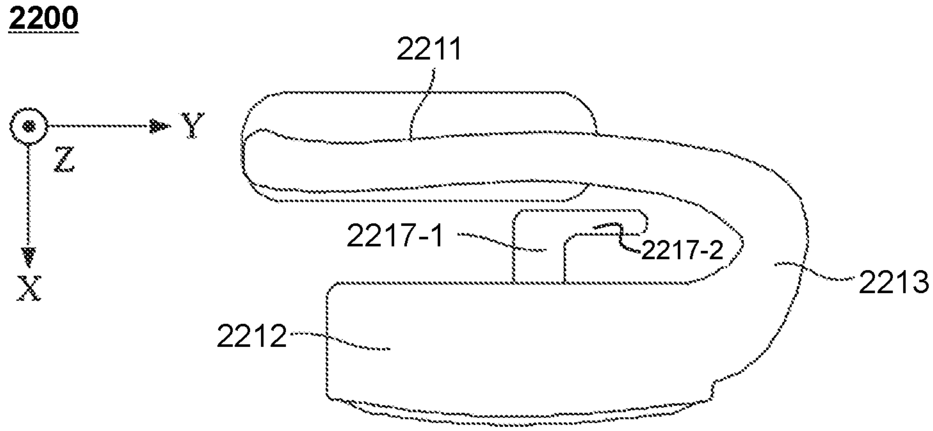
FIG. 22 is a schematic diagram illustrating an exemplary acoustic apparatus according to some embodiments of the present disclosure.

FIG. 22 is a schematic diagram illustrating an exemplary acoustic apparatus according to some embodiments of the present disclosure.

As shown in FIG. 22, the acoustic apparatus 2200 may include a support assembly (including a first portion 2211 and a second portion 2212), a third portion 2213, and an auxiliary portion. The first portion 2211 shown in FIG. 22 may be the same as or similar to the first portion (e.g., the first portion 211 shown in FIG. 2 and FIG. 3, the first portion 711 shown in FIG. 7 and FIG. 8, the first portion 1211 and the second portion 1311 shown in FIG. 12A, FIG. 12B and FIG. 13, the first portion 1711 shown in FIG. 17 and FIG. 18, etc.) described in other embodiments of the present disclosure. The third portion 2213 shown in FIG. 22 may be the same as or similar to the third portion (e.g., the third portion 213 shown in FIG. 2 and FIG. 3, the third portion 713 shown in FIG. 7 and FIG. 8, the third portion 1213 and the third portion 1313 shown in FIG. 12A, FIG. 12B and FIG. 13 and the third portion 1713 shown in FIG. 17 and FIG. 18, etc.) described in other embodiments of the present disclosure.

The auxiliary portion may include a support segment 2217-1 and a contact segment 2217-2. In some embodiments of the present disclosure (e.g., FIG. 12A-FIG. 13, FIG. 14 and FIG. 15, FIG. 17-FIG. 20, etc.), the shape of the contact segment and/or the support segment of the auxiliary portion may be an arc (or similar to an arc), and the shape of the contact segment 2217-2 of the auxiliary portion shown in 22 may be platform (or similar to a platform) in shape. In some embodiments, the contact segment 2217-2 of the auxiliary portion may have a certain distance (e.g., along the X-axis direction) from the second portion 2212. The distance may be smaller than or equal to the thickness of the helix of the ear. Generally, one or more positions (a concha cavity 102, a cymba conchae 103, and a triangular fossa 104, etc.) of an ear have a depth and/or volume into which the auxiliary portion may extend. The auxiliary portion may be connected with the second portion 2212, and the support segment 2217-2 may extend into the one or more positions of the ear and abut against (e.g., elastically abut against), clamp (e.g., elastically clamps) and/or hook on the one or more positions of the ear, so that the second portion 2212 may be hooked by the ear of the user (e.g., helix) to avoid movement of the second portion 2212 when the user is wearing the acoustic apparatus 2200, thereby improving the wearing stability of the acoustic apparatus 2200. In addition, the fixing of the second portion 2212 by the auxiliary portion may cooperate with the first portion 2211 to cause the second portion 2212 to provide a compressive force toward the second side of the ear of the user, further increasing the wearing stability of the acoustic apparatus 2200. The clamping in some embodiments of the present disclosure may refer to that one or more structures (e.g., a contact segment of an auxiliary portion) of the acoustic apparatus may be connected with one or more positions (e.g., the concha cavity 102, the cymba conchae 103, the triangular fossa 104, etc. shown in FIG. 1) of the ear by means of hooking, clamping, etc. The abutting against may refer to that one or more structures of the acoustic apparatus (e.g., the contact segment of the auxiliary portion) may rest against one or more positions of the ear. In some embodiments, at least a part of the contact segment 2217-2 of the auxiliary portion may be made of a softer material (e.g., polycarbonate, polyamides, acrylonitrile-butyl acrylonitrile butadiene styrene, silicone, etc., or combination thereof).

Figure 23:
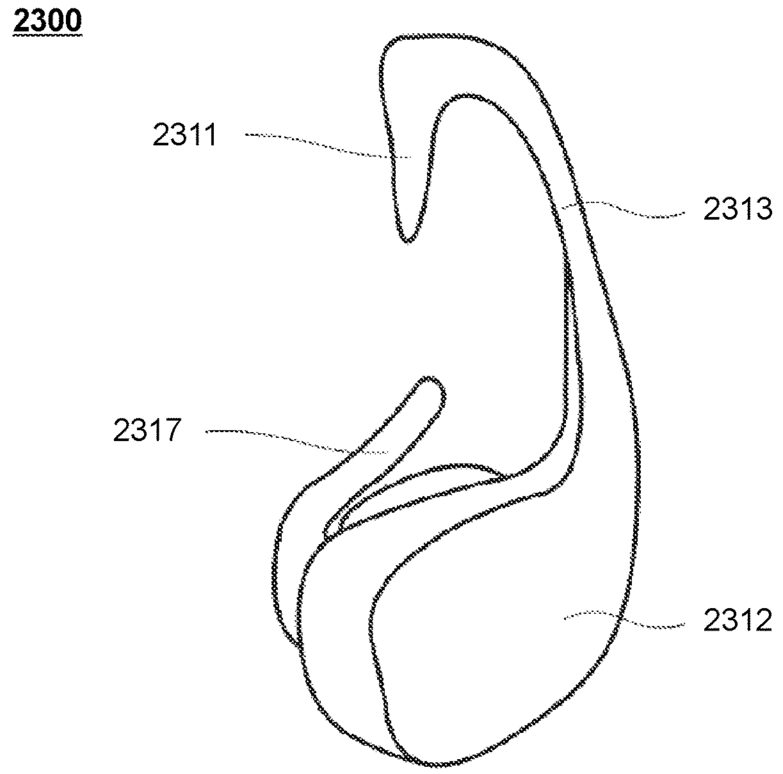
FIG. 23 is a schematic diagram illustrating an exemplary acoustic apparatus according to some embodiments of the present disclosure.

FIG. 23 is a schematic diagram illustrating an exemplary acoustic apparatus according to some embodiments of the present disclosure.

As shown in FIG. 23, the acoustic apparatus 2300 may include a support assembly (including a first portion 2311 and a second portion 2312), a third portion 2313, and an auxiliary portion 2317. Different form the acoustic apparatus (e.g., the acoustic apparatus 200 shown in FIGS. 2-5, the acoustic apparatus 700 shown in FIGS. 7-10, the acoustic apparatus 1200 shown in FIG. 12A, FIG. 12B, FIG. 14 and FIG. 15, the acoustic apparatus 1300 shown in FIG. 13, the acoustic apparatus 1700 shown in FIG. 17-FIG. 20, etc.) shown in some embodiments of the present disclosure, the first portion 2311 of the acoustic apparatus 2300 may have a relatively short length, and a relatively small angle may be formed between the second portion 2312 and the third portion 2313. When the user is wearing the acoustic apparatus 2300, the first portion may be hooked and/or clamped on the first side of the ear of the user (e.g., the back side of the ear), the smaller angle between the second portion 2312 and the third portion 2313 may cooperate with the first portion 2311 to cause the second portion 2312 to provide a compressive force towards the second side of the ear of the user, thereby improving the wearing stability of the acoustic apparatus 2300.

In some embodiments, the first end of the auxiliary portion 2317 (e.g., the end of the auxiliary portion 2317 close to the second portion 2312) may be connected with the second portion 2312, and the second end of the auxiliary portion 2317 (e.g., the end of the auxiliary portion 2317 away from the second portion 2312) may have a certain distance from the second portion 2312. The distance may be smaller than or equal to the thickness of the ear of the user (e.g., the helix), so that when the user is wearing the acoustic apparatus 2300, the first portion 2311 may cooperate with the third portion 2313, so that the second portion 2312 may hung on the second side (e.g., the side of the ear of the user that faces outward) of the ear of the user. Further, the auxiliary portion 2317 may extend into one or more positions of the ear of the user (e.g., the concha cavity 102, the cymba conchae 103, the triangular fossa 104 shown in FIG. 1) to avoid the second portion 2312 to turn over, thereby improving the wearing stability of the acoustic apparatus 2300.

Figure 24:
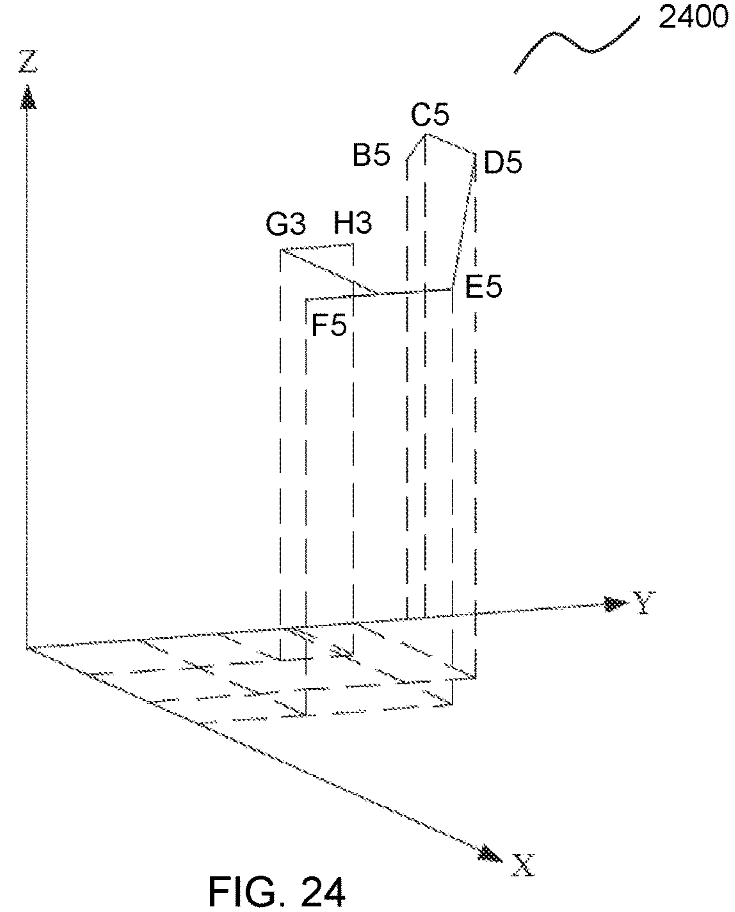
FIG. 24 is a schematic diagram illustrating a mechanical model when a user is wearing an exemplary acoustic apparatus according to some embodiments of the present disclosure.

FIG. 24 is a schematic diagram illustrating a mechanical model when a user is wearing an exemplary acoustic apparatus according to some embodiments of the present disclosure.

As shown in FIG. 24, the YZ plane in the coordinate system 2400 may be regarded as the plane where the head of the user is located, the segment B5C5 may correspond to the first portion 2311, the segment C5D5 may correspond to the third portion 2313, and the segment D5E5F5 may correspond to the second portion 2312, the segment G3H3 may correspond to auxiliary portion 2317, and the first connection point C5 may be the position (e.g., the point on the ear of the user 100 surrounded by the dashed box C in FIG. 1) of the ear of the user close to the head. When the user is wearing the acoustic apparatus 2700, the segment B5C5 may be located on the first side of the ear of the user (e.g., the back side of the ear), the segment E5F5 may be located on the second side of the ear of the user (e.g., the front side of the ear), the segment C5D5 may adapt to the thickness of the ear of the user, and the segment D5E5 may be a transition segment between the third portion 2313 and the second portion 2312, on the second side of the ear of the user. At this time, the segment B5C5, the segment C5D5 and the segment E5F5 may form a structure having a "hook" (or similar to "hook") shape so that the acoustic apparatus 1400 may be hooked on the ear of the user. The G3H3 segment may be located on the second side of the ear of the user, and may extend into the concha of the ear. When the user is wearing the acoustic apparatus 2300, the point B5 may hook the depression region on the rear side of the ear, and point C5 may serve as a fulcrum, so that the first portion 2311 may balance the self-weight of the second portion 2312 and prevent the second portion 2312 from falling from the ear of the user. In addition, the friction force between the first portion 2311 and the ear of the user may also be increased to improve the wearing stability of the acoustic apparatus 2300. Further, the H3 point may hook the helix of the ear, and the G3 point may serve as another fulcrum, so that the auxiliary portion 2317 may balance the self-weight of the second portion 2312, and improve the wearing stability of the acoustic apparatus 2300.

Figure 25:
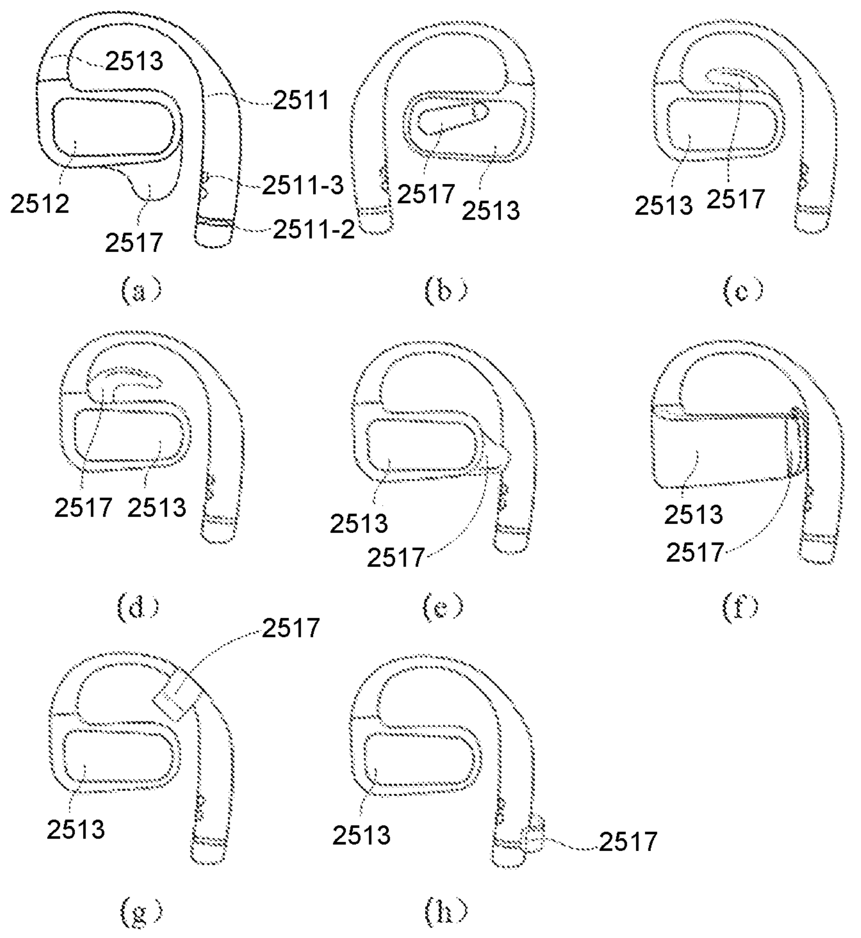
FIG. 25 is a schematic diagram illustrating the installation position of an auxiliary portion of an exemplary acoustic apparatus according to some embodiments of the present disclosure.

FIG. 25 is a schematic diagram illustrating the installation position of an auxiliary portion of an exemplary acoustic apparatus according to some embodiments of the present disclosure.

As shown in FIG. (a) of FIG. 25, the acoustic apparatus may include a support assembly, a third portion 2513, and an auxiliary portion 2517. The support assembly may include a first portion 2511 and a second portion 2512. In some embodiments, the first end of the first portion 2511 (e.g., the end away from the third portion 2513) may be provided with a surface enhancement structure, such as a dot-like protrusion 2511-3, a strip-like protrusion 2511-2, etc., or a combination thereof. In some embodiments, parameters such as the position, shape, and size of the auxiliary portion 2517 may be set based on actual conditions. For example, the position of the auxiliary portion 2517 may be set and/or adjusted based on the gender (e.g., male, female) of the user. As another example, the size of the auxiliary portion 2517 may be set and/or adjusted based on the age (e.g., teenager, youth, adult, elderly, etc.) of the user. In some embodiments, the dimension of the second portion 2512 in the Y-axis direction may be 22-34 mm. In some embodiments, the dimension of the second portion 2512 in the Y-axis direction may be 24-28 mm. In some embodiments, the dimension of the second portion 2512 in the Y-axis direction may be 26-30 mm. In some embodiments, the dimension of the second portion 2512 in the Y-axis direction may be 26-27 mm. In some embodiments, the dimension of the second portion 2512 in the Y-axis direction may be 23-25 mm. In some embodiments, the dimension of the second portion 2512 in the Y-axis direction may be 25-29 mm. In some embodiments, the dimension of the second portion 2512 in the Y-axis direction may be 26 mm, so that the second portion 2512 may be abut against the front side of the ear 100. At this time, the height of the auxiliary portion 2517 in the Z-axis direction may be 4-8 mm, e.g., 5-7 mm, 6 mm, etc. The projected length of the auxiliary portion 2517 on the XY plane may be 8-15 mm, e.g., 9-14 mm, 10-13 mm, 11-12 mm, etc., and the projected width of the auxiliary portion 2517 on the XY plane may be 2-5 mm, e.g., 3-4 mm, 3-5 mm, etc. In some embodiments, the auxiliary portion 2517 may be provided on the first portion 2511, the second portion 2512, the third portion 2513, or other portions of the acoustic apparatus 2500.

As shown in FIG. (a) of FIG. 25, the auxiliary portion 2517 may be provided on the inner surface and/or the lower surface of the second portion 2512, and when the user is wearing the acoustic apparatus 2500, the auxiliary portion 2517 may extend into the concha cavity (e.g., concha cavity 102 shown in FIG. 1) of the ear of the user. The auxiliary portion 2517, the concha cavity, and the surrounding human tissue may achieve close fit in the manner of elastic abutting.

In some embodiments, as shown in FIG. (b) of FIG. 25, the auxiliary portion 2517 may be provided on the inner surface of the second portion 2512. When the user is wearing the acoustic apparatus 2500, the acoustic apparatus 2500 may protrude into the cymba conchae. The auxiliary portion 2517, the cymba conchae (e.g., the cymba conchae 103 shown in FIG. 1), and the surrounding human tissue may achieve close fit in the manner of elastic clamping and/or elastic abutting.

In some embodiments, as shown in FIG. (c) of FIG. 25, the auxiliary portion 2517 may be provided on the upper surface of the second portion 2512, and when the user is wearing the acoustic apparatus 2500, the auxiliary portion 2517 may extend into the triangular fossa (e.g., triangular fossa 104 shown in FIG. 1). At this time, the auxiliary portion 2517 may fit closely with the triangular fossa and the surrounding human tissue in the manner of elastic clamping and/or elastic abutting.

In some embodiments, as shown in FIG. (d) of FIG. 25 or in FIG. (e) of FIG. 25, the auxiliary portion 2517 may be provided on the upper surface and/or the rear surface of the second portion 2512, when the user is wearing the acoustic apparatus 2500, the auxiliary portion 2517 may extend into the concha (e.g., the scapha 106 shown in FIG. 1). The auxiliary portion 2517 may fit closely with the concha and the surrounding human tissue in the manner of elastic clamping and/or elastic abutting.

In some embodiments, as shown in FIG. (f) of FIG. 25, the auxiliary portion 2517 may be provided on the rear surface of the second portion 2512, and when the user is wearing the acoustic apparatus 2500, the auxiliary portion 2517 may be bent and extended from the second side (e.g., the front side of the ear) of the ear (e.g., the ear 100) to the first side (e.g., the side of the ear facing the head) of the ear, and hooked on the helix (e.g., the helix 107 in the FIG. 1). The auxiliary portion 2517 may fit closely with the helix and the surrounding human tissue in a manner of hooking and wrapping. For example, the auxiliary portion 2517 may be hooked on the antihelix, and the antihelix may wrap a portion of the auxiliary portion 2517.

In some embodiments, as shown in FIG. (g) of FIG. 25, the auxiliary portion 2517 may be provided on the first portion 2511. The auxiliary portion 2517 may be disposed near the second end of the first portion 2511 e.g., the end of the first portion 2511 near the third portion 2513), when the user is wearing the acoustic apparatus 2500, the auxiliary portion 2517 may be bent and extended from the first side of the ear to the second side of the ear, hooking the antihelix (e.g., the antihelix 105 shown in FIG. 1). The auxiliary portion 2517 may fit closely with the antihelix and the surrounding human tissue in a manner of hooking and wrapping.

In some embodiments, as shown in FIG. (h) of FIG. 25, the auxiliary portion 2517 may be provided on the second end of the first portion 2511, and when the user is wearing the acoustic apparatus 2500, the auxiliary portion 2517 may be bent and extended from the first side of the ear to the second side of the ear, hooking the helix. The auxiliary portion 2517 may fit closely with the helix and the surrounding human tissue in a manner of hooking and wrapping. More descriptions of the definition of each surface of the second portion 2512 may be found in FIG. 12A and related descriptions thereof.

It should be noted that the above description of the acoustic apparatus 2500 and its auxiliary portion 2517 is only for convenience of description, and does not limit the present disclosure to the scope of the illustrated embodiments. It may be understood that for those skilled in the art, after understanding the principle of the device, various modifications and changes in form and detail may be made to the specific manner and steps of implementing the acoustic apparatus 2500 and/or the auxiliary portion 2517 without departing from this principle. For example, the structural parameters such as the size and shape of the auxiliary portion 2517 may be designed according to the matching requirements between the auxiliary portion 2517 and the ear. As another example, the auxiliary portion 2517 and the corresponding structures (e.g., the first portion 2511, the second portion 2512, etc.) on the acoustic apparatus 2500 may be formed in one piece, that is, they can be connected in a non-detachable manner, or they may be connected in a detachable manner. For example only, the second portion 2512 may include mounting holes in which the auxiliary portion 2517 may be mounted. As another example, the auxiliary portion 2517 may be integrally formed with the elastic sleeve, and the elastic sleeve may be sleeved on the second portion 2512 or the first portion 2511.

Figure 26:
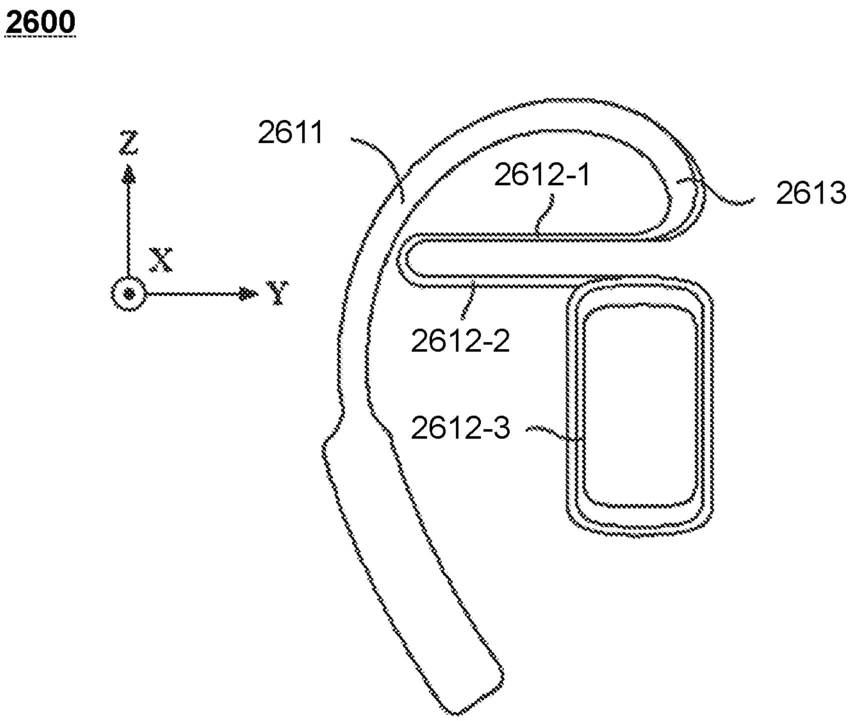
FIG. 26 is a schematic diagram illustrating an exemplary acoustic apparatus according to some embodiments of the present disclosure.

FIG. 26 is a schematic diagram illustrating an exemplary acoustic apparatus according to some embodiments of the present disclosure. As shown in FIG. 26, the acoustic apparatus 2600 may include a first portion 2611, a second portion, and a third portion 2613. In some embodiments, the second portion may be a segmented structure including multiple segments (e.g., first segment 2612-1, second segment 2612-2, and third segment 2612-3). The first end of the first segment 2612-1 may be connected with the third portion 2613, and the second end of the first segment 2612-1 may be connected with the first end of the second segment 2612-2. The second end of the second segment 2612-2 may be connected with the third segment 2612-3. In some embodiments, the second segment 2612-2 may be connected with multiple locations of the third segment 2612-3. For example, as shown in FIG. 26, when the user is wearing the acoustic apparatus 2600, the major axis direction of the third segment 2612-3 may be consistent with the direction in which the lower jaw of the user points to the top of the head, and the second segment 2612-2 may be connected with the upper portion (e.g., the upper surface, the portion of the inner surface near the upper surface, the junction of the inner surface and the upper surface, the portion of the rear surface near the upper surface, the junction of the rear surface and the upper surface, etc.) of the third segment 2612-3. In some embodiments, the second segment 2612-2 may be bent toward the third segment 2612-3 relative to the first segment 2612-1, and a distance may be between the first segment 2612-1 and the second segment 2612-2, that is, the first segment 2612-1 and the second segment 2612-2 may form a U-shaped (or similar to a U-shaped) shape.

In some embodiments, the third segment 2612-3 may be used to set other components of the acoustic apparatus such as the core assembly, the main board assembly, etc. In some embodiments, the first segment 2612-1 and the second segment 2612-2 may abut against the second side of the ear of the user (e.g., the area where the antihelix, etc., are located) to clamp the ear of the user together with the first portion 2611. In some embodiments, the parameters of the multi-segment structure (e.g., the number of segments, the length of the segment, the shape, the position of the segment, etc.) may be adjusted according to actual needs. For example, one or more of the segments of the multi-segment structure may be made of a softer textured material (e.g., an elastic wire, polycarbonate, polyamides, acrylonitrile-butyl acrylonitrile butadiene styrene, silicone, etc., or its combination). As another example, one or more segments of the multi-segment structure may include a retractable structure (e.g., a segment of the multi-segment structure may include multiple branch segments that are nested in sequence), and the retractable structure may be used to adjust the segment length. The user may adjust the position of the second portion 2612 by adjusting one or more segments of the multi-segment structure according to actual needs. By setting the second portion 2612 as a multi-segment structure, the relative positions of the various components in the acoustic apparatus 2600 may be adjusted based on the specific conditions (e.g., size, shape, etc.) of the ear and/or head of the user, thereby improving the comfort of the acoustic apparatus and wearing stability, expanding the scope of application of acoustic apparatus. For example, the second portion 2212 of the acoustic apparatus 2200 may be configured as a multi-segment structure, and the relative position of the second portion and/or the core assembly may be adjusted. When the user is wearing the acoustic apparatus 2600, the acoustic apparatus 2600 may not block the external auditory canal of the ear, and the core assembly may be made as close to the external auditory canal as possible, thereby improving the sound quality of the acoustic apparatus 2600 and improving the user experience.

Figure 27:
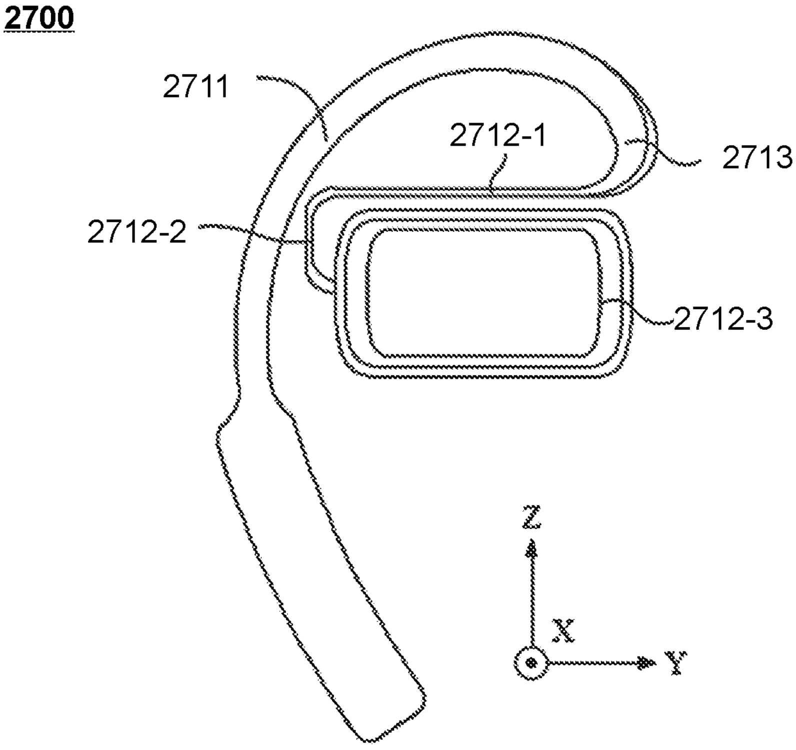
FIG. 27 is a schematic diagram illustrating an exemplary acoustic apparatus according to some embodiments of the present disclosure.

FIG. 27 is a schematic diagram illustrating an exemplary acoustic apparatus according to some embodiments of the present disclosure. As shown in FIG. 27, the acoustic apparatus 2700 may include a support assembly (including a first portion 2711 and a second portion) and a third portion 2713. The second portion may include a first segment 2712-1, a second segment 2712-2, and a third segment 2712-3 connected end with end in sequence. The first end of the first segment 2712-1 may be connected with the third portion 2713, and the second end of the first segment 2712-1 may be connected with the first end of the second segment 2712-2. The second end of the second segment 2712-2 may be connected with the third segment 2712-3. For example, the second segment 2712-2 may be bent toward the third segment 2712-3 relative to the first segment 2712-1 such that there is a distance between the first segment 2712-1 and the third segment 2712-3. The third segment 2712-3 may be used to set other portions of the acoustic apparatus 2700, such as the core assembly, the main board assembly, etc. In some embodiments, the parameters of the multi-segment structure may be adjusted according to the direction (e.g., the major axis direction, the minor axis direction, etc.), size, shape, etc. of the third segment 27112-3, thereby expanding the applicable range of the acoustic apparatus 2700. As shown in FIG. 27, compared with the multi-segment structure of the acoustic apparatus 2600 shown in FIG. 26, the major axis direction of the third segment 2712-3 of the acoustic apparatus 2700 may be parallel to the direction in which the back of the head of the user points to the face. The multi-segment structure of the acoustic apparatus 2700 may have a different shape from the acoustic apparatus 2600, the length of the second segment 2712-2 may be relatively short, and the second segment 2712-2 may be connected with the middle of the third segment 2712-3, etc., so that the third segment 2712-3 may be in contact with one or more positions of the ear of the user, thereby realizing the wearing of the acoustic apparatus 2700, and further, transmitting the sound to the user.

In some embodiments, the first segment (e.g., the first segment 2612-1 shown in FIG. 26 and the first segment 2712-1 shown in FIG. 27) and the second segment (e.g., the second segment 2612-2 shown in FIG. 26 and the second segment 2712-2 shown in the FIG. 27), the second segment and the third segment (e.g., the third segment 2612-3 shown in FIG. 26 and the third segment 2712-3 shown in FIG. 27) may be connected in a number of ways. Exemplary connection ways may include plug connection, snap connection, screw connection, adhesive connection, welding connection, riveting connection, key connection, bolt connection, buckle connection, hinge connection, etc., or any combination thereof. In some embodiments, the first segment and the second segment and/or the second segment and the third segment may be integrally formed.

Figure 28:
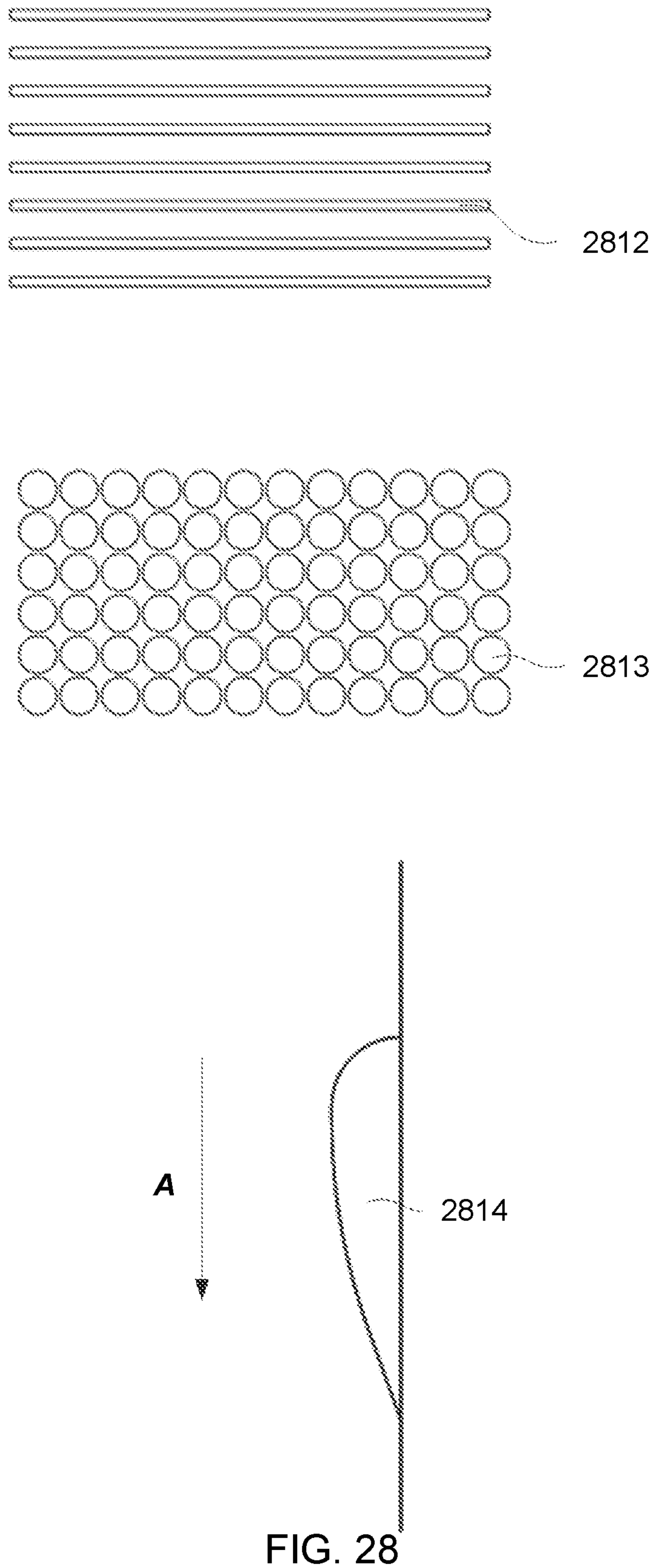
FIG. 28 is a schematic diagram illustrating an exemplary surface enhancement structure according to some embodiments of the present disclosure.

FIG. 28 is a schematic diagram illustrating an exemplary surface enhancement structure according to some embodiments of the present disclosure. In some embodiments, the surface enhancement structure shown in FIG. 28 may be an embodiment of the surface enhancement structure 2111 shown in FIG. 2, the surface enhancement structure 7111 shown in FIG. 7, the surface enhancement structure 3111 shown in FIG. 12A, and the surface enhancement structure 4111 shown in FIG. 17.

As shown in FIG. 28, the surface enhancement structure may include strip-shaped protrusions 2812, dot-shaped protrusions 2813, semi-spindle-shaped protrusions 2814, etc., or a combination thereof. In some embodiments, the strip-shaped protrusions 2812 may be spaced along the length of the first portion of the acoustic apparatus. In some embodiments, the dot-shaped protrusions 2813 may be spaced along the length of the first portion of the acoustic apparatus.

In some embodiments, the semi-spindle protrusions 2814 may extend along the length of the first portion of the acoustic apparatus. For example, in a direction from the second end (e.g., the first portion 211 shown in FIG. 2 is close to one end of the third portion 213) of the first portion to the first end of the first portion, the raised height of a semi-spindle may first gradually increase and then gradually decrease. In this way, when the user is wearing the acoustic apparatus, the resistance between the semi-spindle protrusions 2814 and the skin of the user may be reduced, and when the user is wearing the acoustic apparatus, the resistance between the semi-spindle protrusion 2814 and skin of the user may be increased to avoid falling off of the acoustic apparatus and improve the wearing stability of the acoustic apparatus.

It should be noted that the above description of the surface enhancement structure is only for the convenience of description, and cannot limit the present disclosure to the scope of the illustrated embodiments. It may be understood that for those skilled in the art, after understanding the principle of the apparatus, various modifications and changes in form and detail may be made to the specific shape, number, position, spacing, etc., of the surface enhancement structures without departing from this principle. For example, the surface enhancement structures may include bulge structures, dull polish structures, texture structures (e.g., grid-like textures), or pore structures, or the like, or a combination thereof. Such deformations are all within the protection scope of the present disclosure.

Figure 29:
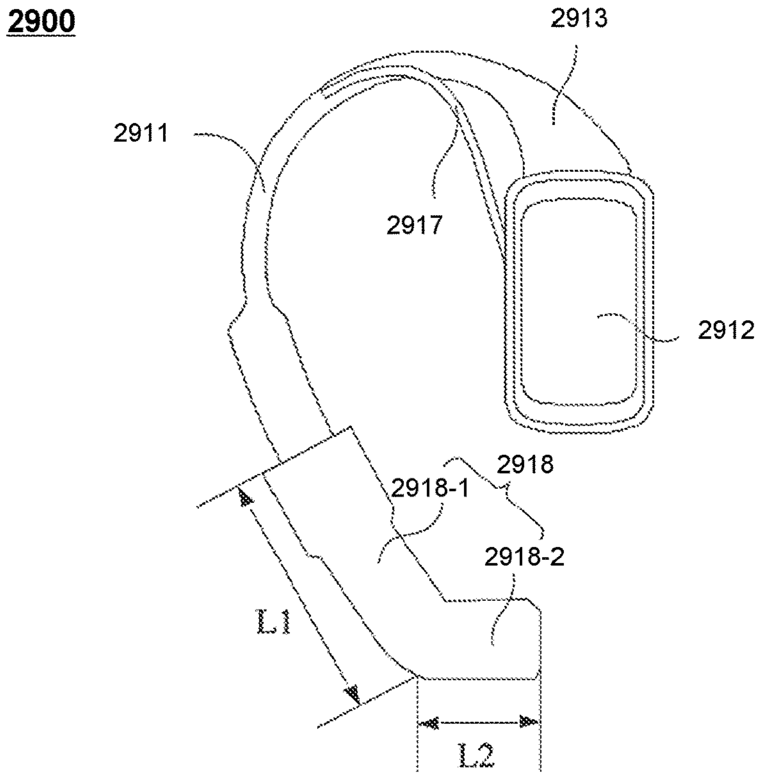
FIG. 29 is a schematic diagram illustrating an exemplary acoustic apparatus and an elastic structure according to some embodiments of the present disclosure.

FIG. 29 is a schematic diagram illustrating an exemplary acoustic apparatus and an elastic structure according to some embodiments of the present disclosure.

As shown in FIG. 29, the acoustic apparatus 2900 may include a support assembly (including a first portion 2911 and a second portion 2912), a third portion 2913, and an auxiliary portion 2917. The first portion 2911 shown in FIG. 29 may be the same as or similar to the first portion (e.g., the first portion 211 shown in FIG. 2 and FIG. 3, the first portion 711 shown in FIG. 7 and FIG. 8, the first portion 1211 and the first portion 1311 shown in FIG. 12A, FIG. 12B and FIG. 13, the first portion 1711 shown in FIG. 17 and FIG. 18, the first portion 2211 shown in FIG. 22, the first portion 2311 shown in FIG. 23, and the first portion 2511 shown in FIG. 25, the first portion 2611 shown in FIG. 26, the first portion 2711 shown in FIG. 27, etc.) described in other embodiments of the present application. The second portion 2912 shown in FIG. 29 may be the same as or similar to the second portion (e.g., the second portion 212 shown in FIG. 2 and FIG. 3, the second portion 712 shown in FIG. 7 and FIG. 8, the second portion 1212 and the second portion 1312 in FIG. 12A, FIG. 12B and FIG. 13, the second portion 1712 shown in FIG. 17 and FIG. 18, the second portion 2212 shown in FIG. 22, the second portion 2312 shown in FIG. 23, the second portion 2512 shown in FIG. 25, the second portion 2612 shown in FIG. 26, the second portion 2712 shown in FIG. 27, etc.) described in other embodiments of the present disclosure. The third portion 2913 shown in FIG. 29 may be the same as or similar to the third portion (e.g., the third portion 213 shown in FIG. 2 and FIG. 3, the third portion 713 in FIG. 7 and FIG. 8, the third portion 1213 and the third portion 1313 shown in FIG. 12A, FIG. 12B and FIG. 13, the third portion 1713 shown in FIG. 17 and FIG. 18, the third portion 2213 shown in FIG. 22, the third portion 2313 shown in FIG. 23, the third portion 2513 shown in FIG. 25, the third portion 2613 shown in FIG. 26, the third portion 2713 shown in FIG. 27, etc.) described in other embodiments of the present disclosure.

In some embodiments, the first portion 2911 may include an elastic structure 2918. In some embodiments, the elastic structure 2918 may be disposed on at least a part of the first portion 2911. For example, the elastic structure 2918 may be provided on the surface of the first portion 2911. As another example, the elastic structure 2918 may be disposed at the first end of the first portion 2911 (e.g., the end of the first portion 2911 away from the third portion 29132). As another example, the elastic structure 2918 may be provided on a part of the first portion 2911 that includes a battery assembly (e.g., the battery assembly 216 shown in FIG. 2). In some embodiments, the elastic structure 2918 may be removably connected with other components in the acoustic apparatus 2900. For example, the elastic structure 2918 may be partially sleeved over at least a part of the first portion 2911. In some embodiments, the elastic structure 2918 may be integrally formed with other components in the acoustic apparatus 2900.

In one embodiment, the elastic structure 2918 may include a first element 2918-1 and a second element 2918-2. In some embodiments, the first element 2918-1 and the second element 2918-2 may form an angle. The angle formed by the first element 2918-1 and the second element 2918-2 may be set according to actual conditions (e.g., the size, shape, thickness, etc. of the ear of the user). For example, when the ear of the user is large, the angle formed by the first element 2918-1 and the second element 2918-2 may be relatively large, so that the contact area between the elastic structure 2918 and the head or ear of the user may be increased, and the stability of wearing the acoustic apparatus may be improved. As another example, when the auricular fossa of the ear of the user is shallow, the angle formed by the first element 2918-1 and the second element 2918-2 may be relatively large, thereby improving the hooking of the elastic structure 2918 to the ear of the user.

In some embodiments, at least a part of the first element 2918-1 may be disposed on the first portion 2911, e.g., the first element 2918-1 may be disposed (e.g., nested) on a battery portion of the first portion 2911. When the user is wearing the acoustic apparatus 2900, the second element 2918-2 may hook the ear from the first side of the ear of the user (e.g., the base of the ear), thereby improving the wearing stability of the acoustic apparatus 2900. In some embodiments, the elastic structure 2918 may have a certain memory performance at least at the connection between the first element 2918-1 and the second element 2918-2, so that the user may flexibly adjust the angle formed between the first element 2918-1 and the second element 2918-2 by bending, folding, etc., to improve the adaptability of the acoustic apparatus 2900.

In some embodiments, the first element 2918-1 and the second element 2918-2 may be relatively fixed or relatively movable. For example, the first element 2918-1 and the second element 2918-2 may be connected movably, so that positions of the first element 2918-1 and the second element 2918-2 may be adjusted according to actual needs (e.g., the size, shape, thickness, etc., of the ear of the user.), first element 2918-1 second element 2918-2 thereby improving the applicable range of the acoustic apparatus 2900.

In some embodiments, the first element 2918-1 and the second element 2918-2 may be connected in one or more ways, for example, the connection between the first element 2918-1 and the portion 2918-2 may include a plug connection, a snap connection, a screw connection, an adhesive connection, a welding connection, a riveting connection, a key connection, a bolt connection, a buckle connection, a hinge connection, etc., or any combination thereof. In some embodiments, the first element 2918-1 and the second element 2918-2 may be integrally formed. For example, the first element 2918-1 and the second element 2918-2 may be integrally formed from an elastic material (e.g., silicone, latex, methyl vinyl silicone rubber, stretchable nanomaterial, etc.).

In some embodiments, the length of the first element 2918-1 (L1 as shown in FIG. 29) and the length of the second element 2918-2 (L2 as shown in FIG. 29) may be the same or different. For example, the length of the first element 2918-1 and the length of the second element 2918-2 may not be equal, which is convenient for the user to select the first element 2918-1 or the second element 2918-2 to be sleeved on the first end of the first portion 2911 according to the actual use requirements, so that the actual total length of the first portion 2911 and the elastic structure 2918 may be adjusted. For example, the elastic structure 2918 may cover half of the battery portion of the first portion 2911. In some embodiments, the length of the first element 2918-1 and/or the second element 2918-2 may be set as desired. For example, the length difference between the first element 2918-1 and the second element 2918-2 may be in the range of 2.0-8.0 mm, or the like. As another example, the length difference between the first element 2918-1 and the second element 2918-2 may be within the range of 3.5-7.0 mm. As another example, the length difference between the first element 2918-1 and the second element 2918-2 may be in the range of 2.0-7.0 mm. As another example, the length difference between the first element 2918-1 and the second element 2918-2 may be in the range of 3.5-8.0 mm.

In some embodiments, the thicknesses of the first element 2918-1 and the second element 2918-2 may be set according to actual needs. For example, the thickness of the first element 2918-1 may be greater than the thickness of the second element 2918-2, such that the elastic structure 2918 may form a necked (or necked-like) structure on the first portion 2911. A necked structure refers to a structure whose size (e.g., tube diameter, inner diameter, etc.) changes from large to small. In some embodiments, the ratio of the thickness of the first element 2918-1 to the thickness of the second element 2918-2 may be in the range of 1-5. In some embodiments, the ratio of the thickness of the first element 2918-1 to the thickness of the second element 2918-2 may be in the range of 2-4. The ratio of the thickness of the first element 2918-1 to the thickness of the second element 2918-2 may be in the range of 3-5.

In some embodiments, when at least a part of the elastic structure 2918 is disposed on the first portion 2911, the outer diameter of the first portion 2911 may be increased, and the rotation, eversion and other movements of the acoustic apparatus 2900 (e.g., the second portion 2912) may be reduced, so as to better adapt to the opening angles of the external auricles of different user groups, especially the "wind-attracting ears." In some embodiments, the first element 2918-1 and the second element 2918-2 may be or not be in flow communication with each other.

In some embodiments, the shape of the elastic structure 2918 may be set according to actual needs. For example, the shape of the elastic structure 2918 may include a cylinder, a cube, a cuboid, a prism, an elliptical cylinder, or the like. In some embodiments, the shape of the elastic structure 2918 may be the same as the shape of the components in the acoustic apparatus 2900 to which the elastic structure 2918 cooperates. For example, the shape of the part including the battery assembly in the first portion 2911 may be a cylinder, and the shape of the elastic structure 2918 sleeved thereon may also be a cylinder. In some embodiments, the shape of the elastic structure 2918 may be different from the shape of the components in the acoustic apparatus 2900 with which the elastic structure 2918 cooperates. For example, the shape of a part of the first portion 2911 may be a cuboid, and the shape of the elastic structure 2918 sleeved thereon may be a cylinder.

In some embodiments, the elastic structure 2918 may be made of a softer material (e.g., polycarbonate, polyamides, acrylonitrile-butyl acrylonitrile butadiene styrene, silicone, etc., or a combination thereof) to improve the comfort of the user wearing the acoustic apparatus 2900. In some embodiments, at least a part of the elastic structure 2918 may include a surface enhancement structure. For example, the portion of the elastic structure 2918 in contact with the user may be provided with a texture, a matte surface, etc., to improve the wearing stability of the acoustic apparatus 2900.

Figure 30:
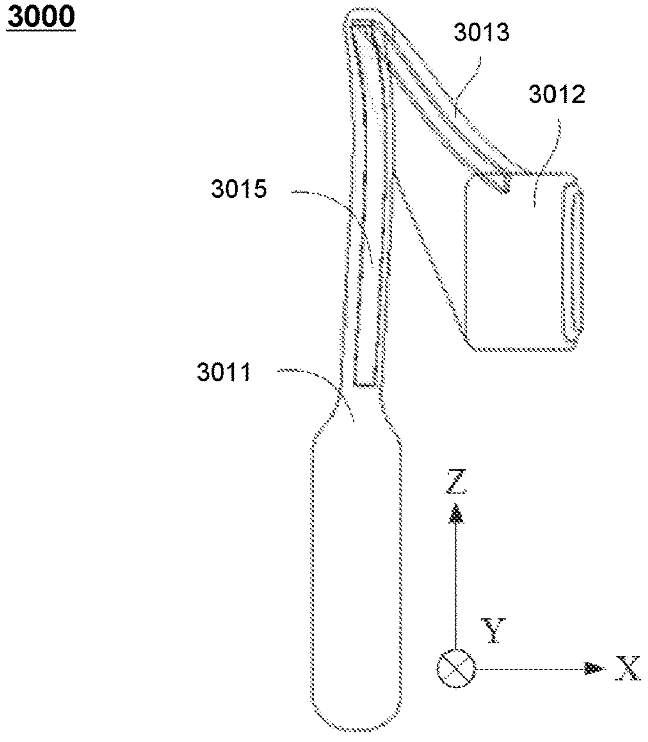
FIG. 30 is a perspective view illustrating a part of components of an exemplary acoustic apparatus according to some embodiments of the present disclosure.

FIG. 30 is a perspective view illustrating a part of components of an exemplary acoustic apparatus according to some embodiments of the present disclosure.

As shown in FIG. 30, the acoustic apparatus 3000 may include a support assembly and a third portion 3013. The support assembly may include a first portion 3011 and a second portion 3012. In some embodiments, the interior of the first portion 3011, the second portion 3012 and/or the third portion 3013 may be provided with wire 3015. The wire 3015 may be used to enhance the strength of the first portion 3011, the second portion 3012 and/or the third portion 3013. In some embodiments, the wire 3015 may include spring steel, titanium alloy, titanium nickel alloy, chromium molybdenum steel, aluminum alloy, copper alloy, etc., or a combination thereof. More descriptions of the first portion 3011, the second portion 3012 and the third portion 3013, may be found in the detailed description elsewhere in the application, for example, FIGS. 2-5, FIGS. 7-10, FIGS. 11B-15, FIGS. 17-20, FIGS. 22-23, FIGS. 25-27, FIG. 29, etc.

In some embodiments, the number, shape, length, thickness, diameter and other parameters of the wire 3015 may be set according to actual needs (e.g., the diameter of the components of the acoustic apparatus, the strength requirements for components of the acoustic apparatus, etc.). The shape of the wire may include any suitable shape, e.g., cylinder, square, cuboid, prism, elliptical cylinder, or the like.

Figure 31:
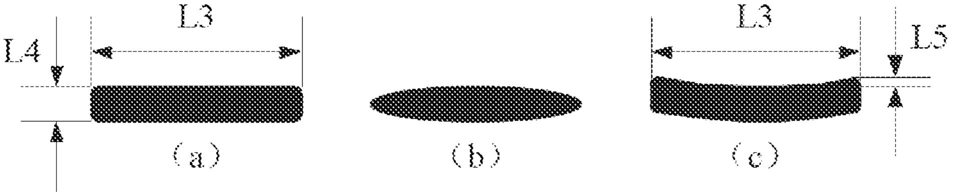
FIG. 31 is a cross-section view illustrating an exemplary wire according to some embodiments of the present disclosure.

FIG. 31 is a cross-section view illustrating an exemplary wire according to some embodiments of the present disclosure.

As shown in FIG. 31, the wire may be of a flat structure, so that the wire may have different deformability in various directions. In some embodiments, the cross-section shape of the wire may include square, rectangular, triangular, polygonal, circular, oval, irregular, or the like. As shown in FIG. (a) of FIG. 31, the cross-section shape of the wire may be a rounded rectangle. As shown in FIG. (b) of FIG. 31, the cross-section shape of the wire may be an ellipse. In some embodiments, the length of the major side (or major axis, L3) and/or the minor side (or minor axis, L4) of the wire may be set according to actual needs (e.g., the diameter of the portion of the acoustic apparatus including the wire). In some embodiments, the ratio of the length of the major side to the length of the minor side of the wire may be in the range of 4:1-6:1. In some embodiments, the ratio of the major side of the wire to the length of the major side of the wire may be 5:1.

In some embodiments, the wire may be formed into a specific shape by stamping, pre-bending, etc. For example only, the initial state (that is, the state before being processed) of the wire in the first portion of the acoustic apparatus may be curled, and then the wire may be straightened and then made into an arc shape (as shown in panel (c) in FIG. 31) in the minor axis direction through a stamping process, so that the wire may store a certain internal stress and maintain a straight shape, and become a "memory wire" that may return to the curled shape when subjected to a small external force, thereby allowing the first portion of the acoustic apparatus to fit snugly around the ear of the human. In some embodiments, the ratio of the arc height of the wire (L5 shown in FIG. 31) to the length of the major side of the wire may be in the range of 0.1-0.4. In some embodiments, the ratio of the arc height of the wire to the length of the major side of the wire may be in the range of 0.1-0.35. In some embodiments, the ratio of the arc height of the wire to the length of the major side of the wire may be in the range of 0.15-0.3. In some embodiments, the ratio of the arc height of the wire to the length of the major side of the wire may be in the range of 0.2-0.35. In some embodiments, the ratio of the arc height of the wire to the length of the major side of the wire may be in the range of 0.25-0.4. By arranging the wires, the stiffness of the components in the acoustic apparatus along the length direction thereof may be improved, and the effectiveness of the acoustic apparatus (e.g., the first portion) in clamping the ear of the user may be improved. In addition, after processing, the wire in the first portion may be bent in the length direction of the first portion to have strong elasticity, thereby further improving the effectiveness of the first portion in abutting the ear or head of the user.

Figure 32:
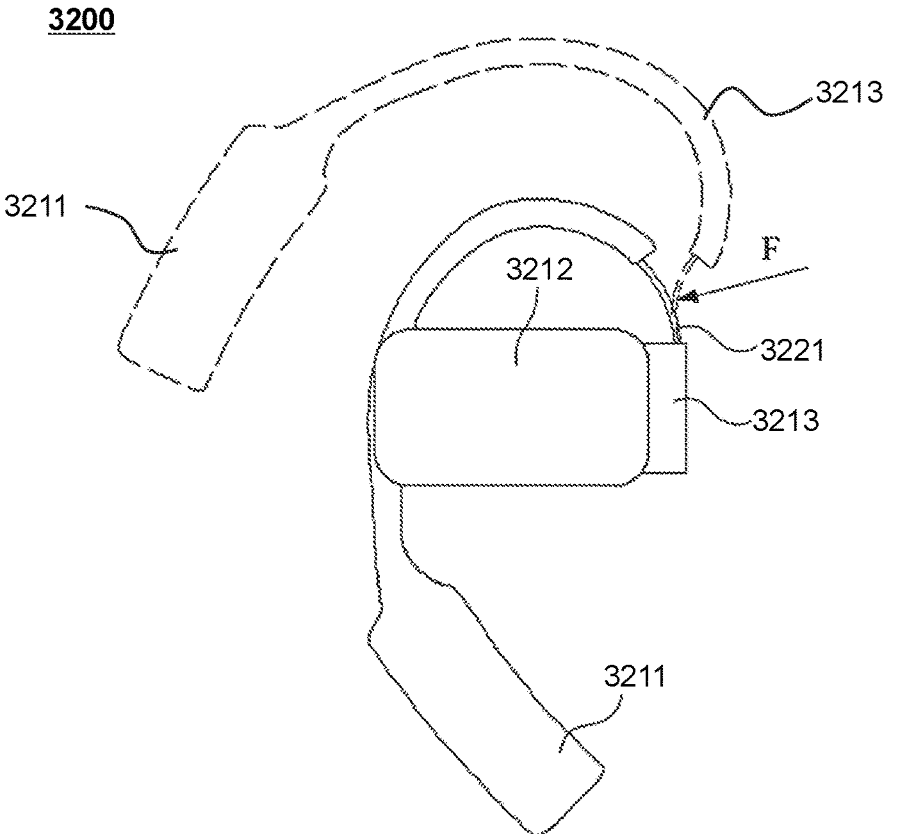
FIG. 32 is a schematic diagram illustrating an exemplary acoustic apparatus and a shaft assembly according to some embodiments of the present disclosure.

FIG. 32 is a schematic diagram illustrating an exemplary acoustic apparatus and a shaft assembly according to some embodiments of the present disclosure.

As shown in FIG. 32, the acoustic apparatus 3200 may include a support assembly and a third portion 3213. The support assembly may include a first portion 3211 and a second portion 3212. In some embodiments, the second portion 3212 and the third portion 3213 may be connected by the shaft assembly 3221. For example, the first end of the shaft assembly 3221 may be connected with the second portion 3212, and the second end of the shaft assembly 3221 may be connected with the third portion 3213. In some embodiments, the connection between the first end and the second portion 3221 of the shaft assembly 3221 and/or the connection between the second end and the third portion 3213 of the shaft assembly 3221 may include a plug connection, a snap connection, a screw connection, an adhesive connection, a welding connection, a riveting connection, a key connection, a bolt connection, a buckle connection, a hinge connection, etc. or any combination thereof. In some embodiments, the first end of the shaft assembly 3221 and the second portion 3221 and/or the second end and the third portion 3213 of the shaft assembly 3221 may be integrally formed. In some embodiments, the shaft assembly 3221 may include a bendable sheet-like structure, e.g., a metal dome. One end of the sheet-like structure may be connected with the first portion 3211, and the second end of the sheet-like structure may be integrally formed with the third portion 3213. For example, the sheet-like structure may be integrally formed with the third portion 3213 and connected with the first portion 3121 through an injection molding process of metal inserts. The sheet-like structure may be deformed under the action of the external force F, so that the first portion 3211 may be switched between the first use state (e.g., the state shown by the solid line in FIG. 32) and the second use state (e.g., the state shown by the dotted line in FIG. 32) relative to the second portion 3212, that is, the first portion 3211 may rotate relative to the second portion 3212.

Figure 33:
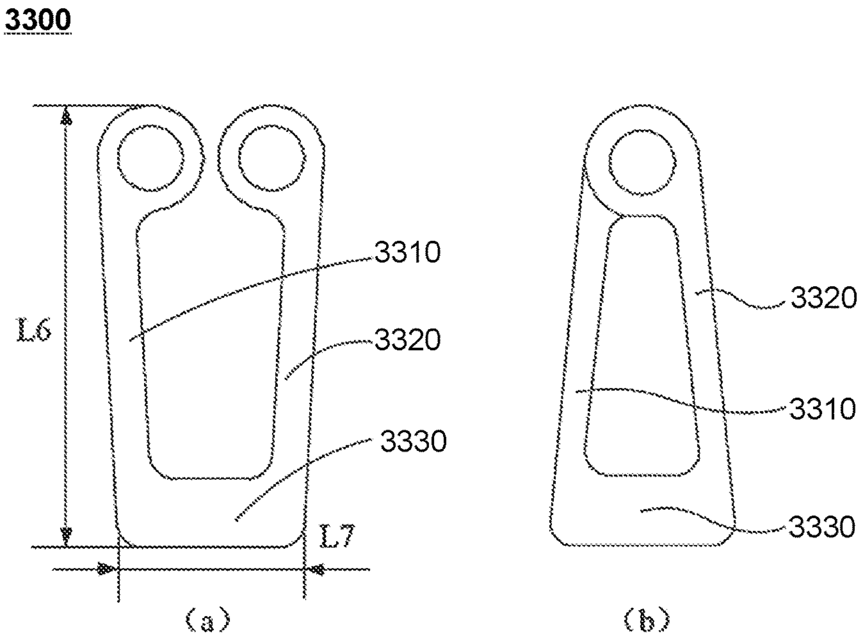
FIG. 33 is a schematic diagram illustrating an exemplary shaft assembly before and after assembly according to some embodiments of the present disclosure.

FIG. 33 is a schematic diagram illustrating an exemplary shaft assembly before and after assembly according to some embodiments of the present disclosure. FIG. (a) in FIG. 33 is a schematic diagram illustrating the shaft assembly 3300 before assembly, and in FIG. (b) of FIG. 33 is a schematic diagram illustrating the shaft assembly 3300 after assembly.

As shown in FIG. 33, the shaft assembly 3300 may include a first deformation portion 3310, a second deformation portion 3320, and an intermediate connection portion 3330. As shown in FIG. (a) of FIG. 33, before the shaft assembly 3300 is assembled, a first end of the first deformation portion 3310 and a first end of the second deformation portion 3320 may be respectively connected with both ends of the intermediate connection portion 3330. In some embodiments, before the shaft assembly 3300 is assembled, the length of the first deformation portion 3310 and the length of the second deformation portion 3320 may be equal (denoted as L6 in FIG. 33). In some embodiments, the length of the first deformation portion 3310 and/or the length of the second deformation portion 3320 may be greater than the length of the intermediate connection portion 3330 (denoted as L7 in FIG. 33). The L6 and L7 may satisfy the following relational formula: $0.1 \leq L7/L6 \leq 0.6$. In some embodiments, the thickness of the shaft assembly 3300 may be 0.1-0.8 mm. In some embodiments, the thickness of the shaft assembly 3300 may be 0.15 mm. In some embodiments, the thickness of the shaft assembly 3300 may be 0.2 mm. In some embodiments, the thickness of the shaft assembly 3300 may be 0.4 mm. In some embodiments, the thickness of the shaft assembly 3300 may be 0.5 mm. In some embodiments, the thickness of the shaft assembly 3300 may be 0.6 mm. In some embodiments, the thickness of the shaft assembly 3300 may be 0.7 mm, etc.

As shown in FIG. (b) of the FIG. 33, after the shaft assembly 3300 is assembled, a second end of the first deformation portion 3310 may be connected with a second end of the second deformation portion 3320 (e.g., by plug connection, snap connection, screw connection, adhesive connection, welding connection, riveting connection, key connection, bolt connection, buckle connection, hinge connection, etc.), so that the shaft assembly 3300 presents a triangular (or similar a triangular) structure. In some embodiments, the shaft assembly 3300 may be connected with a first portion of the acoustic apparatus (e.g., an elastic filamentary structure in the first portion). In some embodiments, the shaft assembly 3300 may have a certain arc along the length direction of the first portion, the second portion, or the third portion in the acoustic apparatus. With this arrangement, the shaft assembly 3300 may store a certain elastic potential energy, so that the shaft assembly 3300 may be deformed under the action of an external force (e.g., the external force F in FIG. 32).

Figure 34:
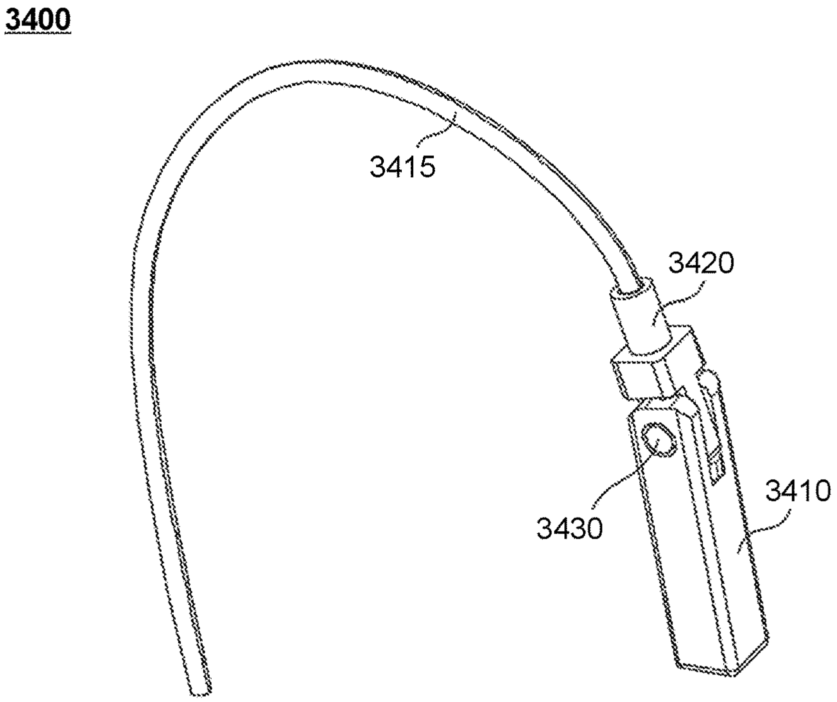
FIG. 34 is a schematic diagram illustrating an exemplary shaft assembly according to some embodiments of the present disclosure.
Figure 35:
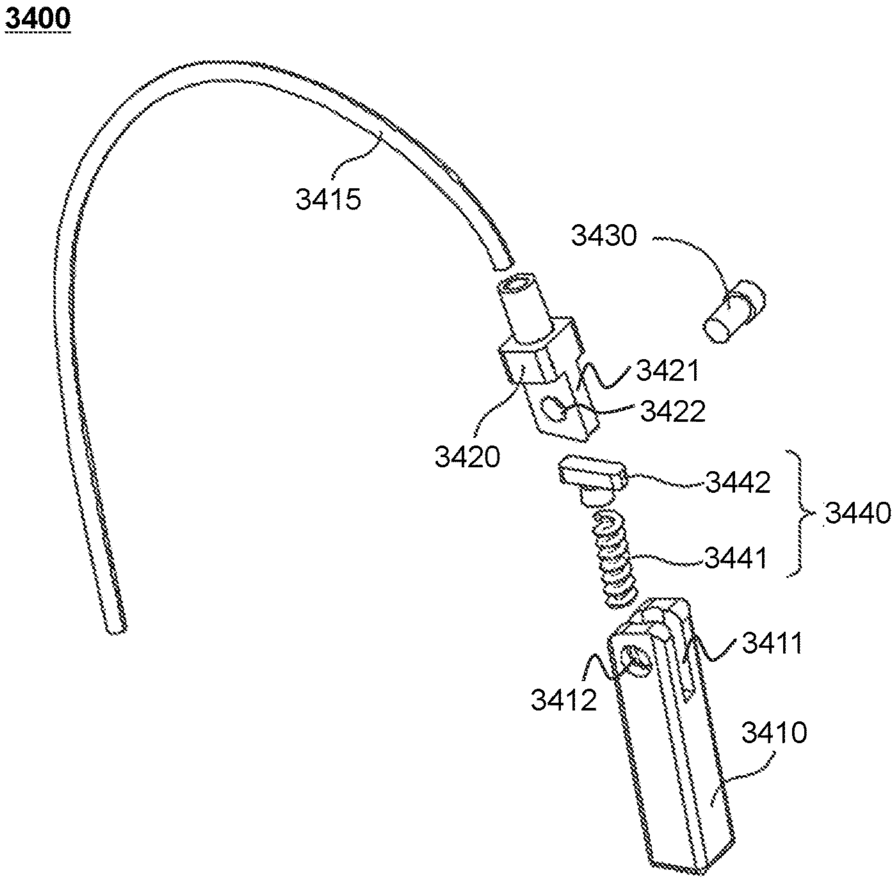
FIG. 35 is schematic diagram illustrating a disassembly of the shaft assembly shown in FIG. 34 according to some embodiments of the present disclosure.
Figure 36:
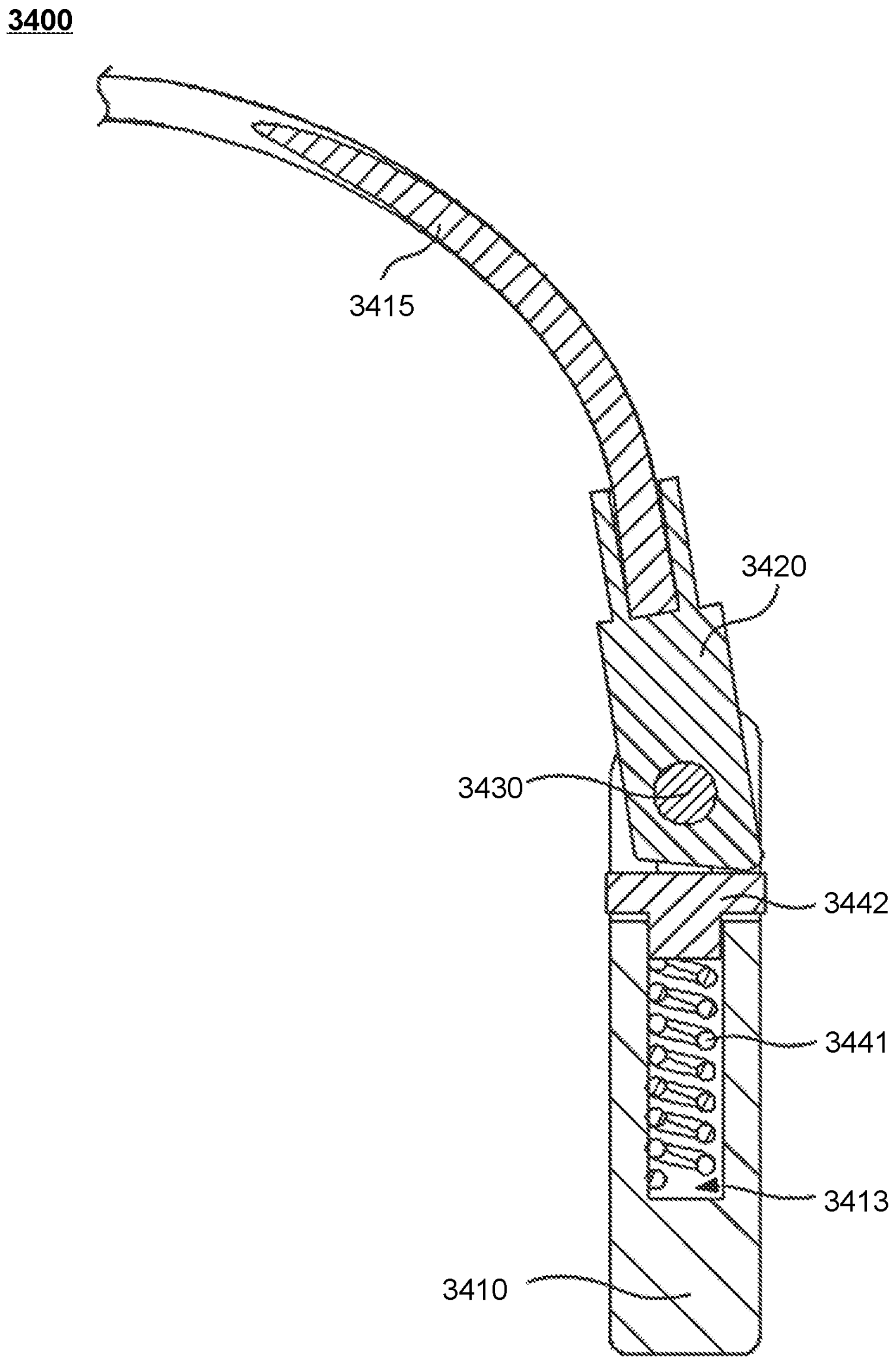
FIG. 36 is a cross-section view of the shaft assembly in FIG. 34 according to some embodiments of the present disclosure.

FIG. 34 is a schematic diagram illustrating an exemplary shaft assembly according to some embodiments of the present disclosure. FIG. 35 is a schematic diagram illustrating a disassembly of the shaft assembly shown in FIG. 34. FIG. 36 is a cross-section view of the shaft assembly in FIG. 34.

As shown in FIGS. 34-36, the shaft assembly 3400 (e.g., the shaft assembly 2121 in FIG. 2, the shaft assembly 7121 in FIG. 7, etc.) may include a first connection portion 3410, a second connection portion 3420, a shaft 3430, and an elastic assembly 3440. In some embodiments, the first connection portion 3410 may be connected with or be part of a third portion (e.g., the third portion 213 in FIG. 2, the third portion 713 in FIG. 7, etc.) of the acoustic apparatus. The second connection portion 3420 may be connected with or be part of the first portion (e.g., the elastic filamentary structure 3415 in the first portion) of the acoustic apparatus. The first connection portion 3410 and the second connection portion 3420 may be connected by the shaft 3430. Specifically, the first connection portion 3410 may be provided with a first groove 3411 and one or more first through holes 3412 matched with the shaft 3430. The second connection portion 3420 may be provided with a protrusion 3421 that is matched with the first groove of the first connection portion 3410 and a second through hole 3422 that is matched with the shaft 3430. The second through hole 3422 may be disposed on the protrusion 3421. At least a part (e.g., at least a part of the protrusion 3421) of the second connection portion 3420 may be inserted into the first groove 3411 of the first connection portion 3410, and the first through holes 3412 may be aligned (or substantially aligned) with the second through holes 3422. The alignment of the through hole means that the centers of multiple through holes are located on the same horizontal line. The shaft 3430 may pass through at least one of the first through holes 3412 and the second through holes 3422 to connect the first connection portion 3410 and the second connection portion 3420. In some embodiments, the first connection portion 3410 and the second connection portion 3420 may rotate relative to each other (e.g., rotate about the shaft 3430), so that the first portion of the acoustic apparatus may rotate relative to the second portion and the third portion through the shaft assembly 3400.

In some embodiments, the elastic assembly 3440 may be elastically held between the first connection portion 3410 and the second connection portion 3420 to maintain the state after the first portion rotates relative to the second portion. Specifically, the elastic assembly 3440 may include an elastic member 3441 and a jacking member 3442. The first connection portion 3410 may further include a accommodation cavity 3413. The accommodation cavity 3413 may communicate with the first groove 3411. The elastic member 3441 may be disposed in the accommodation cavity 3413. A part of one end of the jacking member 3442 may extend into the accommodation cavity 3413 to hold the elastic member 3441, and the other part of the jacking member 3442 may be located in the first groove 3411 to hold the second connecting portion 3420 (e.g., the protrusion 3421 of the second connection portion 3420).

In some embodiments, after the shaft assembly 3400 is assembled, the elastic assembly 3440 may be in a compressed state. When a user (e.g., a user with relatively large ears) is wearing the acoustic apparatus, the first portion of the acoustic apparatus and the elastic filamentary structure 3415 therein may be forced to rotate relative to the second portion, or have a tendency to rotate, thereby the second connection portion 3420 may rotate relative to the first connection portion 3410, and the elastic member 3441 may be compressed by the jacking member 3442. At this time, based on Newton's third law, the elastic member 3441 may react on the jacking member 3442 to hold the second connection portion 3420, so that the first portion of the acoustic apparatus (e.g., the first portion 210 in FIG. 2, the first portion 710 in FIG. 7 etc.) fits the ear of the user more closely, thereby improving the wearing stability of the acoustic apparatus.

Figure 37:
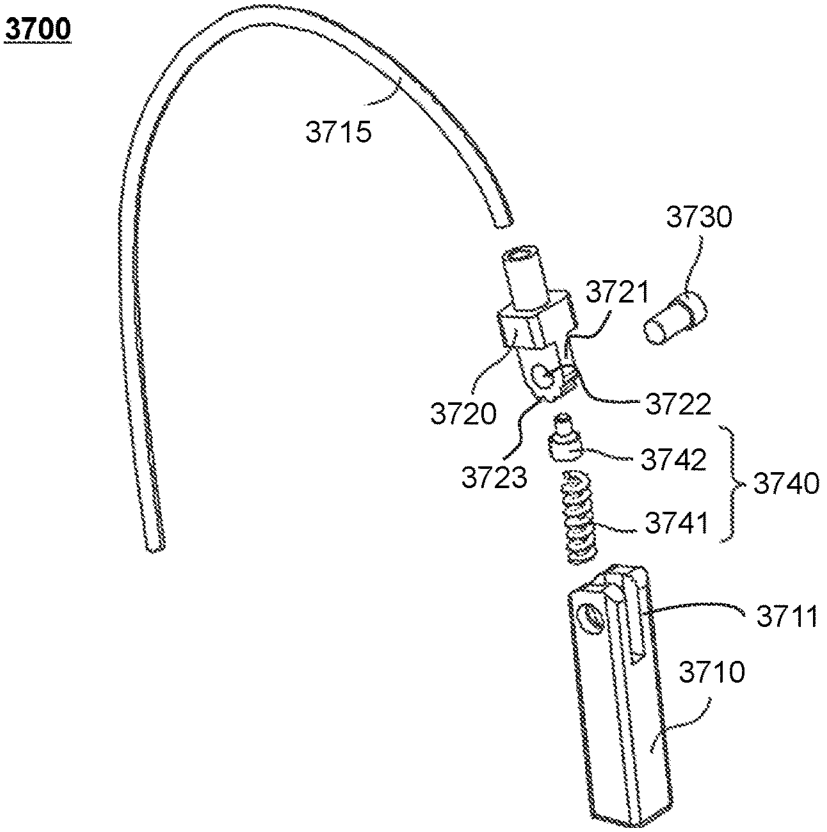
FIG. 37 is a schematic diagram of an exemplary shaft assembly according to some embodiments of the present disclosure.
Figure 38:
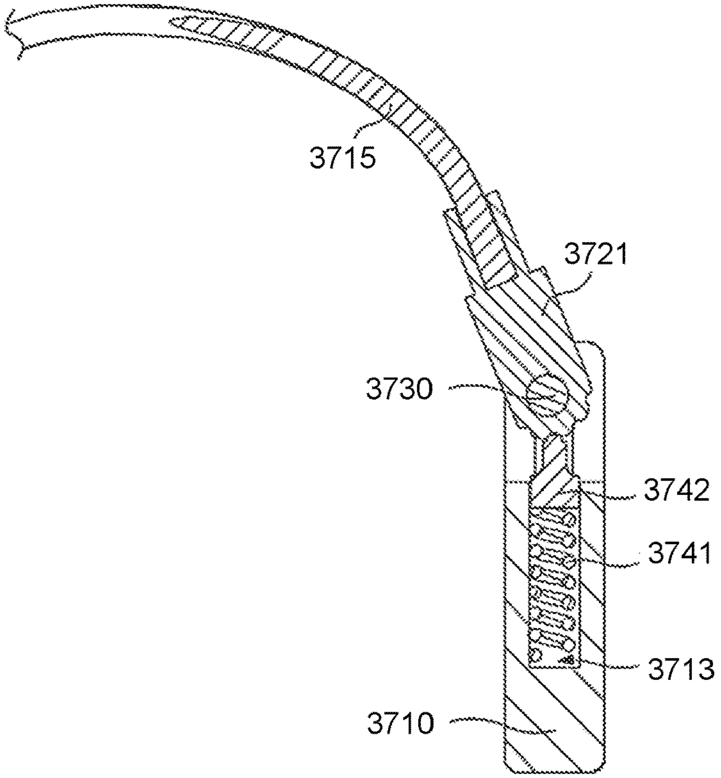
FIG. 38 is a cross-section view of the shaft assembly in FIG. 37 according to some embodiments of the present disclosure.

FIG. 37 is a schematic diagram illustrating an exemplary shaft assembly according to some embodiments of the present disclosure. FIG. 38 is a cross-section view of the shaft assembly in FIG. 37.

As shown in FIG. 37 and FIG. 38, the shaft assembly 3700 may include a first connection portion 3710, a second connection portion 3720, a shaft 3730, and an elastic assembly 3740. The first connection portion 3710 may be provided with a first groove 3711 for accommodating at least a part of the protrusion 3721 of the first connection portion 3710 and at least a part of the elastic assembly 3740 (e.g., the jacking member 3742). The accommodation cavity 3713 may communicate with the first groove 3711. The elastic member 3741 may be disposed in the accommodation cavity 3713. One or more structures of the shaft assembly 3700 (e.g., the first connection portion 3710, the shaft 3730, etc.) may be the same or similar to the corresponding structure (e.g., the first connection portion 3410, the shaft 3430, etc.) of the shaft assembly 3400 in FIG. 34-FIG. 36.

Different from the shaft assembly 3400, one end (e.g., the end of the protrusion 3721 in contact with the jacking portion 3742) of the second connection portion 3720 of the shaft assembly 3700 close to the first connection portion 3710 may be provided with one or more second grooves 3723 distributed along the circumference of the second through hole 3722 One end of the second connection portion 3720 of the shaft assembly 3700 away from the first connection portion 3710 may be connected with the first portion (e.g., an elastic filamentary structure 3715 in the first segment) of the acoustic apparatus (e.g., the acoustic apparatus 3200) or be a part of the first portion. One end of the jacking member 3742 away from the elastic member 3741 may be set in a shape (e.g., a spherical body, a columnar body, etc.) that is matched with the second groove 3723. Under the action of the elastic force of the elastic member 3741, the jacking member 3742 may be at least partially clamped into the second groove 3723. In other words, after the first portion of the acoustic apparatus is rotated to different angles relative to the second portion, the jacking member 3742 may be respectively snapped into different second grooves 3723 to realize multi-level adjustment of the first portion of the acoustic apparatus, thereby improving the application range and user experience of the acoustic apparatus.

Figure 39:
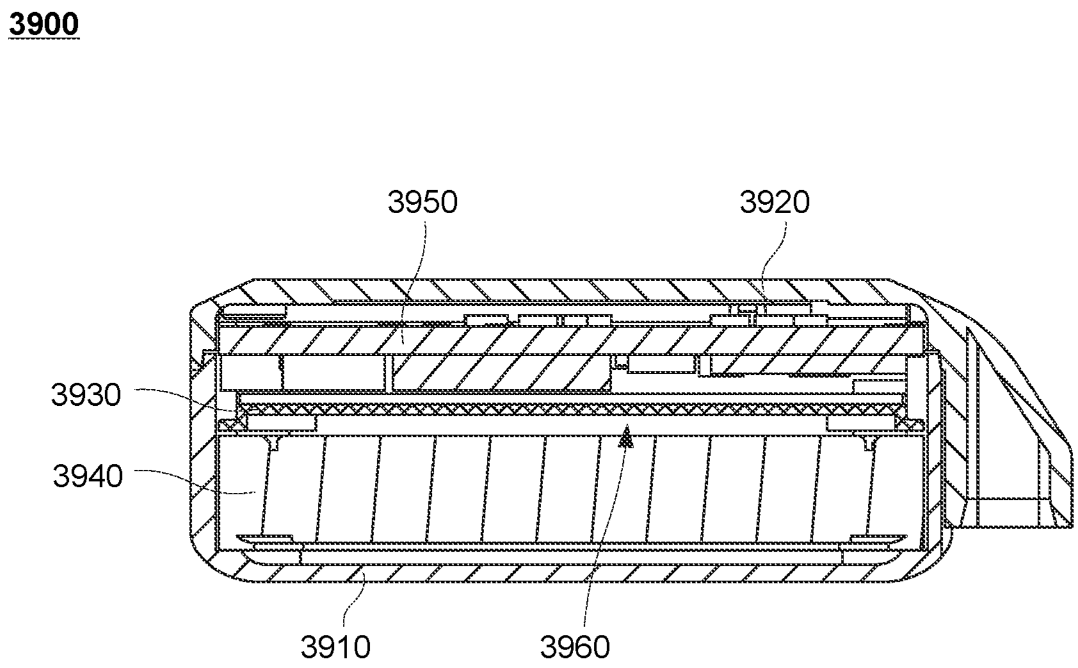
FIG. 39 is a schematic diagram illustrating a cross-section view of a second portion of an exemplary acoustic apparatus according to some embodiments of the present disclosure.

FIG. 39 is a schematic diagram illustrating a cross-section view of a second portion of an exemplary acoustic apparatus according to some embodiments of the present disclosure.

In some embodiments, the cross-section view of the second portion 3900 of the acoustic apparatus in FIG. 39 may be a cross-section view along a plane parallel to the front surface and/or the back surface (e.g., the XY plane in the coordinate system in the embodiment of the present disclosure) of the second portion. In some embodiments, the second portion 3900 may be a specific embodiment of the second portion (e.g., the second portion 212 shown in FIG. 2 and FIG. 3, the second portion 712 shown in FIG. 7 and FIG. 8, the second portion 1212 and the second portion 1312 shown in FIG. 12A, FIG. 12B and FIG. 13, the second portion 1712 shown in FIG. 17 and FIG. 18, the second portion 2212 shown in FIG. 22, the second portion 2312 shown in FIG. 23 the second portion 2512 shown in FIG. 25, the second portion 2612 shown in FIG. 26, the second portion 2712 shown in FIG. 27, the second portion 2912 shown in FIG. 29, the second portion 3012 shown in FIG. 30, the second portion 3212 shown in FIG. 32, etc.) of the acoustic apparatus shown in other embodiments of the present disclosure.

In some embodiments, the acoustic apparatus may include an air conduction acoustic apparatus, a bone conduction acoustic apparatus, or the like. The sound produced by the air conduction acoustic apparatus may be transmitted to the human ear through the vibration of the air, while the sound produced by the bone conduction acoustic apparatus may be transmitted to the human auditory system through the bones (e.g., the human skull). For the convenience of description, the following may take an example of an air conduction acoustic apparatus for description.

As shown in FIG. 39, the second portion 3900 may include an inner shell 3910 and an outer shell 3920. In some embodiments, the inner shell 3910 may be in contact with the ear of the user when the user is wearing the acoustic apparatus. The inner shell 3910 and the outer shell 3920 may constitute a housing. The housing may be used to accommodate other components of the second portion 3900, e.g., the core assembly 3940, the main board assembly 3950, or the like. More descriptions of the core assembly 3940 and the main board assembly 3950 may be found in the core assembly 214 and the main board assembly 215 in FIG. 2 and related descriptions thereof, respectively. In some embodiments, the second portion 3900 may also include a baffle 3930. The baffle 3930 may be used to separate the core assembly 3940 and the main board assembly 3950. In some embodiments, the baffle 3930 may be connected with the core assembly 3940 in a variety of ways, such as plug connection, snap connection, screw connection, adhesive connection, welding connection, riveting connection, key connection, bolt connection, buckle connection, hinge connection, etc. or any combination thereof. Optionally, the both ends (e.g., the both ends near the front and rear surfaces of the second portion 3900) of the baffle 3930 and/or the both ends (e.g., the both ends near the front and rear surfaces of the second portion 3900) of the core assembly 3940 may be provided with elastic members (e.g., elastic gaskets, foam, sealing rings, gasket plates, sealants, soft fillers, etc.), and the elastic member may form a fit with the inner wall of the housing of the second portion 3900 to realize the acoustic sealing of the second portion 3900.

The arrangement of the baffle 3930 may simplify the mutual influence of the internal components in the second portion 3900, for example, the influence of the multiple electronic components in the main board assembly 3950 on the sound of the core assembly 3940, and reduce the complexity inside the second portion 3900. In some embodiments, a cavity 3960 may be formed between the baffle 3930 and the core assembly 3940 to further reduce the influence of the main board assembly 3950 on the core assembly 3940, or the like, and improve the acoustic performance of the acoustic apparatus. In some embodiments, the cavity 3960 may have smooth inner and/or outer walls to prevent damage to other components in the second portion 3900.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block", "module", "engine", "unit", "component" or "system". Furthermore, aspects of the present disclosure may take the form of a computer program product embodied in one or more computer-readable media having computer readable program code embodied thereon.

In this application, descriptions of acoustic apparatus are intended to be illustrative, and not to limit the scope of the application. Numerous alternatives, modifications and variations may be apparent to those of ordinary skill in the art. The features, structures, methods, and other features of the exemplary embodiments described herein may be combined in various ways to obtain additional and/or alternative exemplary embodiments. For example, an acoustic apparatus may include one or more additional assemblies. Additionally or alternatively, one or more components of the acoustic apparatus in some embodiments of the present disclosure may be eliminated. Two or more components in an acoustic apparatus may be integrated into a single component. One or more assemblies integrated in one component may also be provided separately.

In addition, unless explicitly stated in the claims, the order in which the present disclosure deals with elements and sequences, the use of numbers and letters, or the use of other names, is not intended to limit the order of the procedures and methods of the present disclosure. While the foregoing disclosure discusses by way of various examples some embodiments of the invention presently believed to be useful, it is to be understood that such details are for purposes of illustration only and that the appended claims are not limited to the disclosed embodiments, but rather the claims are intended to cover all modifications and equivalent combinations that come within the spirit and scope of the embodiments of the present disclosure For example, although the system components described above may be implemented by hardware devices, they may also be implemented by software-only solutions, such as installing the described systems on existing servers or mobile devices.

Similarly, it should be noted that, in order to simplify the expression disclosed in the present disclosure, thereby helping the understanding of one or more embodiments of the invention, in the foregoing description of the embodiments of the present disclosure, various features are sometimes merged into one embodiment, drawing or description thereof. However, this method of disclosure does not imply that the subject matter of the application requires more features than those mentioned in the claims. Indeed, there are fewer features of an embodiment than all of the features of a single embodiment disclosed above.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

What is claimed is:

1. An acoustic apparatus comprising:

a support assembly including a first portion, and a second portion;

a core assembly; and a battery assembly, the core assembly being arranged on the second portion, and the battery assembly being arranged on the first portion, wherein the first portion is hung between a first side of an ear and a head of a user, the second portion contacts a second side of the ear; the first portion causes the second portion to provide a compressive force on the second side of the ear.

2. The acoustic apparatus of claim 1, further comprising:

a third portion, the first portion being connected with the second portion through the third portion, and the first portion causing the second portion to provide the compressive force on the second side of the ear through the third portion, and the third portion adapting to a thickness of the ear.

3. The acoustic apparatus of claim 2, wherein when the user is wearing the acoustic apparatus, a first contact point and a second contact point between the first portion and the head are formed on the first portion, the second contact point is located between the first contact point and a first connection point between the first portion and the third portion to cause the first portion to form a lever structure with the second contact point as a fulcrum, a force provided by the head and directed toward an outside of the head at the second contact point is converted by the lever structure into a force directed toward the head at the first connection point, and the force directed toward the head causes, through the third portion, the second portion to provide the compressive force on the second side of the ear.

4. The acoustic apparatus of claim 1, wherein when the user is wearing the acoustic apparatus, a first contact point between the first portion and the first side of the ear is formed on the first portion, a second contact point between the second portion and the second side of the ear is formed on the second portion, and a distance between the first contact point and the second contact point when the user is not wearing the acoustic apparatus is smaller than a distance between the first contact point and the second contact point when the user is wearing the acoustic apparatus, to cause the second portion to provide the compressive force on the second side of the ear.

5. The acoustic apparatus of claim 4, wherein a third contact point between the first portion and the first side of the ear is formed on the first portion, the third contact point is located between the first contact point and a first connection point between the first portion and the third portion, and is adjacent to the first connection point, and a distance between projections of the first contact point and the third contact point on a reference plane perpendicular to an extension direction of the third portion when the user is not wearing the acoustic apparatus is smaller than a distance between projections of the first contact point and the third contact point on the reference plane perpendicular to the extension direction of the third portion when the user is wearing the acoustic apparatus to balance a self-weight of the second portion.

6. The acoustic apparatus of claim 1, wherein a first end of the first portion is provided with at least one of a bulge structure, a dull polish structure, a texture structure, or a hole structure.

7. The acoustic apparatus of claim 1, wherein an angle between a first end of the first portion and a reference plane when the user is not wearing the acoustic apparatus is greater than an angle between the first end of the first portion and the reference plane when the user is wearing the acoustic apparatus, and the reference plane includes a plane including a surface of the second portion.

8. The acoustic apparatus of claim 1, wherein the first portion is configured to provide a compressive force on the first side of the ear.

9. The acoustic apparatus of claim 2, wherein the first portion and the third portion are movably connected, the third portion and the second portion are movably connected, or a portion of the third portion is movably connected relative to another portion of the third portion.

10. The acoustic apparatus of claim 1, further comprising an auxiliary portion being physically connected with the second portion, wherein when the user is wearing the acoustic apparatus, the auxiliary portion is used to abut against at least a part of the ear to limit a movement of the second portion.

11. The acoustic apparatus of claim 10, wherein the second portion has a major axis and a minor axis, a dimension of the second portion in a direction of the major axis is greater than or equal to a dimension of the second portion in a direction of the minor axis, one end of the second portion in the direction of the major axis is connected with a second end of the first portion, and the auxiliary portion is connected with a side of the second portion close to the first portion.

12. The acoustic apparatus of claim 11, wherein when the user is not wearing the acoustic apparatus, a side of the second portion in contact with the second side of the ear is defined as an inner surface, a side of the second portion opposite to the inner surface is defined as an outer surface, a side of the second portion connected with the first portion is defined as an upper surface, and a side of the second portion opposite to the upper surface in the direction of the major axis is defined as a lower surface, a side of the second portion close to the ear is defined as a rear surface, and a side of the second portion opposite to the rear surface in the direction of the minor axis is defined as a front surface, the auxiliary portion is provided at one of the upper surface, the rear surface, and the lower surface, or the auxiliary portion is provided at a junction of the upper surface and the rear surface or a junction of the rear surface and the lower surface.

13. The acoustic apparatus of claim 11, wherein the auxiliary portion includes a support segment and a contact segment connected with the support segment, the support segment is connected with the second portion, and the contact segment is used to abut against an auricular nave of the ear.

14. The acoustic apparatus of claim 13, wherein an angle formed by the support segment along the extension direction of the second portion and the direction of the major axis of the second portion is within the range of 0° to 30°.

15. The acoustic apparatus of claim 13, wherein an angle formed between a projection of the support segment on a reference plane perpendicular to the direction of the major axis of the second portion and the direction of the minor axis of the second portion is within the range of 0° to 60° to cause the auxiliary portion to clamp the ear together with the first portion when the user is wearing the acoustic apparatus.

16. The acoustic apparatus of claim 1, wherein a ratio of a total weight of the second portion to a weight of a portion of the first portion including the battery assembly is within 4:1.

17. The acoustic apparatus of claim 1, wherein an outer diameter of a portion of the first portion including the battery assembly is larger than an outer diameter of other portions of the first portion.

18. The acoustic apparatus of claim 1, wherein a ratio of a length to an outer diameter of a portion of the first portion including the battery assembly is within 6:1.

19. An acoustic apparatus, comprising a support assembly, an auxiliary portion, a core assembly, and a battery assembly;

the support assembly including a first portion and a second portion, the auxiliary portion being physically connected with the second portion, the core assembly being arranged on the second portion, and the battery assembly being arranged on the first portion;

wherein when a user is wearing the acoustic apparatus, the first portion is hung between a first side of an ear and a head of the user and being at least partially in contact with the head, the second portion contacts a second side of the ear, and the first portion provides the second portion with a compressive force on the second side of the ear, and the auxiliary portion is used to abut against at least a part of the ear to limit a movement of the second portion.

20. The acoustic apparatus of claim 19, wherein:

the support assembly further includes a third portion, the first portion being connected with the second portion through the third portion, and the first portion causing the second portion to provide the compressive force on the second side of the ear through the third portion, and the third portion adapting to a thickness of the ear.

* * * * *